United States Patent
Kakadiaris et al.

(10) Patent No.: US 8,090,160 B2
(45) Date of Patent: Jan. 3, 2012

(54) AUTOMATED METHOD FOR HUMAN FACE MODELING AND RELIGHTING WITH APPLICATION TO FACE RECOGNITION

(75) Inventors: Ioannis A. Kakadiaris, Bellaire, TX (US); George Toderici, Mountain View, CA (US); Theoharis Theoharis, Kifisia (GR); Georgios Passalis, Houston, TX (US)

(73) Assignee: The University of Houston System, Houston, TX (US)

( * ) Notice: Subject to any disclaimer, the term of this patent is extended or adjusted under 35 U.S.C. 154(b) by 645 days.

(21) Appl. No.: 12/250,274

(22) Filed: Oct. 13, 2008

(65) Prior Publication Data
US 2009/0310828 A1    Dec. 17, 2009

Related U.S. Application Data

(60) Provisional application No. 60/979,735, filed on Oct. 12, 2007.

(51) Int. Cl.
*G06K 9/00* (2006.01)
*G06T 15/00* (2011.01)

(52) U.S. Cl. .......................... 382/118; 382/285; 345/419

(58) Field of Classification Search .................. 382/100, 382/103, 107, 108, 115–118, 154, 162, 165, 382/168, 173, 181, 193–194, 199, 209, 220, 382/232, 254, 274, 276, 285–298, 312; 348/14.6, 348/14.1, 94; 345/419, 420
See application file for complete search history.

(56) References Cited

U.S. PATENT DOCUMENTS

| | | | | |
|---|---|---|---|---|
| 6,556,196 B1 * | 4/2003 | Blanz et al. | ................... | 345/419 |
| 6,771,303 B2 * | 8/2004 | Zhang et al. | ............... | 348/14.16 |
| 7,158,658 B2 * | 1/2007 | Liu et al. | ....................... | 382/118 |
| 7,609,860 B2 * | 10/2009 | Lee et al. | ..................... | 382/118 |
| 7,623,687 B2 * | 11/2009 | Bronstein et al. | ............. | 382/118 |
| 7,756,325 B2 * | 7/2010 | Vetter et al. | ................. | 382/154 |
| 7,876,931 B2 * | 1/2011 | Geng | .......................... | 382/118 |

* cited by examiner

*Primary Examiner* — Seyed Azarian
(74) *Attorney, Agent, or Firm* — Robert W Strozier

(57) ABSTRACT

A novel method and system for 3d-aided-2D face recognition under large pose and illumination variations is disclosed. The method and system includes enrolling a face of a subject into a gallery database using raw 3D data. The method also includes verifying and/or identifying a target face form data produced by a 2D imagining or scanning device. A statistically derived annotated face model is fitted using a subdivision-based deformable model framework to the raw 3D data. The annotated face model is capable of being smoothly deformed into any face so it acts as a universal facial template. During authentication or identification, only a single 2D image is required. The subject specific fitted annotated face model from the gallery is used to lift a texture of a face from a 2D probe image, and a bidirectional relighting algorithm is employed to change the illumination of the gallery texture to match that of the probe. Then, the relit texture is compared to the gallery texture using a view-dependent complex wavelet structural similarity index metric.

14 Claims, 37 Drawing Sheets

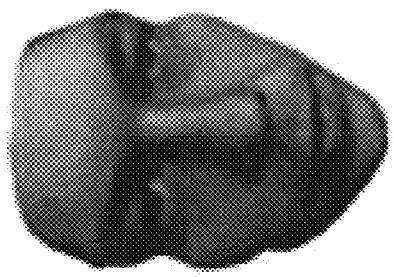
FIG. 30B
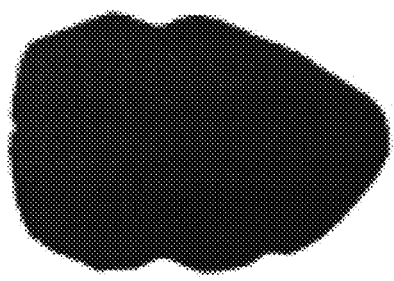
FIG. 30C
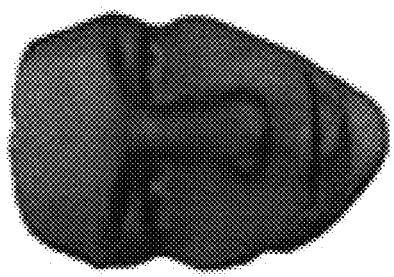
FIG. 30E
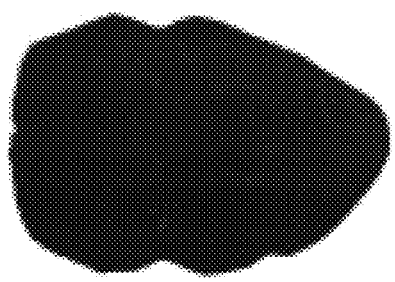
FIG. 30F
FIG. 30A
FIG. 30D

AUTOMATED METHOD FOR HUMAN FACE MODELING AND RELIGHTING WITH APPLICATION TO FACE RECOGNITION

RELATED APPLICATIONS

This application claim priority to and the benefit of U.S. Provisional Application Ser. No. 60/979,735; FD: Oct. 12, 2007.

BACKGROUND OF THE INVENTION

1. Field of the Invention

The present invention relates to a novel method and system for 3 d-aided-2D face recognition.

More particularly, the present invention relates to a novel method and a system for 3D-aided 2D face recognition under large pose and illumination variations, where the method includes enrolling a face of a subject into a gallery database, where the enrollment data comprises either data from a 3D scanner or imaging device or data derived from a 2D imaging or scanning device, raw 3D data. The method also includes verifying and/or identifying a target face form data produced by a 2D imagining or scanning device, 2D data. During the enrollment process, a statistically derived annotated face model is fitted using a subdivision-based deformable model framework to the raw 3D data. The annotated face model is capable of being smoothly deformed into any face so it acts as a universal facial template. During authentication or identification, only a single 2D image is required. The subject specific fitted annotated face model from the gallery is used to lift a texture of a face from a 2D probe image, and a bidirectional relighting algorithm is employed to change the illumination of the gallery texture to match that of the probe. Then, the relit texture is compared to the gallery texture using a view-dependent complex wavelet structural similarity index metric. The inventors have shown that using this approach yields significantly better recognition rates, with an equal error rate (EER) which is less than half (12.1%) of the best performing, commercially available 2D face recognition software. The term texture as used herein means the specific coloring and other facially distinct elements of the face as seen from the 2D imagining device. It is this data that is lifted and pasted onto the subject fitted annotated face model.

2. Description of the Related Art

The human face, as the most distinctive and descriptive human feature, has been widely researched in both the computer vision and computer graphics domains. With the proliferation of 3D scanners, 3D facial data are used in biometrics, motion pictures, games and medical applications.

However, the use of real facial data introduces a number of challenges. The texture acquired by sensors is affected by the lighting conditions. In applications such as biometrics or face relighting the skin albedo is required. Therefore, the contribution of environmental lighting must be removed from the texture. Moreover, commercial 3D scanners produce 3D data that have artifacts and non-uniform sampling. Manual cropping is required to remove data that do not belong to the face. Finally, there is no common point of reference between facial scans even of the same person, as these data are unregistered.

3D-aided 2D face recognition has its roots in the work on estimating the 3D structure of human faces from 2D images using 3D morphable models by Vetter and Blanz[13,14]. The first implementation required a lot of interaction from the user, who had to select a large number of points on the 2D image and the corresponding points on the 3D model. Initially, the algorithms only worked at very specific angles and illumination conditions. Over time, the number of points needed to be manually matched has been reduced significantly[15]. The morphable model employed in estimating the 3D structure of faces is created from 3D scans of multiple humans. Theoretically, if many 3D scans are available, the structure of any face can be represented as a linear combination of the faces in the database. Since the number of faces in the database may be quite large, the authors employ Principal Components Analysis in order to determine the most important features that describe a face or the 3D "eigenfaces". This approach allows the authors to remove from the database those faces that do not contribute much to the variation between humans (e.g., if two faces are similar, only one most likely be used in the final database). The first reliable 3D-aided 2D face recognition algorithms were an extension of the original work of Vetter and Blanz[16], and it included lighting estimation, because the most frequent reason for which the initial attempts had failed was due to lighting. A more advanced lighting estimation technique was developed using spherical harmonics to further improve the results obtained using the morphable model approach[17,18]. The morphable model approach was also extended to work with non-frontal images[19]. The morphable model 3D-aided 2D face recognition approach still requires carefully selected (manually) feature points and consequently it is still not ready to be used in an operational scenario. Lee and Ranganath developed a different approach to perform 3D/2D face recognition[20]. Instead of using a morphable model created from 3D scans of faces, the authors used a generic 3D model deformed using certain parameters. They used this model in the same fashion as the previous approaches, but they did not estimate lighting. They compensated for this by making use of edge matching. The performance reported is not satisfactory for the requirements of an operational scenario. Classical 2D face recognition algorithms that have been trained using 3D faces rendered under different illumination conditions represent another class of methods that does not require user interaction. This idea has been applied to face recognition using component-based Support Vector Machines[21] and Fisherfaces[22]. The main problem with this class of methods still is lighting. The results reported demonstrate that more research is needed to explore this class of methods.

In summary, neither morphable models nor 2D face recognition algorithms trained using synthetic data perform well enough or are practical enough to be used in a face recognition system deployed in an operational scenario. Clearly, a different approach must be taken to alleviate the challenges of face recognition.

Thus, there is a need in the art for an automated method for human face modeling and relighting with application to face recognition.

SUMMARY OF THE INVENTION

The present invention provides a method for 3D-aided 2D face recognition under large pose and illumination variations, where the method includes enrolling a face of a subject into a gallery database, where the enrollment data comprises either data from a 3D scanner or imaging device or data derived from a 2D imaging or scanning device, raw 3D data. The method also includes verifying and/or identifying a target face form data produced by a 2D imagining or scanning device, 2D data. During the enrollment process, a statistically derived annotated face model is fitted using a subdivision-based deformable model framework to the raw 3D data. The annotated face model is capable of being smoothly deformed into any face so it acts as a universal facial template. During authentication or identification, only a single 2D image is required. The subject specific fitted annotated face model from the gallery is used to lift a texture of a face from a 2D probe image, and a bidirectional relighting algorithm is employed to change the illumination of the gallery texture to match that of the probe. Then, the relit texture is compared to the gallery texture using a view-dependent complex wavelet structural similarity index metric. The inventors have shown that using this approach yields significantly better recognition rates, with an equal error rate (EER) which is less than half (12.1%) of the best performing, commercially available 2D face recognition software. The term texture as used herein means the specific coloring and other facially distinct elements of the face as seen from the 2D imagining device. It is this data that is lifted and pasted onto the subject fitted annotated face model.

The present invention provides a biometric face recognition system including an enrollment station or a small plurality of enrollment stations and a computer having implemented thereon an enrollment methodology of this invention. The system also includes a plurality of identification stations and a computer having implemented thereon an identification methodology of this invention, where the computer can be the same or different and if different are linked by a robust communication infrastructure such as a LAN, intranet or internet. The system also include a notification methodology adapted to notify a user concerning the identity of a target subject. The enrollment methodology is based on 3D data obtained from either a 3D scanner and imaging device or derived from a 2D scanner or imaging device, referred to a raw 3D data. The enrollment methodology fits a statistically derived annotated face model to the raw 3D data through model deformation using a subdivision-based deformable model framework. The enrollment methodology then lifts a texture of the image and places it onto the subject specific deformed model. The enrollment methodology then derives a light source invariant model using an albedo estimation methodology and stores the resulting construct in a gallery database. The database can also store all raw data and intermediate construct data, but this data is not used by the identification methodology. The identification methodology takes a 2D image from a 2D imaging device or camera. The data is processed in much the same way as in the enrollment methodology, where a subject specific deformed AFM is derived and textured with the texture from the 2D device. The resulting construct is then converted into a geometry construct and albedo corrected. The identification construct is then compared against gallery data to determine an identification. If no identification is found, then the system can ask if the subject should be enrolled.

The present invention relates to a method for 3D-aided 2D face recognition under large pose and illumination variations implemented on a computer or on a distributed computer network. The method includes enrolling a face of a subject into a gallery database as a fitted annotated face model, where the enrollment data comprises raw 3D data obtained either from a 3D scanner or imaging apparatus or derived from a 2D imaging or scanning apparatus and where a statistically derived annotated face model is fitted using a subdivision-based deformable model framework to the raw 3D data. The method also includes obtaining raw 2D data of a target face from a 2D imagining or scanning apparatus or probe. Once obtained, the method includes lifting a texture of the target face from the 2D probe image. Next, the method includes selecting a specific fitted annotated face model from the gallery or all the gallery models for an identification experiment and bidirectionally relighting the gallery texture from the selected specific fitted annotated face model to change an illumination of the gallery texture to match the texture lifted from the probe image. Once the lighting has been matched, the method includes comparing the two matched textures and verifying and/or identifying the target face based on a value of a metric such as a view-dependent complex wavelet structural similarity index metric. The method has an equal error rate (EER) of this method is less than half of the best commercially available 2D face recognition method.

The enrolling step includes obtaining and storing on a computer, raw 3D data of a face of a subject to be enrolled either directly from a 3D imaging apparatus or derived from a 2D imaging apparatus. The raw 3D data is then fitted to an annotated face model stored in the computer onto the raw 3D data using a subdivision-based deformable model framework using routines encoded on the computer to form a fitted face model. The fitted face model is converted using routines encoded on the computer to a geometry image representation comprising regularly sampled, registered and annotated geometry data. The enrollment method also includes lifting an albedo of the skin from the stored raw 3D data using an analytical skin reflectance model stored in the computer, where the analytical skin reflectance model is adapted to remove lighting, shadows, diffuse light and specular light from the albedo texture to form a lighting invariant albedo texture of the skin. The lifted lighting invariant albedo texture is then placed onto the geometry image representation to form a subject specific deformable and relightable construct. The construct is then stored in a gallery database encoded on the computer, where the database include constructs for all enrolled subjects. The method requires no measurement or calibration of a lighting environment, is fully automatic, has minimum input requirements making it applicable to both computer vision applications and computer graphics applications and allowing utilization of existing 3D facial data stored in other databases. The computer vision applications include face recognition and face verification systems. The computer graphic applications include face relighting, face synthesis and facial expressions transference. The method can further include inpainting if the raw 3D data includes over-saturated specular highlights. The inpainting produces an estimated lighting invariant albedo texture.

The present invention relates to a method for 3D-aided 2D face recognition under large pose and illumination variations implemented on a computer or on a distributed computer network. The method includes obtaining and storing on a computer, raw 3D data of a face of a subject to be enrolled either directly from a 3D imaging apparatus or derived from a 2D imaging apparatus. The method also includes fitting an annotated face model stored in the computer onto the raw 3D data using a subdivision-based deformable model framework using routines encoded on the computer to form a fitted face model. The method also includes converting the fitted face model using routines encoded on the computer to a geometry image representation comprising regularly sampled, registered and annotated geometry data. The method also includes lifting an albedo of the skin from the stored raw 3D data using an analytical skin reflectance model stored in the computer, where the analytical skin reflectance model is adapted to remove lighting, shadows, diffuse light and specular light from the albedo texture to form a lighting invariant albedo texture of the skin. The method also includes placing the lighting invariant albedo texture onto the geometry image representation to form a subject specific deformable and relightable construct. The method also includes storing the construct in a gallery database encoded on the computer, where the database include constructs for all enrolled subjects. The method requires no measurement or calibration of a lighting environment, is fully automatic, has minimum input requirements making it applicable to both computer vision applications and computer graphics applications and allowing utilization of existing 3D facial data stored in other databases. The method also includes obtaining raw 2D data of a target face from a 2D imagining or scanning apparatus or probe. The method also includes lifting a texture of the target face from the 2D probe image. The method also includes selecting a specific fitted annotated face model from the gallery for an authentication experiment or all the gallery models for an identification experiment. The method also includes bidirectionally relighting the gallery texture from the selected specific fitted annotated face model to change an illumination of the gallery texture to match the texture lifted from the probe image. The method also includes comparing the two matched textures. The method also includes verifying and/or identifying the target face based on a value of a metric such as a view-dependent complex wavelet structural similarity index metric. The method has an equal error rate (EER) of this method is less than half of the best commercially available 2D face recognition method.

The present invention relates to a method implemented on a computer or on a distributed computer network including obtaining and storing on a computer, raw 3D data of a face of a subject to be enrolled either directly from a 3D imaging apparatus or derived from a 2D imaging apparatus. The method also includes fitting an annotated face model stored in the computer onto the raw 3D data using a subdivision-based deformable model framework using routines encoded on the computer to form a fitted face model. The method also includes converting the fitted face model using routines encoded on the computer to a geometry image representation comprising regularly sampled, registered and annotated geometry data. The method also includes lifting an albedo of the skin from the stored raw 3D data using an analytical skin reflectance model stored in the computer, where the analytical skin reflectance model is adapted to remove lighting, shadows, diffuse light and specular light from the albedo texture to form a lighting invariant albedo texture of the skin. The method also includes placing the lighting invariant albedo texture onto the geometry image representation to form a subject specific deformable and relightable construct. The method also includes storing the construct in a gallery database encoded on the computer, where the database include constructs for all enrolled subjects. The method requires no measurement or calibration of a lighting environment, is fully automatic, has minimum input requirements making it applicable to both computer vision applications and computer graphics applications and allowing utilization of existing 3D facial data stored in other databases. The computer vision applications include face recognition and face verification systems. The computer graphic applications include face relighting, face synthesis and facial expressions transference. The method can further include inpainting if the raw 3D data includes over-saturated specular highlights. The inpainting produces an estimated lighting invariant albedo texture. The method can also include deforming a facial expression from a first construct in the gallery database to match a second construction in the gallery and transferring the facial expression from the first construct to the second construct to form a synthetic facial construct. The method can also include retrieving a construct from the gallery database and relighting the construct to form a relit construct, where the relighting is user defined. The method can also include retrieving a set of attributes from a plurality of constructs in the gallery database and forming a synthetic construct from the set of attributes.

The present invention relates to a system including an enrollment station or a small plurality of enrollment stations adapted to produce raw 3D data of a subject to be enrolled in the system. The system also includes a computer in data communication with the enrollment stations having implemented thereon an enrollment method. The computer can be a standalone computer or a computer that is a part of a distributed computer network or can be a station connected to a distributed computer network, where the encoded routines are stored on servers and/or in stations connected to the network. The network can be a local area network, an intranet or an internet such as the world wide wed or the grid.

The enrollment method includes obtaining and storing on a computer, raw 3D data of a face of a subject to be enrolled either directly from a 3D imaging apparatus or derived from a 2D imaging apparatus. The enrollment method also includes fitting an annotated face model stored in the computer onto the raw 3D data using a subdivision-based deformable model framework using routines encoded on the computer to form a fitted face model. The enrollment method also includes converting the fitted face model using routines encoded on the computer to a geometry image representation comprising regularly sampled, registered and annotated geometry data. The enrollment method also includes lifting an albedo of the skin from the stored raw 3D data using an analytical skin reflectance model stored in the computer, where the analytical skin reflectance model is adapted to remove lighting, shadows, diffuse light and specular light from the albedo texture to form a lighting invariant albedo texture of the skin. The enrollment method also includes placing the lighting invariant albedo texture onto the geometry image representation to form a subject specific deformable and relightable construct. The enrollment method also includes storing the construct in a gallery database encoded on the computer, where the database include constructs for all enrolled subjects. The method requires no measurement or calibration of a lighting environment, is fully automatic, has minimum input requirements making it applicable to both computer vision applications and computer graphics applications and allowing utilization of existing 3D facial data stored in other databases.

The system also includes a plurality of identification stations adapted to produce raw 2D facial data of a target subject or a plurality of target subjects in data communication with the computer, where the computer further having implemented thereon an identification method. The identification method includes lifting a texture of the target face from the 2D probe image. The identification method also includes selecting a specific fitted annotated face model from the gallery for an authentication experiment or all the gallery models for an identification experiment and bidirectionally relighting the gallery texture from the selected specific fitted annotated face model to change an illumination of the gallery texture to match the texture lifted from the probe image. The identification method also includes comparing the two matched textures and verifying and/or identifying the target face based on a value of a metric such as a view-dependent complex wavelet structural similarity index metric. The system has an equal error rate (EER) of this method is less than half of the best commercially available 2D face recognition system. The computer can further have implemented thereon a notification method adapted to notify a user concerning the identity of a target subject.

BRIEF DESCRIPTION OF THE DRAWINGS

The invention can be better understood with reference to the following detailed description together with the appended illustrative drawings in which like elements are numbered the same.

Part I Figures

Part II Figures

Figure 15:
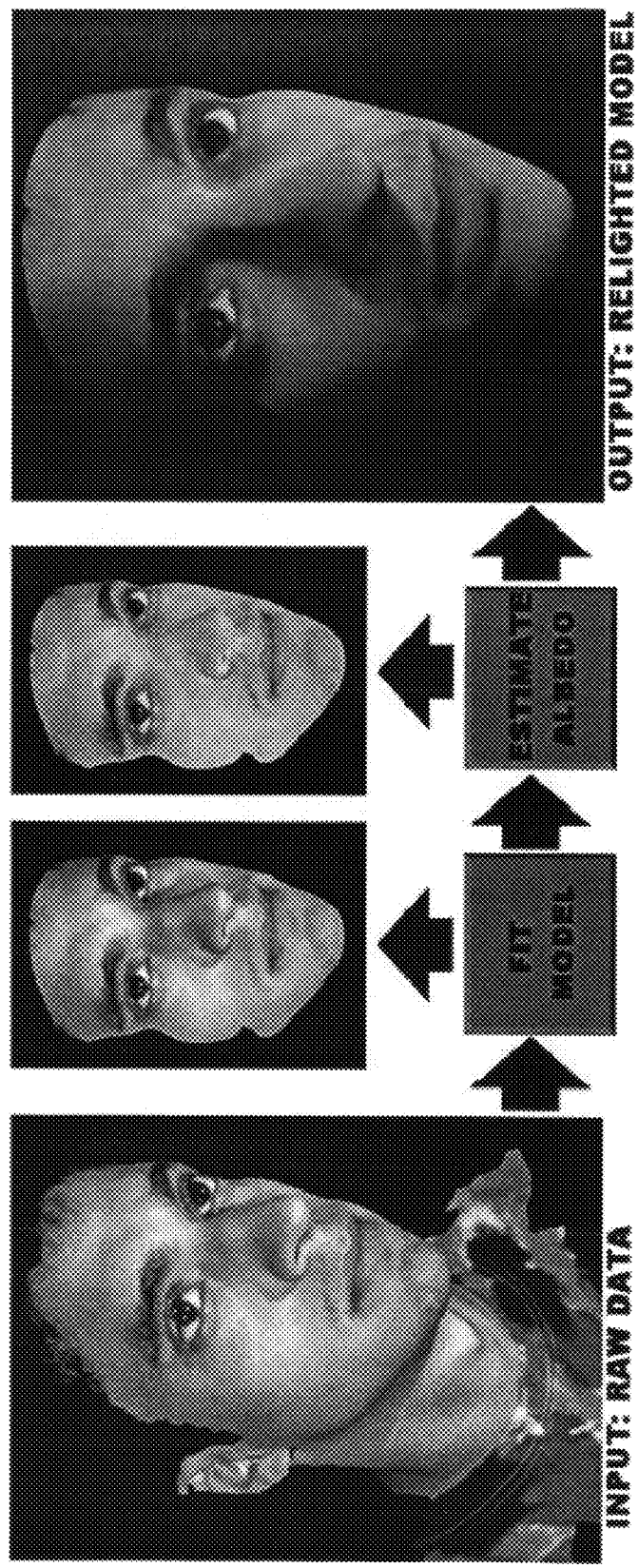

FIG. 15 depicts an overview of the method (left to right): Input raw data!Fitted model!Estimated albedo!Relighting example.

Figures 16A, 16B:
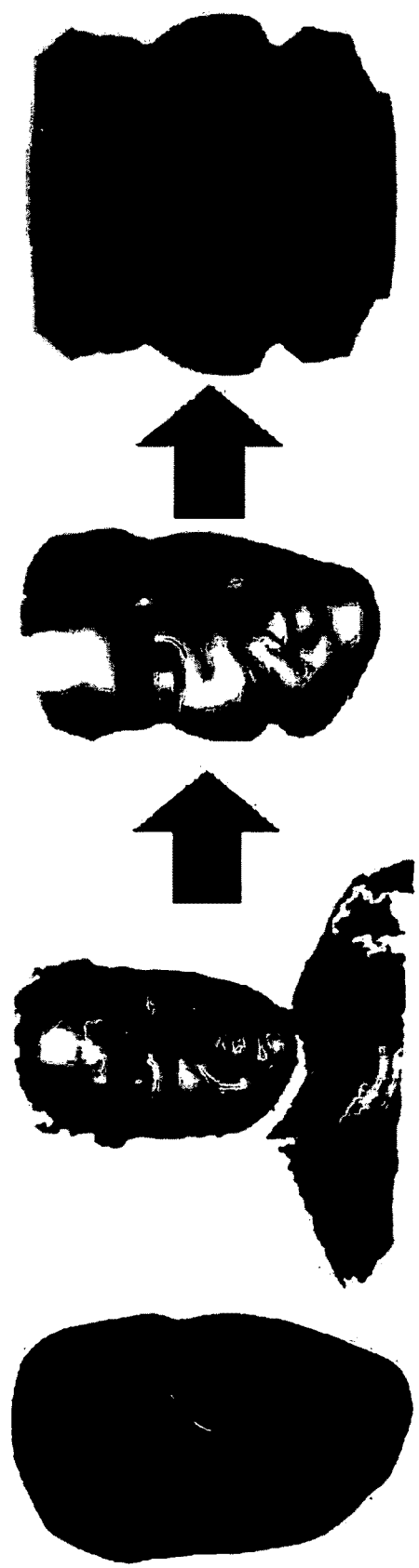

FIG. 16A depicts an annotated Face Model.

FIG. 16B depicts raw data→Fitted AFM→Resulting geometry image.

Figure 17:
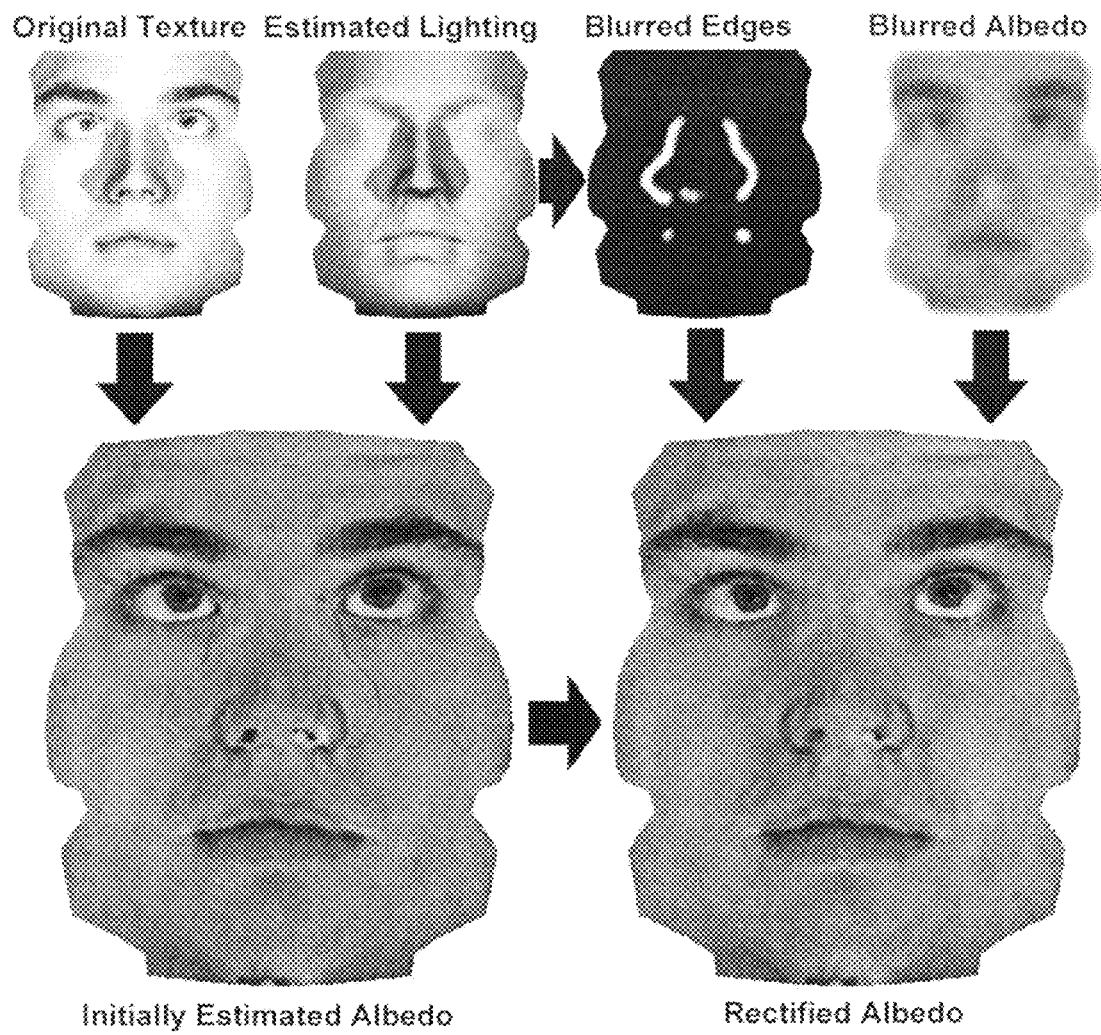

FIG. 17 depicts an overview of albedo estimation.

FIGS. 18A-F depict handling of over-saturated images: (a) Input mesh acquired from a 1-pod active stereo system; (b) Fitted model; (c) Estimated albedo; (d) Corresponding estimated specular component; (e) Specular components restricted to the areas known to have specular components in the UV space of the model (e.g., we do not want to have a high specular response in the eye region or the mouth); (f) Inpainting with texture synthesis [11] of the masked specular component and blending with the estimated albedo.

FIGS. 19A-F depict relighting for two different persons: (a,d) Raw geometry and texture; (b,c,e,f) Processed geometry and texture under varying lighting conditions.

FIGS. 20A-E depict Texture swap between real faces (a) and (b) resulting in (c) and (d). Face synthesis of real faces (a) and (b) resulting in synthetic face (e).

FIGS. 21A-D depict (a,b) Neutral and smiling datasets of first person; and (c,d) Neutral and synthesized smiling datasets of the second per-son.

FIGS. 22A-F depict albedo estimation validation using a hemisphere and a face rendered with a wood texture and lit by one Lambertian light. Albedo used for the hemisphere (a) and face (d). "Baked" wooden texture corresponding to the hemisphere (b) and face (e). Estimated albedo for hemisphere (c) and face (f).

FIGS. 23A-F depict comparison between the textures and estimated albedo for three illumination conditions. (a-c) Texture rendered on fitted AFM, and (d-f) Estimated albedo.

Figure 24:
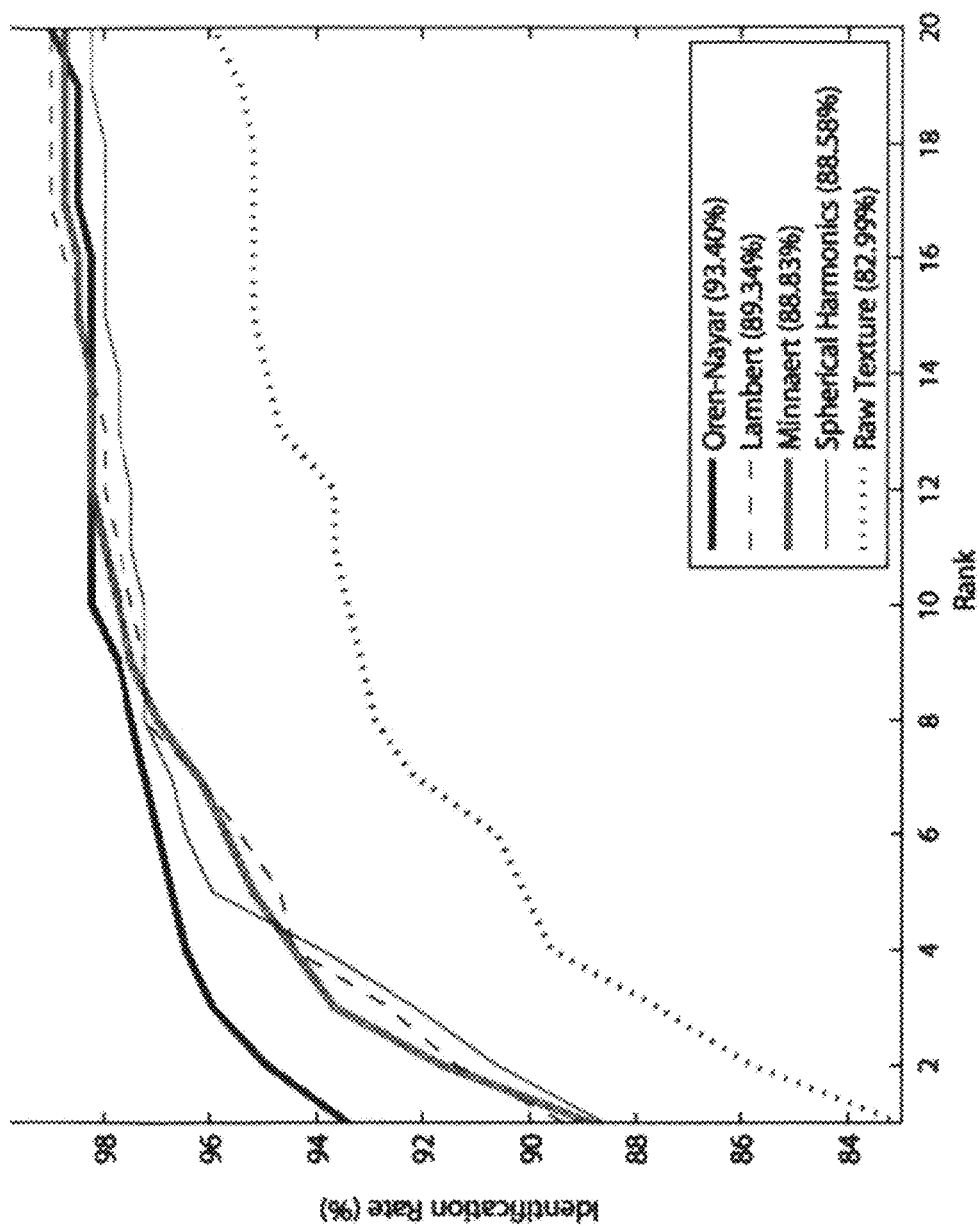

FIG. 24 depict CMC graphs for various BRDFs on Database A.

Part III Figures

Figure 25:
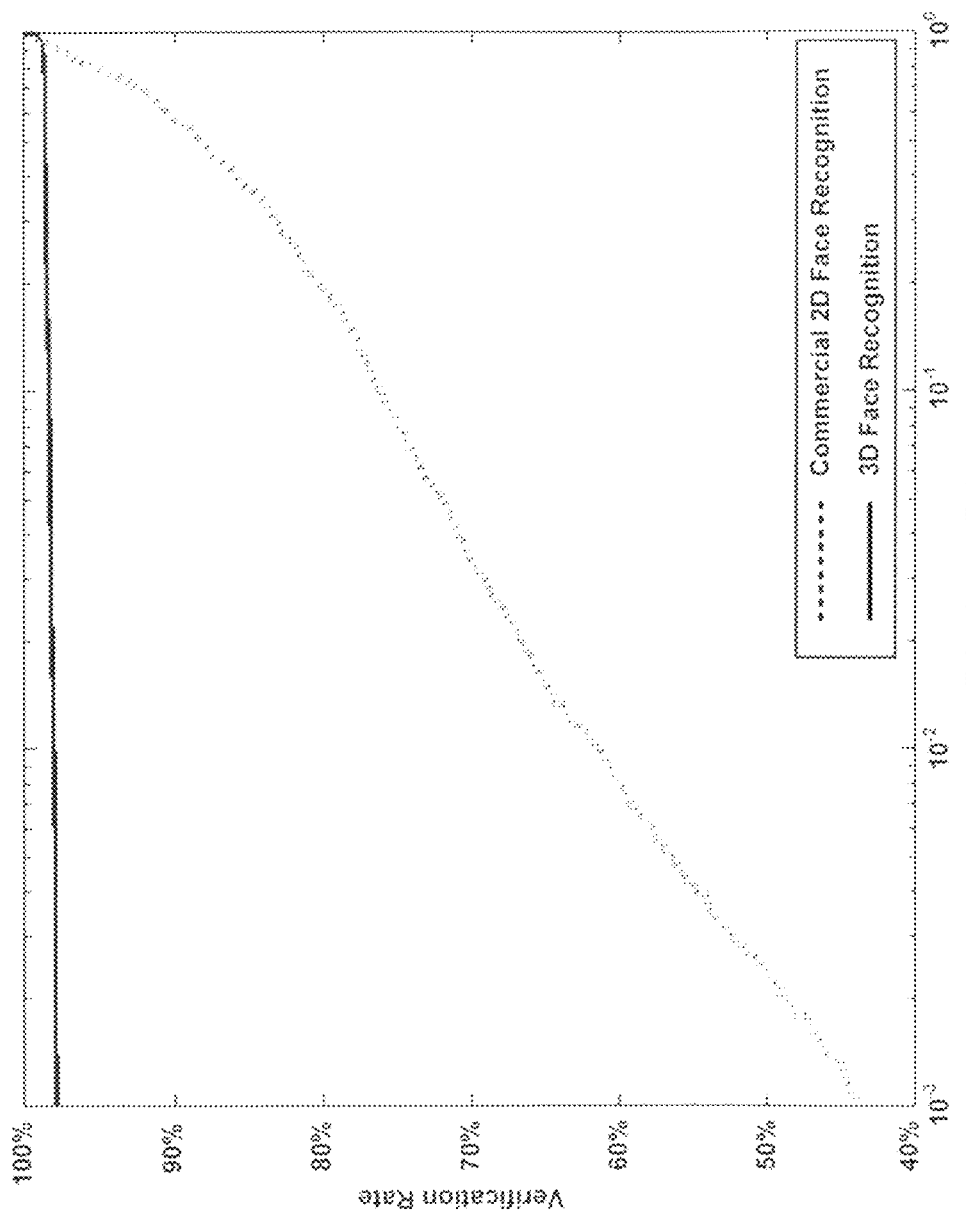

FIG. 25 depicts performance of a 3D Face Recognition Algorithm vs. a Leading 2D Face Recognition Vendor Product on a database containing large pose and illumination variations, corresponding to uncooperative subjects and/or field illumination conditions.

Figure 26:
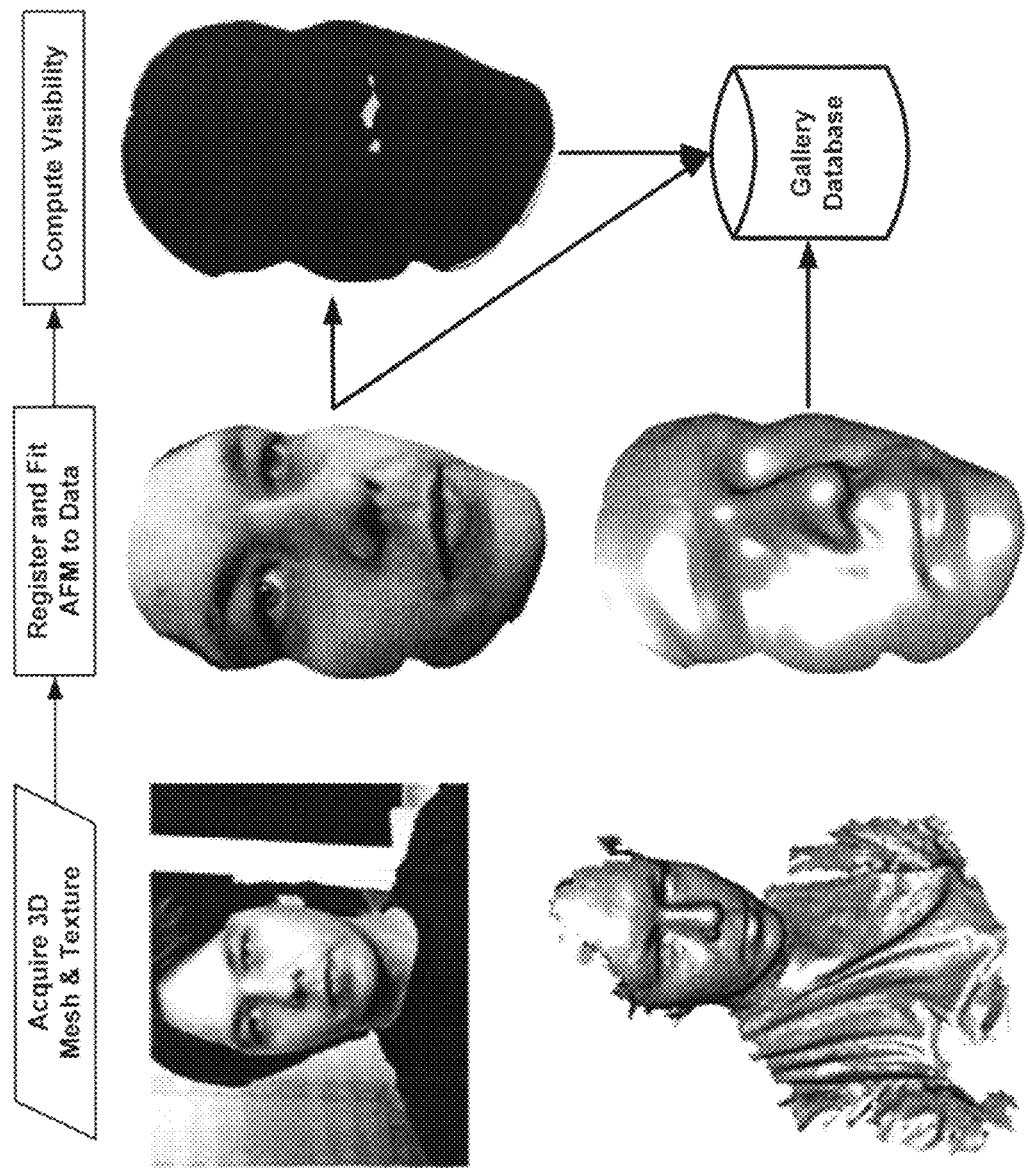

FIG. 26 depicts depiction of the enrollment procedure for our 3D-aided 2D face recognition system. The first column depicts the input data while the second column depicts the fitted AFM with texture in the top and without texture on the bottom.

Figure 27:
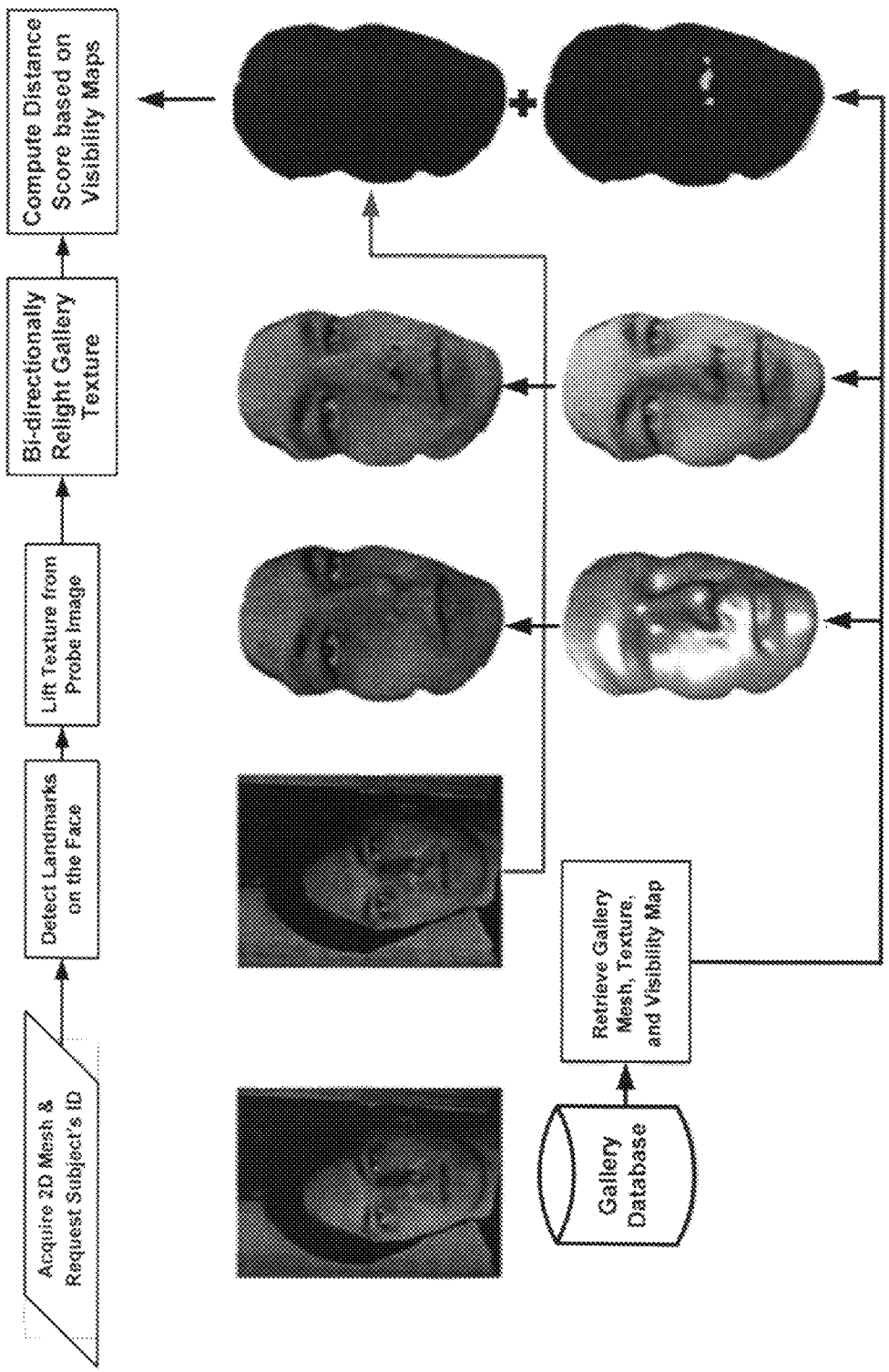

FIG. 27 depicts the authentication phase of the 3D-aided 2D face recognition system.

Figure 28:
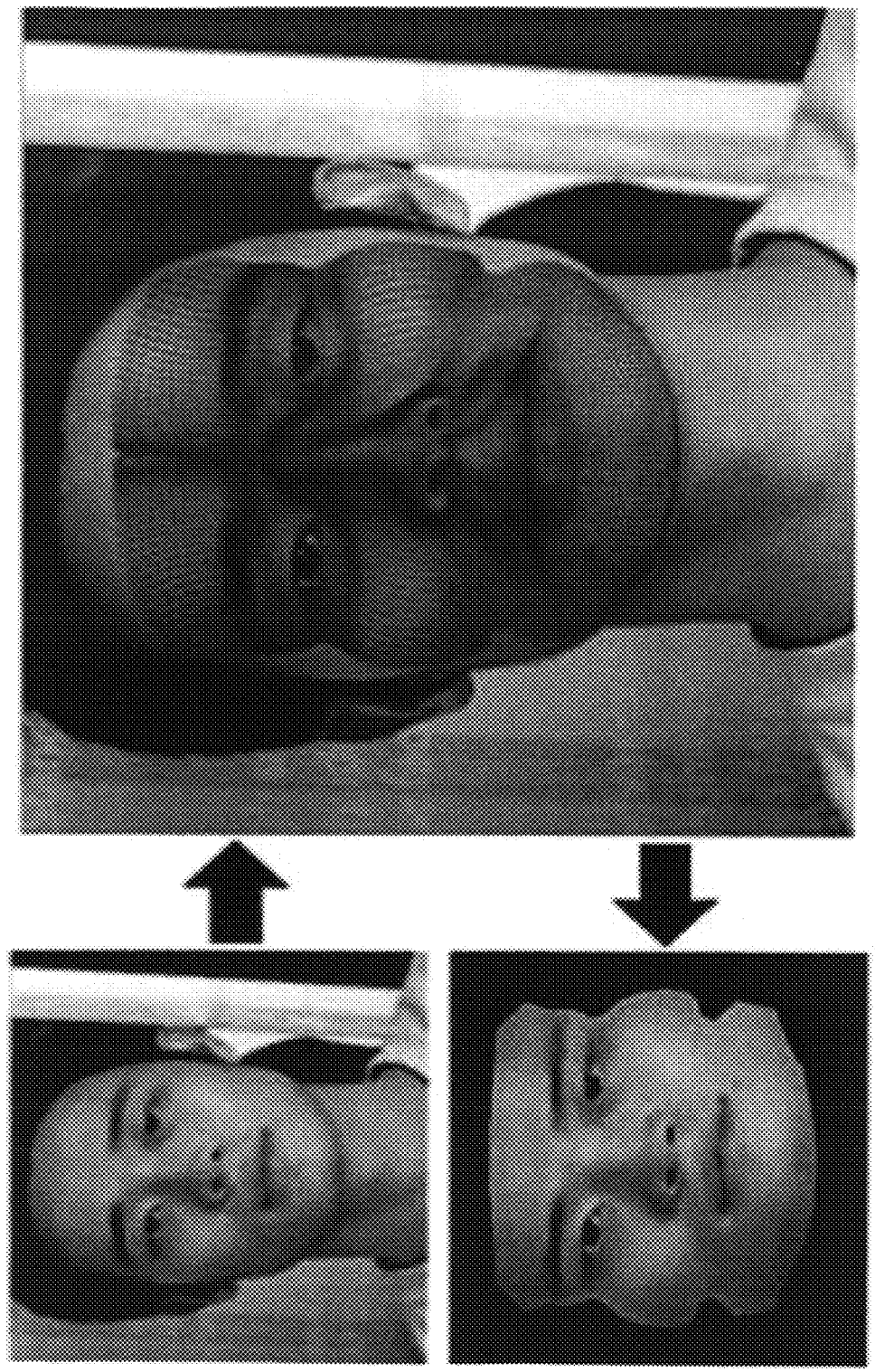
Figure 29A:
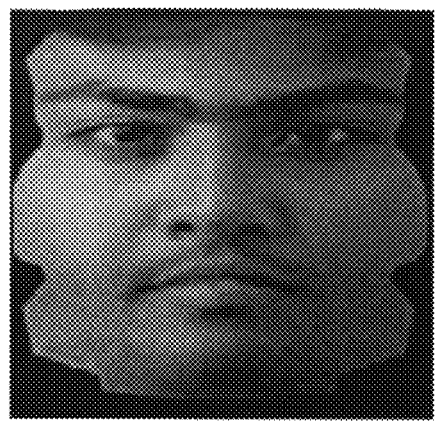
Figure 29B:
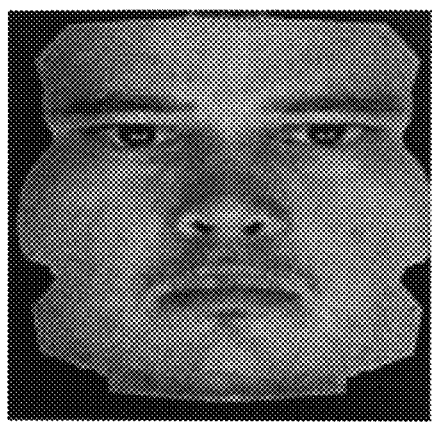
Figure 29C:
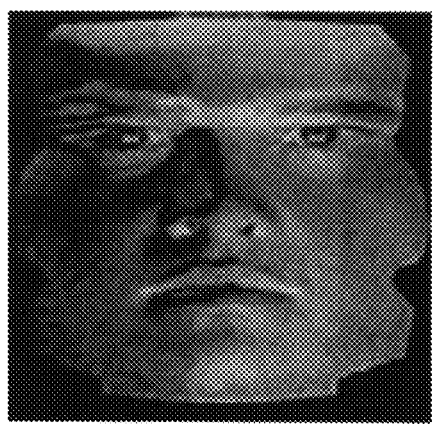
Figure 29D:
Figure 29E:
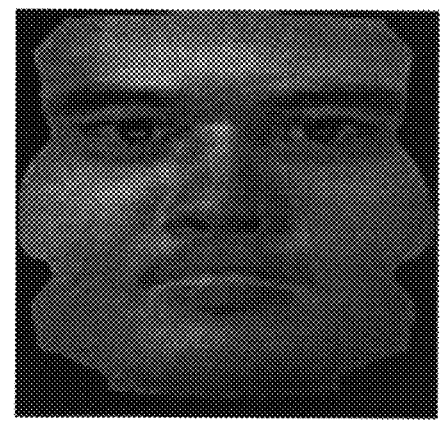

FIG. 28 depicts converting raw 2D images to textures in geometry image space: Raw 2D image→Fitted AFM of the same subject registered and superimposed over the image→Image converted to texture in geometry image space. The conversion is done by matching a set of three landmarks on the AFM and on the 2D image.

FIGS. 29A-E depicts Optimization for relighting (textures are in geometry image space): (A) Texture of subject A; (B) Texture of subject B; (C) Texture difference between subjects (before optimization); (D) Texture difference between subjects (after optimization); and (E) Subject B with subject's A illumination.

FIGS. 30A-F depicts Bidirectional relighting for a specific subject: (A) Real texture 1 (RT1); (B) Real texture 2 (RT2); (C) Synthetic texture 1 (ST1): RT1 with RT2's illumination; (E) Synthetic Texture 2 (ST2): RT2 with RT1's illumination; (C) RT1 minus ST2; (F) RT2 minus ST1.

Figure 31A:
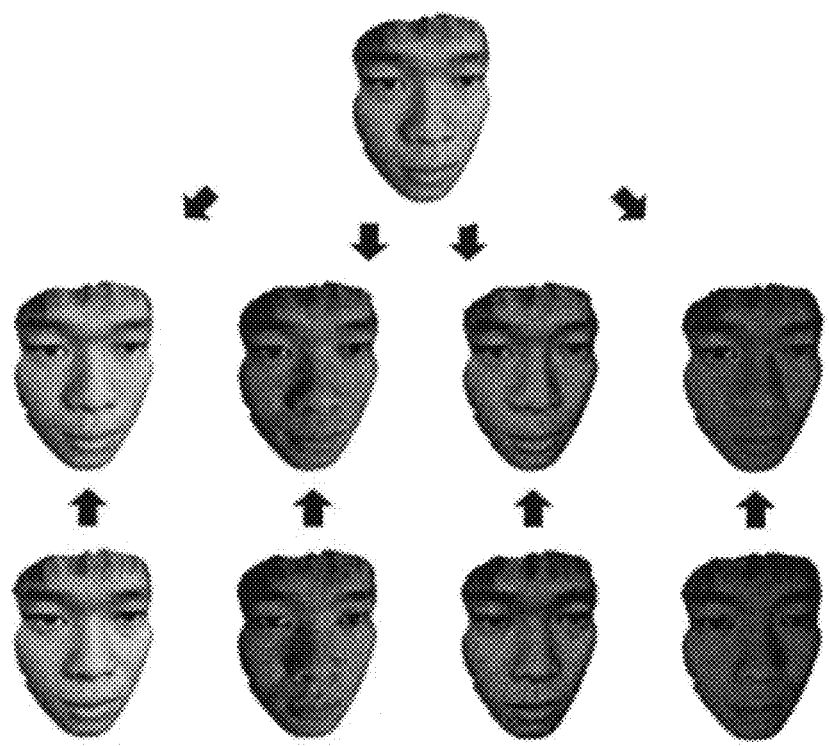
Figure 31B:
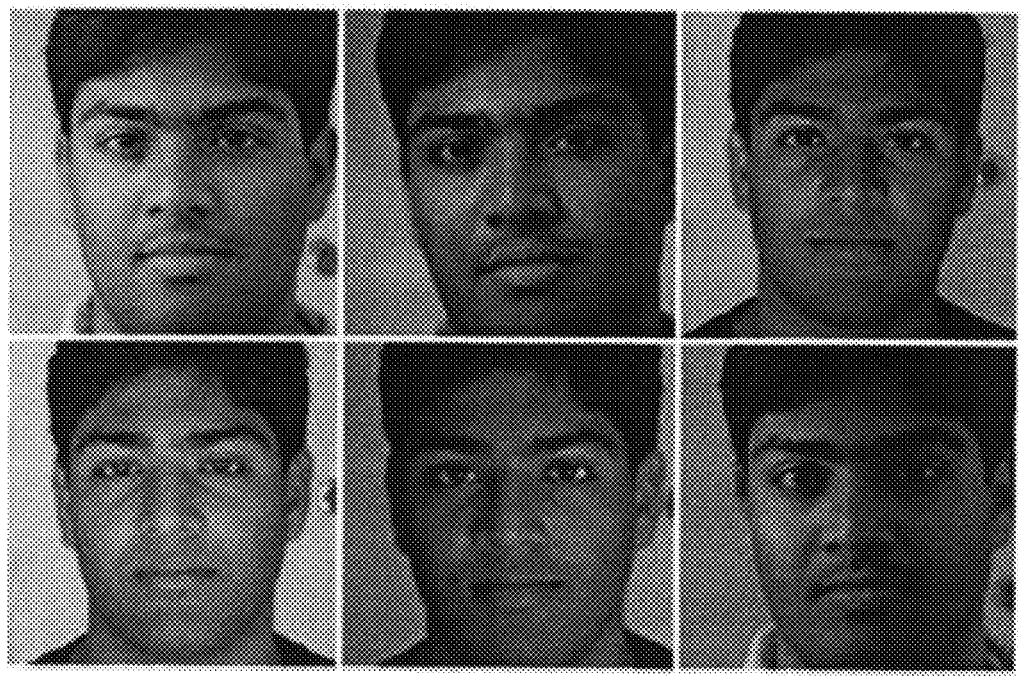

FIGS. 31A & B depicts (A) Multiple relighting: source texture is depicted on top row; destination textures are depicted on bottom row; synthetic relighted textures are depicted n middle row. (B) Sample dataset from Database A: Six 2D images captured with varying lighting conditions for the same subject.

Figure 32:
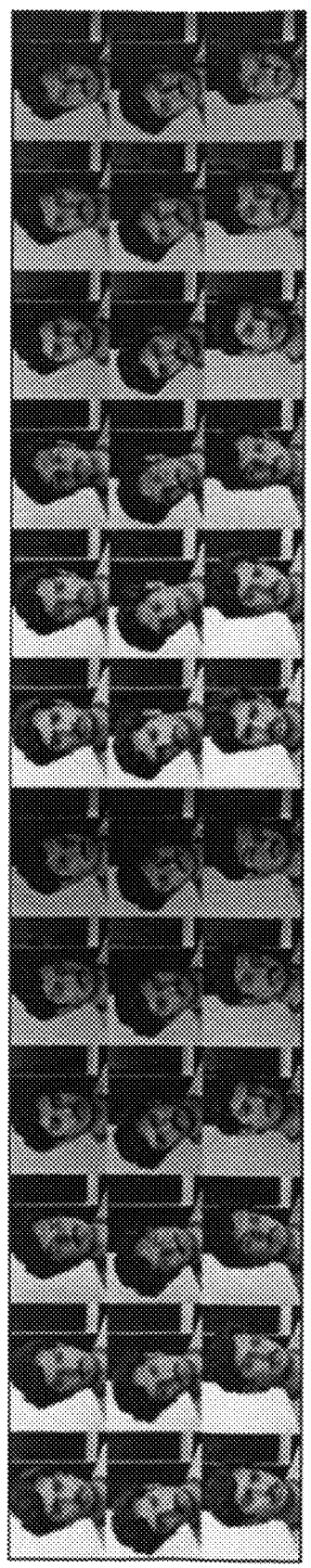

FIG. 32 depicts Database B: Thirty-six of the seventy-two 2D datasets which we acquired for each subject. Note the variation in lighting and pose.

Figure 33:
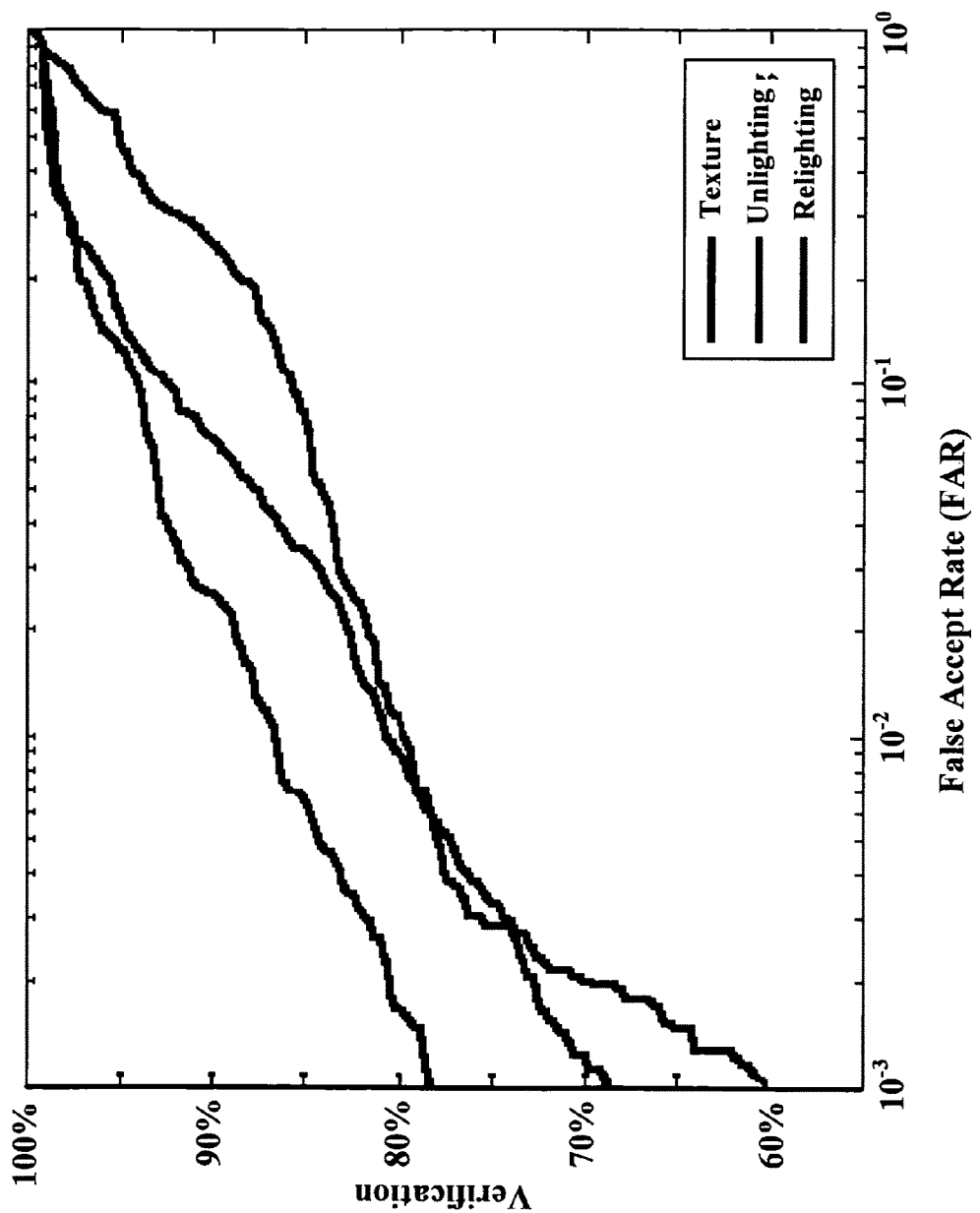

FIG. 33 depicts ROC curve for verification experiment on Database A (varying illumination).

Figure 34:
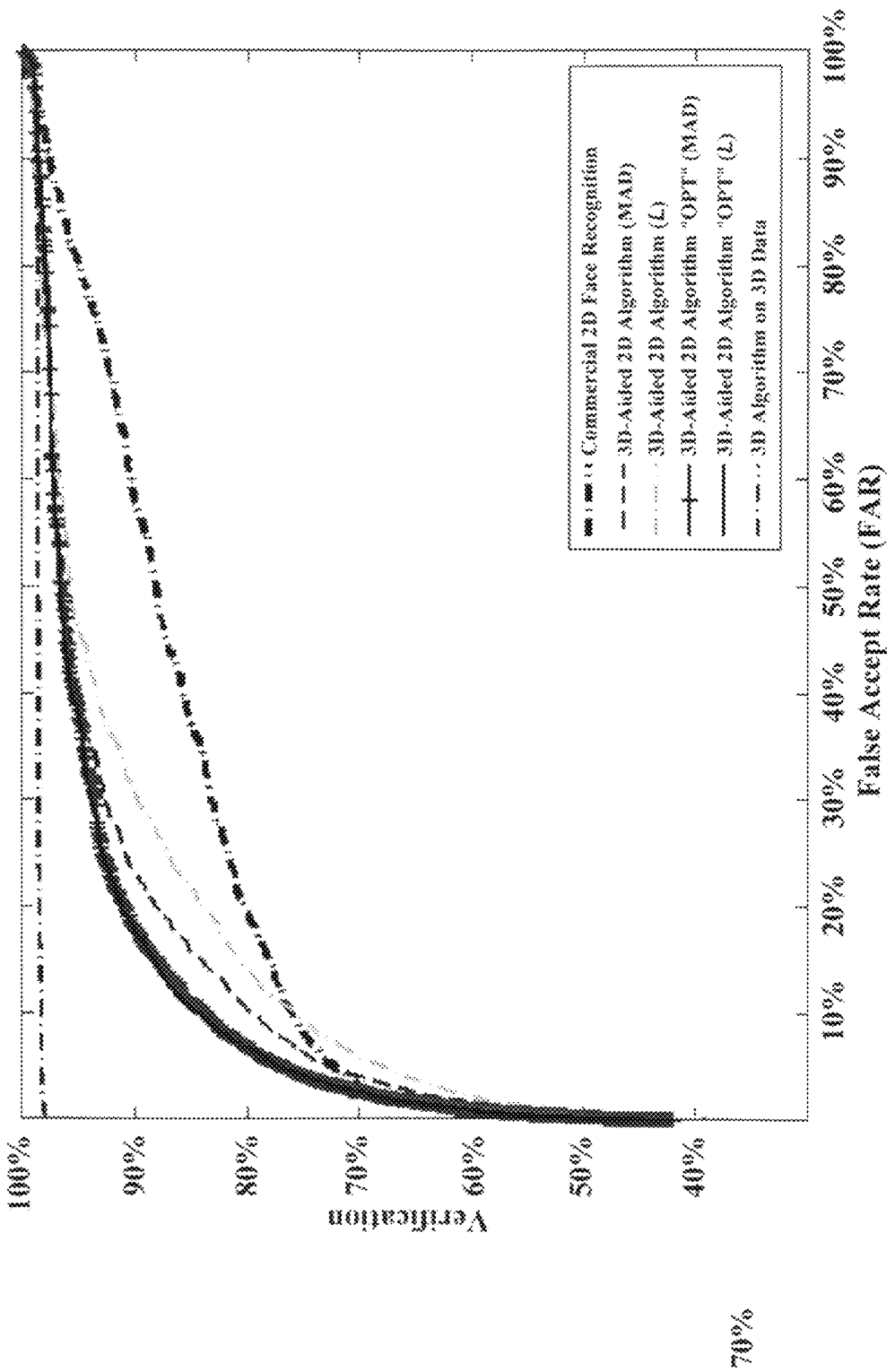

FIG. 34 depicts ROC curve for verification experiment on Database B (varying illumination and pose). This shows that the Equal Error Rate the 3D-aided 2D face recognition algorithm achieves is half of the leading commercial product available at this time. The results denoted by "OPT" use the view-dependent CW-SSIM.

Figure 35:
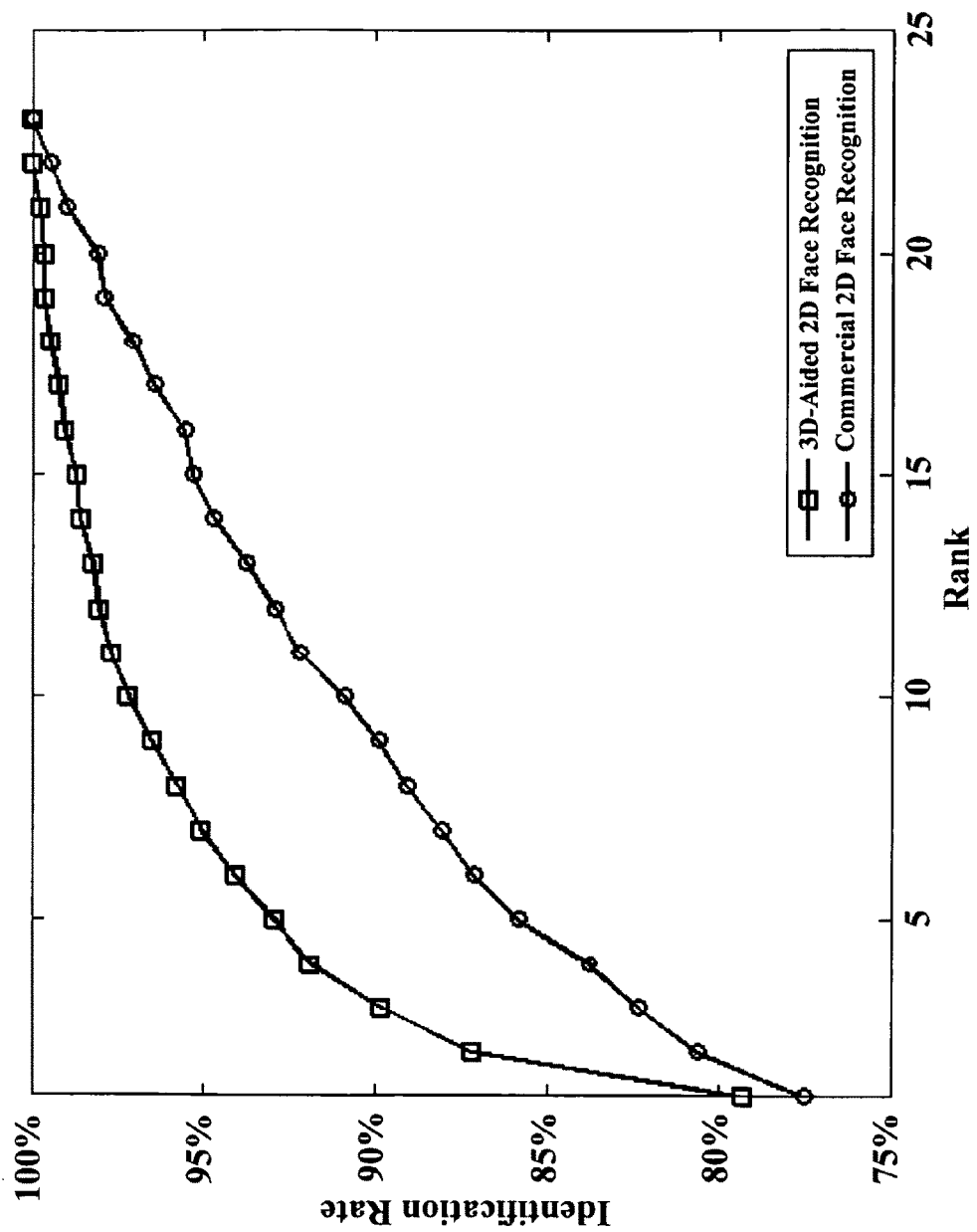

FIG. 35 depicts identification performance of the 3D-aided 2D face recognition approach versus the performance of one of the leading commercial 2D face recognition products. The results are reported on Database B.

DETAILED DESCRIPTION OF THE INVENTION

The inventors have found that a novel method for 3D-aided 2D face recognition under large pose and illumination changes can be constructed. Specifically, the novel method employs 3D data or 3D derived from 2D data for enrollment and 2D data for verification/identification. During the enrollment process, the raw subject 3D data or raw 3D derived data from 2D data are fit using a subdivision-based deformable model framework. During authentication, only a single 2D image is required. The subject specific fitted annotated face model from a gallery is used to lift a texture of a face from a 2D probe image, and a bidirectional relighting algorithm is employed to change the illumination of the gallery texture to match that of the probe. Then, the relit texture is compared to the gallery texture using a view-dependent complex wavelet structural similarity index metric. The inventors have shown that using this approach yields significantly better recognition rates, with an equal error rate (EER) which is less than half (12.1%) of the best performing, commercially available 2D face recognition software.

Part I of the Detailed Description of the Invention

I.1. Background and Significance

Biometric technologies have gained popularity in enabling a variety of applications that require identity management. Face recognition is the most attractive biometric, because it can be done passively and unobtrusively at a comfortable distance. Automated biometric systems are indispensable in applications requiring physical and/or logical access (e.g., searching for an individual in a large area covered by surveillance video cameras, identification system controlling a gate, drive-by identification of an individual using face profile, authenticating login personnel at a secure workstation). Biometrics can be used in constrained environments that would allow for the use of an authentication station capable of capturing the face of an individual and verifying their identity, or in unconstrained environments addressing wide-area coverage where video surveillance is possible, but the use of an authentication station is infeasible.

A broad range of face recognition systems have been developed for either situation over the last few years. Most facial recognition systems suffer from real or perceived weaknesses in three areas: 1) accuracy, 2) speed, and 3) ease of use. High false accept/reject rates, suboptimal response time scaling with database size, and strict pose/illumination acquisition requirements have resulted in poor acceptance rates for current automated face recognition biometric systems.

Figure 1:
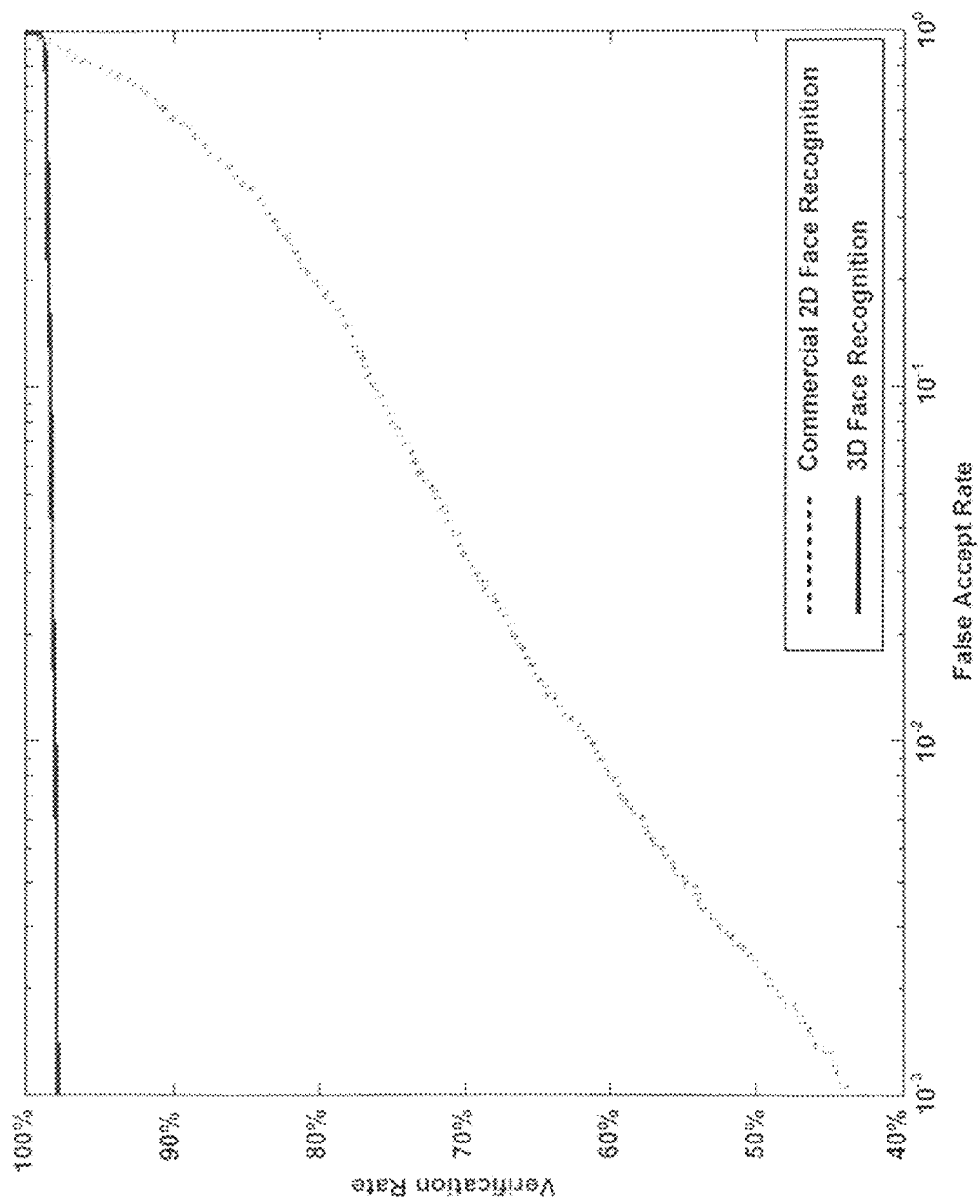
FIG. 1 depicts performance of a commercial 2D face recognition system vs. our 3D face recognition system on challenging data.

Broadly, face recognition is one of the most widely researched topics in computer vision. The popularity of this topic is related to its difficulty. In the general case, 2D images may be affected by varying illumination conditions, change in pose, and poor image quality (e.g., blurry images). Many algorithms have been proposed that provide satisfactory performance under constrained conditions, but none has managed to achieve high recognition rates under unconstrained pose and illumination conditions. Three-dimensional (3D) face recognition does not suffer from these problems. For example, our 3D face recognition approach[1] easily outperformed one of the best commercial 2D face recognition packages (at Face Recognition Vendor Test, FRVT 2006) on the same data with large changes in both pose and illumination as shown in FIG. 1. We believe that by exploiting recent research results, it is possible to improve those parts of face recognition that are deficient and rigorously test the improved technology in applications related to the activities of the Department of Defense (DoD).

The Face Recognition Vendor Test (FRVT) 2006, organized by the National Institute of Standards and Technology (NIST)[2-4], explored the feasibility of using 3D data for both enrollment and verification. The algorithms using 3D data have demonstrated their ability to provide good recognition rates. However, for practical purposes, it is unlikely that large-scale deployments of 3D systems may happen in the near future, due to the high cost of the hardware. On one hand, 2D face recognition systems lack the accuracy required of high security installations, as they can be fooled by differences in pose and illumination; while, on the other hand, 3D face recognition systems, such as the one developed by our team, possess the accuracy, but involve expensive sensors. Thus, there is a technology gap between these two types of systems.

Our invention was designed to bridge this gap. For example, it is not unreasonable to assume that institutions may want to invest in a limited number of 3D scanners, if having 3D data for enrollment can yield high recognition rates when using 2D images. In addition, recent research has demonstrated the ability to generate 3D models from 2D images. This demonstration relaxes the requirements for 3D scanners and opens up the possibility of using 2D sensors to generate 3D face models. Further, this also increases the flexibility of face recognition systems, because enrollment of individuals to a watchlist can happen without the physical presence of the individual being enrolled. This would be critical for biometric systems in wide-area monitoring applications.

We have developed a 3D facial recognition system over the past four years at the University of Houston (for additional details see U.S. patent application Ser. No. 10/923,982, incorporated herein by reference) and have extended it so that it works with 3D data for Enrollment and 2D data for Identification in order to improve its cost-effectiveness.

Our invention is a biometric system based on face recognition that provides a reliable, robust and cost-effective solution for the identification of both cooperative and uncooperative individuals. The term "uncooperative" means that the subject does not have to or will not assume an expression-free state, nor does s/he have to assume a frontal pose; the system is able to handle facial expression variations and pose variations as well as lighting variations.

The invention has two components: a system for enrollment to a watchlist (URxD-E) and one (or more) identification stations (URxD-I). The subsystem for enrollment into the watchlist can be used to enroll individuals into a database so that they can be identified from an identification station. The enrollment subsystem includes a module capable of generating a personalized 3D face model based on 2D images (see Section I.3.1.1.b) for cases where the individuals to be enrolled are not available. It also include another module that accept image data from a 3D scanner (see Section I.3.1.1.a). These 3D models are processed to extract a unique biometric signature for an individual. The identification station(s) use data from 2D visible spectrum cameras. These 2D images are processed to extract a biometric signature that is compared with biometric signatures in the watchlist database. In general, there only needs to be a single watchlist enrollment system at a facility and a plurality or multitude of identification stations.

The advantages of the system are:
i) It is an extension of our successful 3D/3D method for verification and identification[1,5-9] and of our 3D-Aided 2D Face Authentication[10,11]. This allows us to utilize our know-how on the problem and enables us to minimize risk.
ii) It is cost-effective without compromising accuracy. Our 3D face recognition algorithm has already taken part in the Face Recognition Grand Challenge (FRGC) and the FRVT[2-4], both organized by NIST. Currently, our system demonstrates the highest verification rates of all the published results on the FRVT database, in the 3D-only face recognition experiment.
iii) 3D-Aided 2D face authentication in laboratory testing has been proven to be robust to both pose and lighting variations.
iv) It offers excellent scalability with database size, because we are using very compact biometric signatures.

I.1.1 Demonstration Scenario

Figure 2A:
FIGS. 2A & B depicts an examples of surveillance of a wide area using multiple cameras.
Figure 2B:

Our face recognition system can identify enrolled subjects in a crowded meeting environment as shown in FIG. 2.

I.1.2 Other Scenarios

Figure 3A:
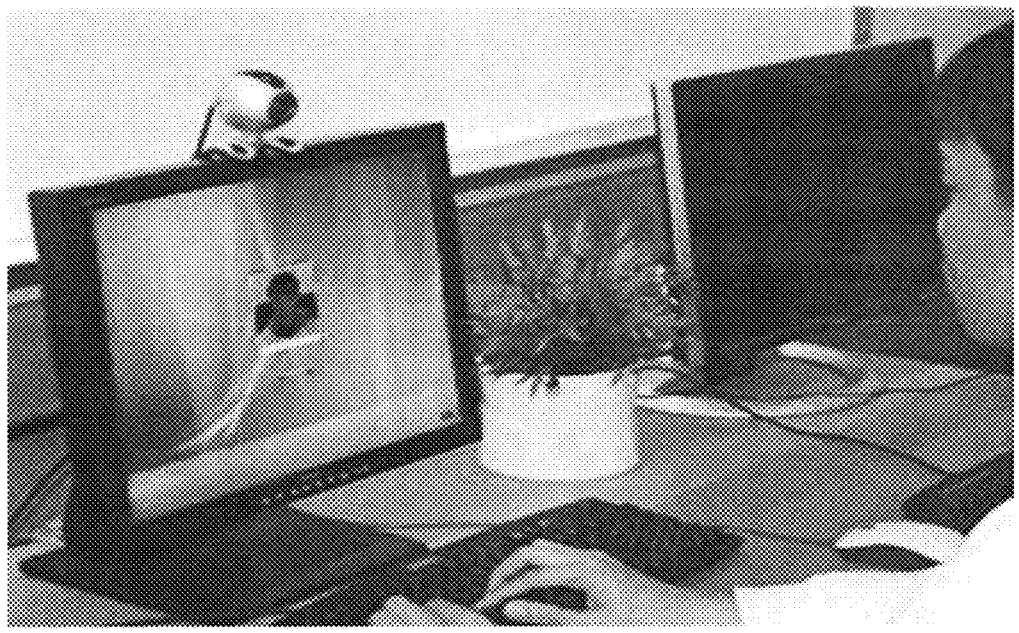
FIGS. 3A & B depicts examples of logical and physical Access control where our system can be deployed with small modifications.
Figure 3B:

Our biometric system is modular in its framework and hence enables a variety of applications requiring physical and logical access control as shown in FIG. 3. In addition, it can handle both verification and identification of cooperative or uncooperative individuals. An imaging kiosk capable of acquiring frontal face images would facilitate physical access control for secured rooms. On the other hand, physical access to a base or a controlled outdoor facility accessible by vehicular traffic would use an imaging kiosk that would acquire profile images of the personnel requesting access[12]. Since our system uses 3D models to process 2D images, large pose variations can be managed without performance degradation. Hence, the same system can handle both frontal and profile images. In the case of wide-area monitoring of secure perimeters, video cameras distributed across the area to be monitored would be used to detect and identify faces. All faces detected would be screened across the enrollment database to detect the presence of any unauthorized personnel or to track ingress and egress of authorized personnel. Finally, in the case of logical access control to laptops or workstations, a single web-camera placed on top of the monitor facing the user would provide frontal images for authentication purposes. In addition to authenticating an individual during login, continuous monitoring can also be performed to ensure continued authority to use the laptop or workstation. In any of these applications, the same algorithm base is used with the difference arising in the authentication system.

I.1.3 Research

Our laboratory tests have shown that 2D face recognition using 3D models can provide an accurate and robust solution to the problem of identification of cooperative and uncooperative individuals.

I.3. System and Methodology

I.3.1. Robust, Accurate, and Cost-effective 2D Face Recognition System

Figure 4A:
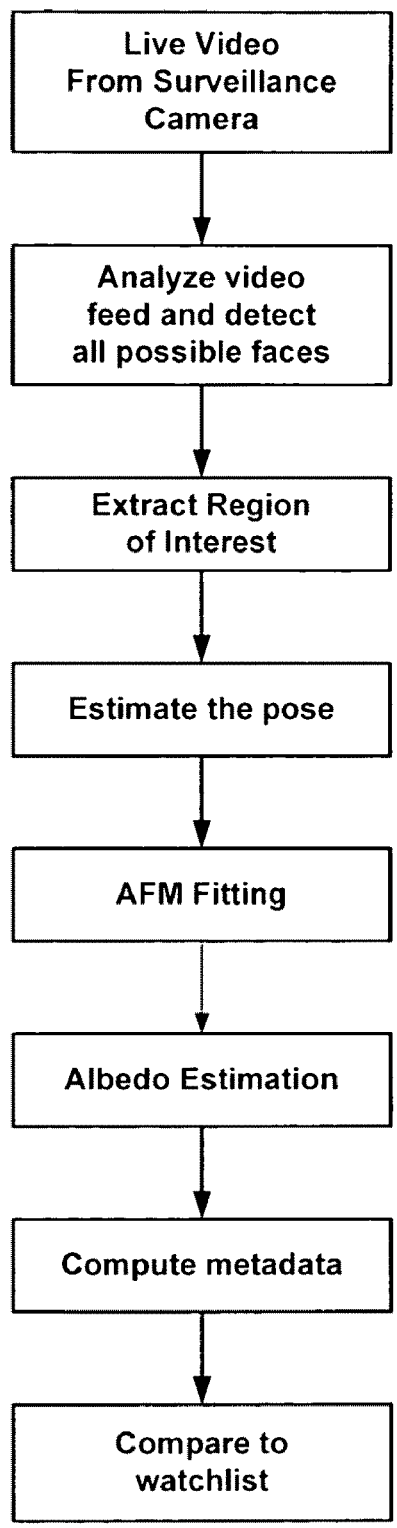
FIGS. 4A & B depicts an open-set identification of subjects using the watchlist database in a surveillance scenario.
Figure 4B:
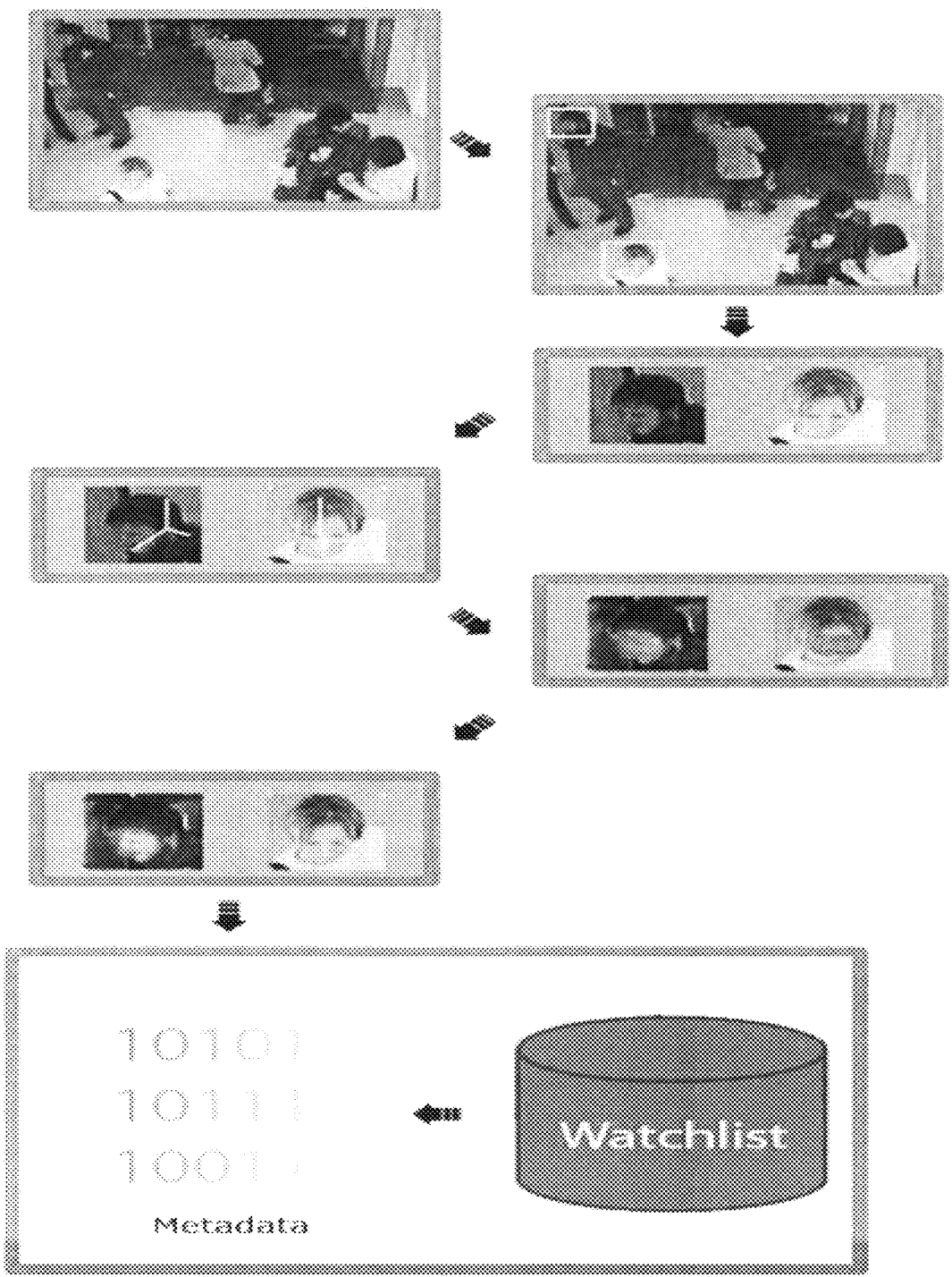

To provide high accuracy and robustness at low cost, a novel approach for face recognition from surveillance video has been developed. There are two components to the overall system; one addressing the enrollment of a subject in a biometrically-enabled watchlist database and the other responsible for analyzing live video from surveillance cameras to detect and localize faces, and perform face recognition based on signature matching with those in the database as shown in FIG. 4. This process is common for all open set identification (watchlist) modules of surveillance systems and various approaches have been developed for each of the two components.

In our system, we use an enrollment (URxD-E) station and an identification (URxD-I) station or a plurality of identification stations (in the following when we refer to identification, we refer to open-set identification). The URxD-I stations employ off-the-shelf 2D surveillance cameras, thus achieving an overall low cost for the entire installation of our system. We integrate a unified algorithm which make use of all the information available (2D and 3D), in order to overcome the current limitations of face recognition systems with respect to pose and illumination. The expected performance of the unified approach is comparable to that of a 3D/3D system at a cost comparable to that of 2D systems.

Our method takes into consideration the particularity of the application in order to be efficient, practical and low cost. More specifically, our hybrid 3D/2D face recognition method employs 3D data during enrollment (acquired or derived) and 2D data during identification. Our method first fits an Annotated Face Model to the 2D face image acquired from video data or other 2D imaging devices using a subdivision-based deformable framework. The pose of the 2D face is estimated and a geometric image representation is extracted using a UV parameterization of the model (a two variable parameterization of the model). An Analytical Skin Reflectance Model (ASRM) is then applied and an albedo is computed from the image. The matching score is computed using a biometric signature derived from the albedo image.

I.3.1.1. Watchlist Enrollment System

For identification purposes, a biometric signature of a subject to be identified needs to be enrolled in the watchlist database. This enrollment can happen physically or virtually. If the subject to be enrolled is present physically, their facial data can be captured using a 3D sensor (see Section M3.1.1.a). If the subject is not physically present, his/her biometric signature can be extracted from either a 2D image of his/her face (see Section I.3.1.1.b) or by selecting an optimal image from a video of the subject (see Section I.3.1.1.c). If the subject is physically present, it is best to capture his/her 3D facial data, because such data provide maximum invariance to pose and illumination changes. For cases where the subject is not physically present, but a 2D image or video footage is available, the subject enrollment is accomplished using software processing of the image or video data.

Watchlist Enrollment Hardware:

To enable enrollment of subjects that are physically present, the enrollment station is equipped with a 3D camera. In our laboratory, we own a 3D camera from 3dMD (<0.5 mm accuracy) that we use to test our method. Such 3D cameras are available from the following manufacturers: 3dMD of Atlanta, Ga., Surface Imaging International Ltd, etc. However, data from any other sensor can be used for enrollment. The 3D camera is able to function under a variety of environments, because it has its own flash and does not require additional lighting. In our method, the acquisition process is completely automated via software. The subjects only need to position themselves in front of the camera. The output of the sensor is a mesh capturing a geometry of the face and a texture image capturing the appearance (coloring) of the face. The hardware for the enrollment station is a commercial system with solid stability. We have tested the sensor under scenarios that required acquisition of up to 600 datasets per day without a problem.

I.3.1.1.a Watchlist Enrollment Software for 3D Data

Figure 5:
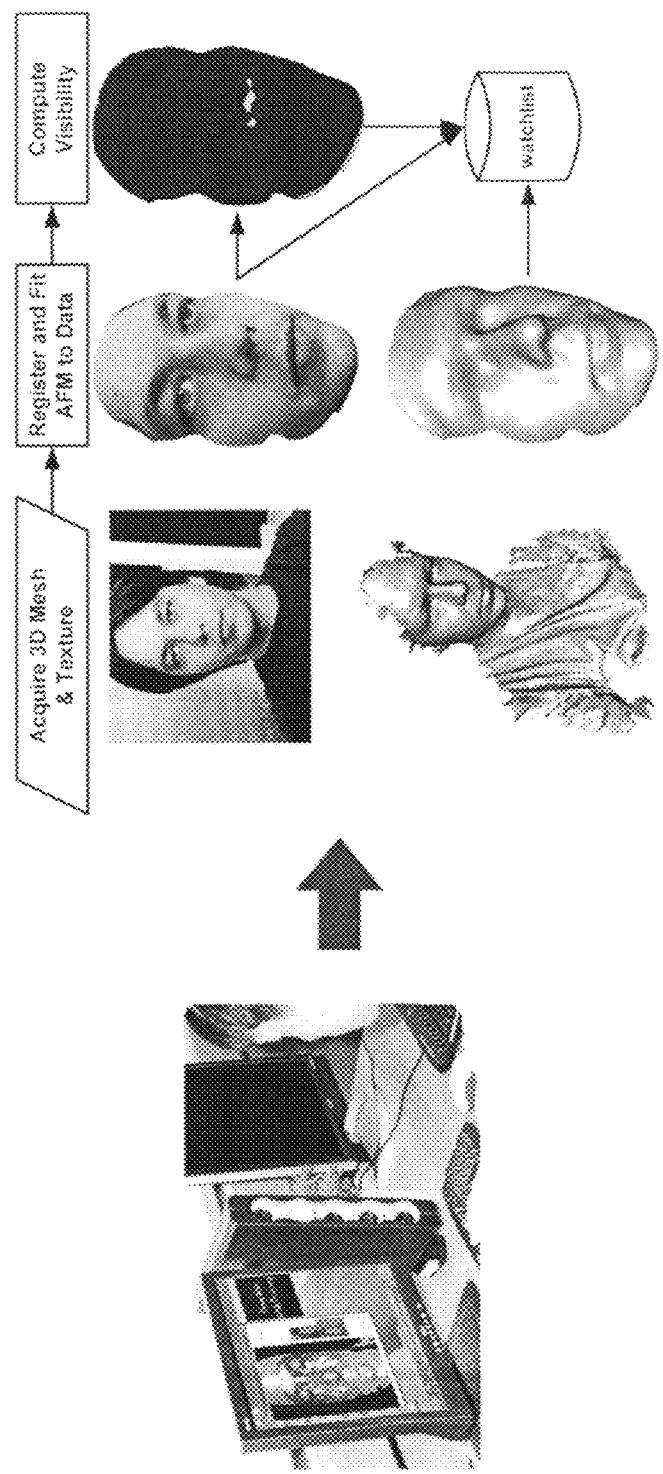
FIG. 5 depicts an enrolling subjects to the watchlist database using data from a 3D camera.

The enrollment (URxD-E) station software is responsible for automatic 3D facial data acquisition and for generating a unique identifier (metadata vector, biometric signature) for each enrolled subject. The current software or methodology implemented on a computer is based on our previous work on 3D face recognition [1]. We use the algorithms that we developed and tested on 3D data from the Face Recognition Grand Challenge[2-4] and our own database[6]. The processing pipeline of the URxD-E station is described in Algorithm 1 and is depicted graphically in FIG. 5.

Algorithm 1
Watchlist Enrollment for 3D Data

| | |
|---|---|
| Required | id ← New ID for the subject |
| Required | $D_{raw, id}$ ← Acquired 3D image |
| Required | $T_{id}$ ← Acquired texture |
| 1 | $D_{id}$ = preProcess($D_{raw,id}$) |
| 2 | ALIGN($D_{id}$, model) |
| 3 | $M_{id}$ ← fit(model, $D_{id}$) |
| 4 | $A_{id}$ ← estimateAlbedo($D_{id}$,$T_{id}$) |
| 5 | $S_{id}$ ← computeBiometricSignature($A_{id}$) |
| 6 | Store $A_{id}$, $M_{id}$, and $S_{id}$ into $DB_{id}$ |

Figure 6:
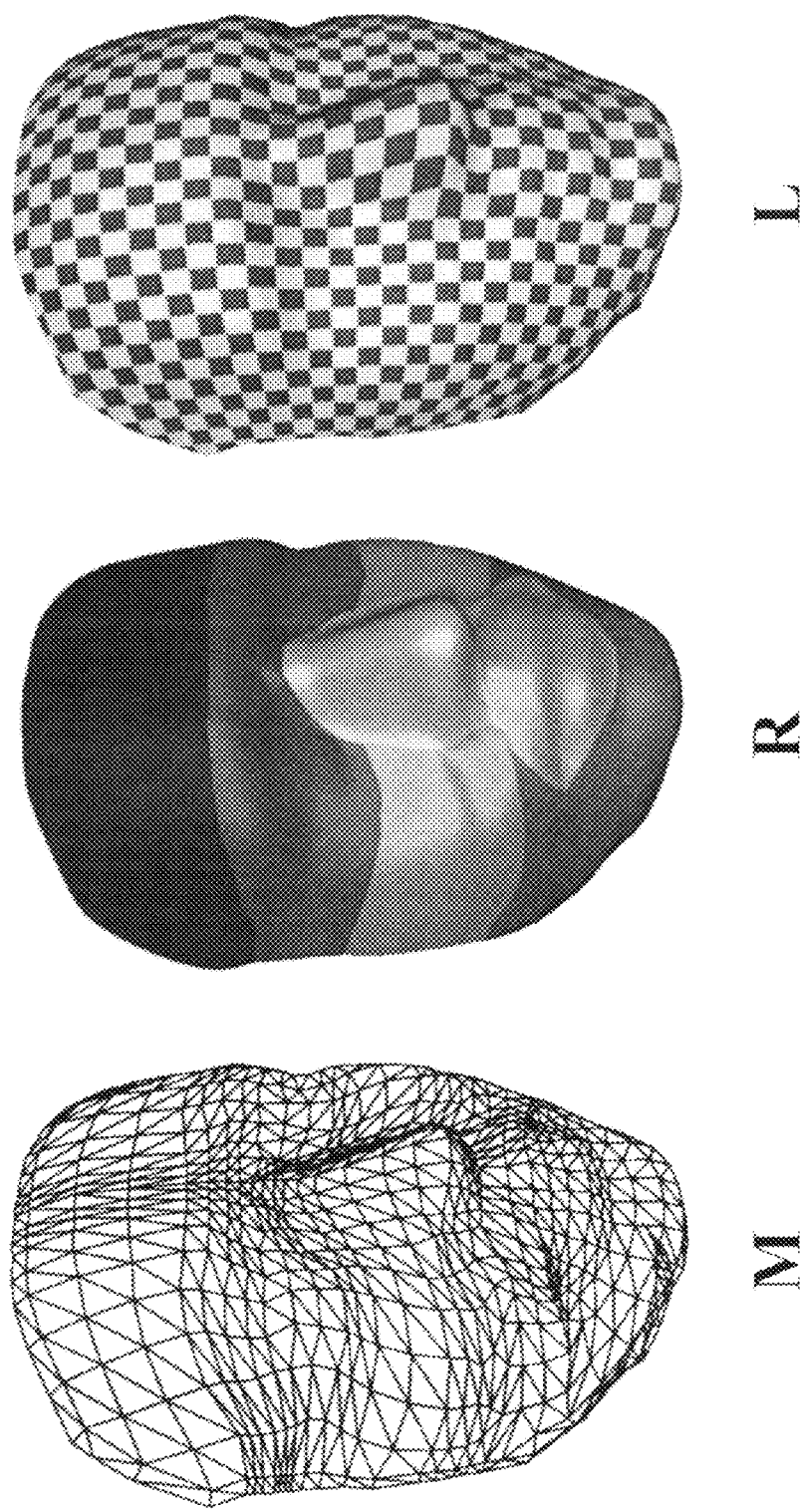
FIG. 6 depicts depiction of the generic Annotated Face Model. (L) Mesh, (M) Annotated areas, (R) Depiction of the UV parameterization. Any point on the three-dimensional surface can be expressed using 2 coordinates (u and v).

First, 3D facial data are acquired. The 3D data are then processed by a three-step approach to improve usability. We use an annotated face model (AFM) as shown in FIG. 6, which is an average 3D face model, statistically averaged 3D face model, to aid us in the following steps. The AFM is constructed only once. The AFM is a statistically formulated annotated face model that can be deformed into any facial type. The 3D data from stereoscopic sensors may exhibit artifacts that we remove.

In the Raw Data Preprocessing step, filters are applied in the following order: denoising, hole filling, smoothing, and sub-sampling. The first three alleviate scanner related artifacts, while the fourth is used to achieve greater efficiency in later processing stages, because the methodology of Algorithm 1 is not sensitive to the input data resolution.

Next, we have developed a multistage Alignment algorithm (ALIGN), which aligns the input facial 3D data to the AFM via deformation of the AFM. Each stage refines the output of the previous stage, but is more sensitive to local minima. The three alignment methods that we use are the following: spin images[23], iterative closest point (ICP)[24] and simulated annealing on depth images[6].

Figure 7:
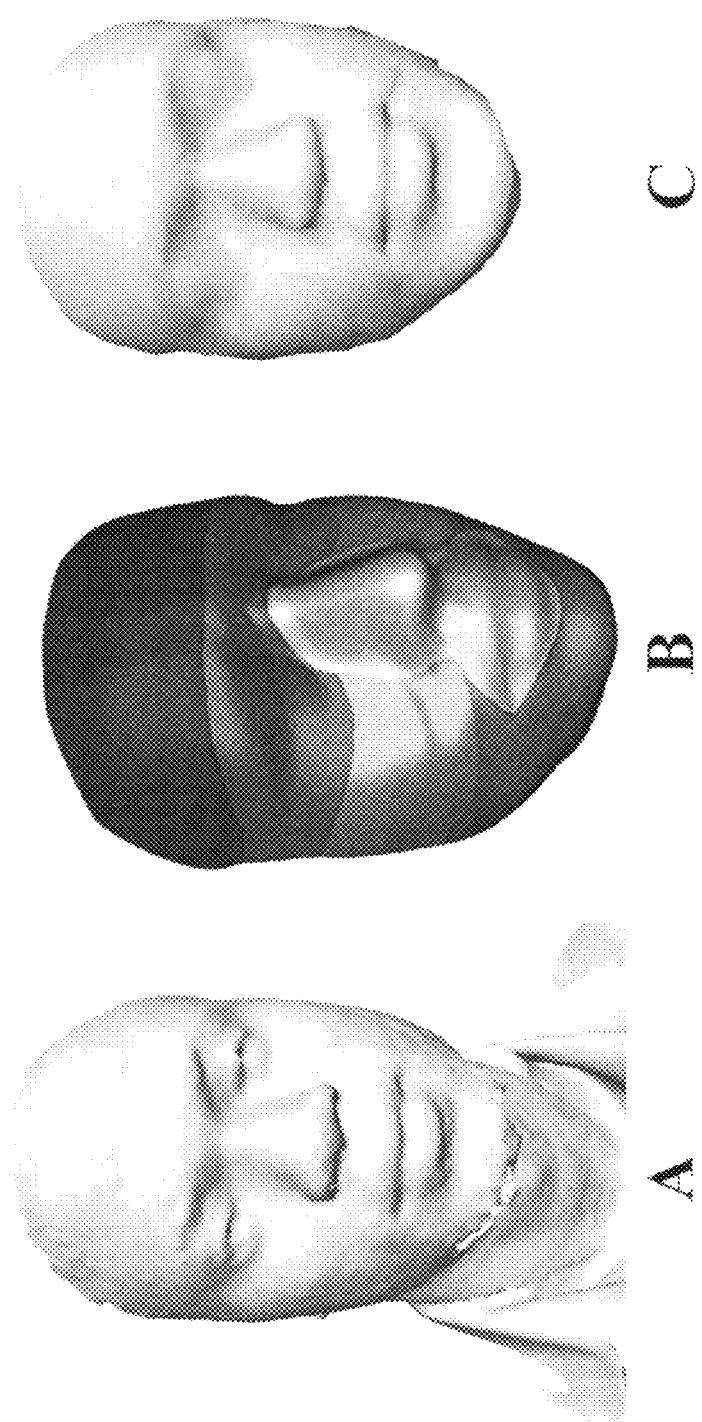
FIGS. 7A-C depicts (A) raw data; (B) AFM; (C) AFM fitted to the data from (A).
Figure 8:
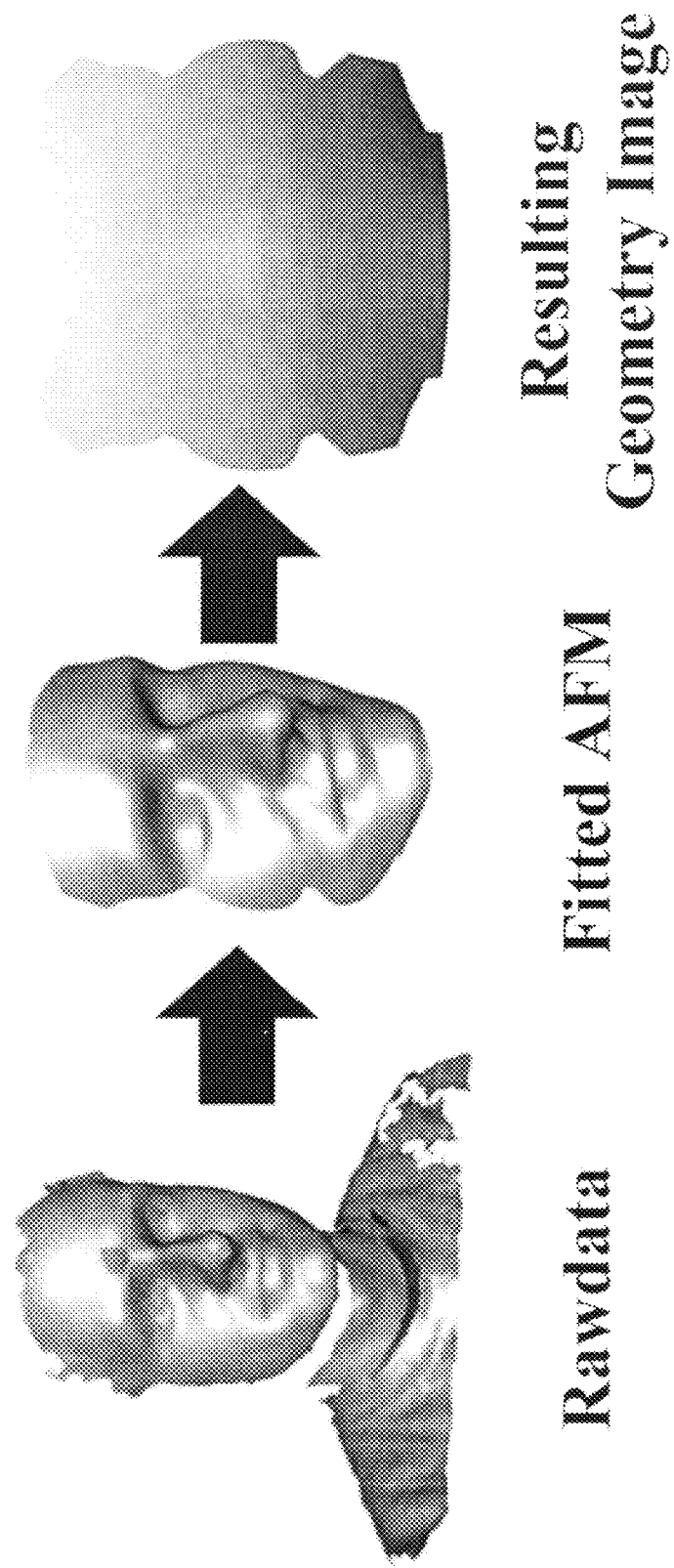
FIG. 8 depicts Rawdata→Fitted AFM→Resulting geometry image.

In the Deformable Model Fitting step the AFM is fitted to the data to capture geometric information of the individual's face as shown in FIG. 7. The elastically adaptive deformable model framework of Kakadiaris[25] is utilized. The main idea behind this framework is that all physical properties of a rigid or non-rigid object are analytically formulated and then an approximating solution is computed. Mandal et. al.[26-28] combined the deformable model idea with subdivision surfaces. Compared to parametric surfaces, subdivision surfaces [29] offer increased flexibility and computational efficiency. We have constructed a subdivision surface based on our AFM using Loop's scheme[30]. We use a geometry image representation for the fitted model as shown in FIG. 8.

Figure 9:
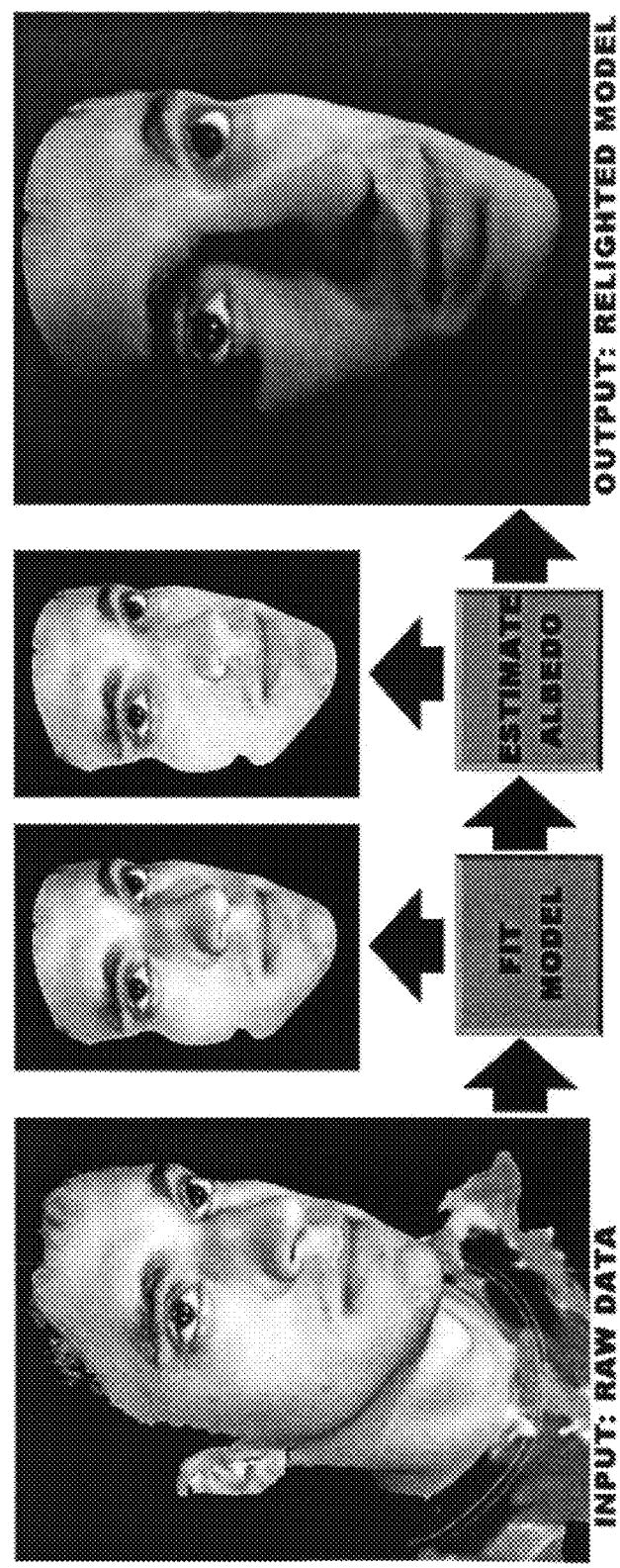
FIG. 9 depicts an albedo estimation pipeline overview: The raw geometry input from the 3D camera; AFM fitted to the input (notice the shadows); and AFM showing the estimated albedo (texture without shadows and lighting).

The Albedo Estimation step removes lighting from the facial image, retrieving the original color and making it invariant to lighting as shown in FIG. 9.

The Biometric Signature Extraction stage computes features that serve to create a unique descriptor for the subject (i.e., wavelet coefficients associated with the geometry image and the albedo image). The fitted 3D model, the albedo image, and the extracted features for this subject are stored into the watchlist or gallery database. Our methods make the metadata available through BioAPI, and the file structures used conform to the Common Biometrics Exchange File Format (CBEFF).

I.3.1.1.b Watchlist Enrollment Software for 2D Image

Figure 10:
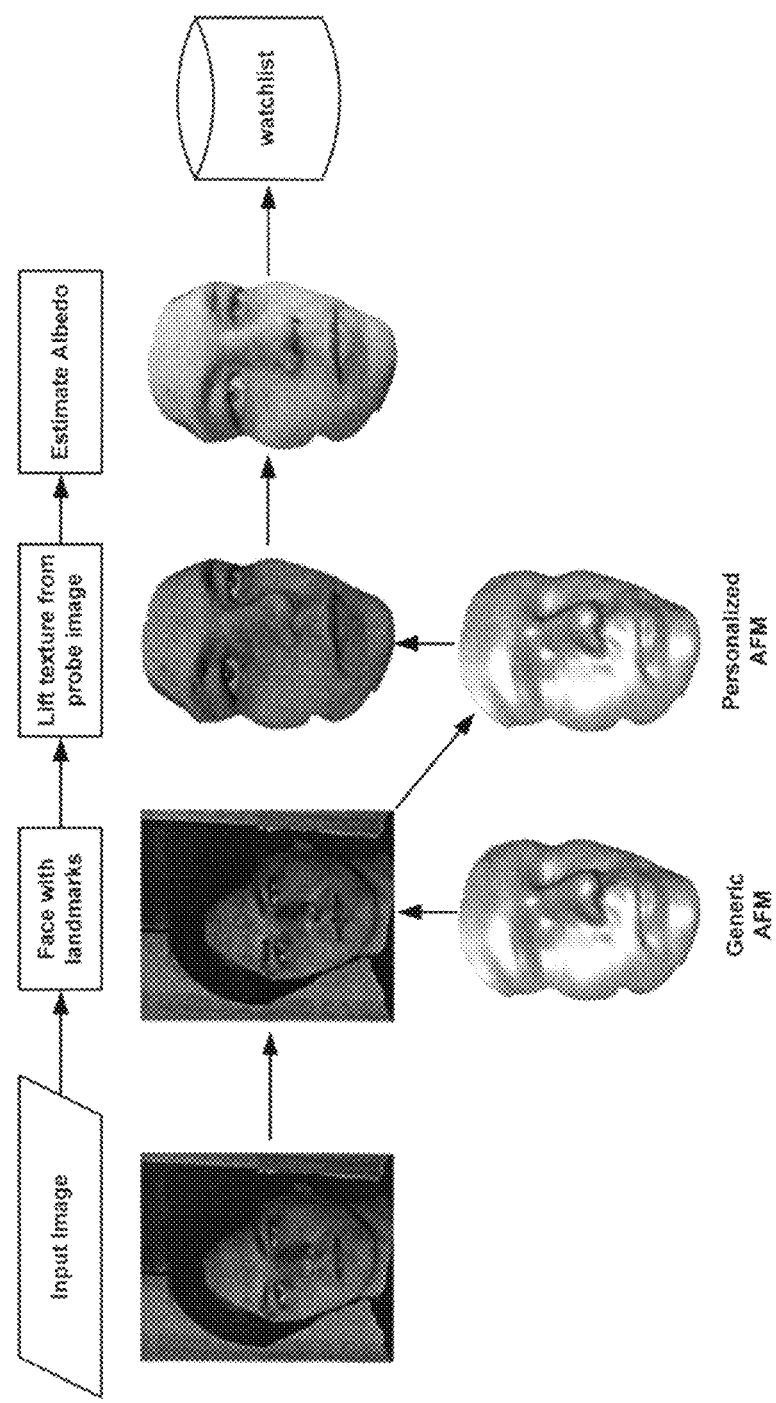
FIG. 10 depicts watchlist enrollment using a single 2D image.

For cases where only a 2D image of the subject to be enrolled is available, the algorithm or method implemented on a computer is depicted in short hand form in Algorithm 2, which is graphically depicted in FIG. 10.

Algorithm 2
Watchlist Enrollment from a 2D Image

| | |
|---|---|
| Required | id ← New ID for the subject |
| Required | I ← Acquire 2D image |
| 1 | face ← detectFace(I) |
| 2 | model = getGenericAFMModel(DB) |
| 3 | ALIGN(face, model) |
| 4 | $M_{id}$ ← fit(model, face) |
| 5 | illumination ← estimateIllumination(face, $M_{id}$) |
| 6 | $T_{id}$ = getTexture(face, $M_{id}$) |
| 7 | $A_{id}$ = estimateAlbedo(face, $M_{id}$, pose, illumination) |
| 8 | $S_{id}$ = computeBiometricSignature($A_{id}$) |
| 9 | Store $A_{id}$, $M_{id}$, and $S_{id}$ into $DB_{id}$ |

Using the PittPatt software (Pittsburgh Pattern Recognition, Inc), the face area in the input image and landmarks in the face be detected. Based on this information, a pose of the face is estimated and a generic Annotated Face Model is fitted to the 2D image using the methodology that we have developed[1].

The Estimate Illumination step determines the illumination of the 2D facial data, using the fitted 3D model. This step involve an optimization procedure such as Simulated Annealing, but other optimization procedures that yield the same type of optimization procedure can be used as well. A common feature of all optimization techniques is that the fewer parameters there are and the more constrained there are, the more reliable the results are. This implies that certain assumptions (e.g., lighting conditions) can be made about the environment, which can speed up the optimization process.

Having estimated the illumination, we can retrieve an albedo of the input 2D facial image in the Albedo Estimation step.

The Biometric Signature Extraction step computes the features on the albedo image and this information in stored in the watchlist database. Each area of the albedo image is assigned a different weight based on our general knowledge of the face recognition problem. For example, certain areas (e.g., nose) are resilient to facial expressions, therefore are considered more reliable and should be assigned a higher weight. The weight selection is based on our extensive experiments on 3D face recognition. Details about the individual steps are provided below.

Landmark Estimation

The landmarks detected automatically on the 2D facial image using the PittPatt software are mapped to their corresponding locations on our generalized Annotated Face Model. Having identified the facial landmarks, we first register and fit the AFM using a deformable model framework[1].

Annotated Face Model

Using our prior work,[1] the AFM defines the control points of a subdivision surface and it is annotated into different areas (e.g., mouth, nose, eyes). These facial areas have different properties associated with them. For example, the mouth area is considered less rigid than the nose area in the fitting step, whereas in the albedo estimation step, the mouth area has a decreased specular coefficient compared to the nose area. A continuous global UV parameterization has been applied to the AFM. The specific parameterization is essentially a mapping form $R^3$ to $R^2$ and allows the conversion of the AFM from a polygonal representation to an equivalent geometry image representation. Geometry images[31-34] are regularly sampled 2D images that have three channels, encoding geometric information (x, y and z coordinates of a vertex in $R^3$). The number of channels in the geometry image used in our method is five, as apart from geometric information we also encode texture and annotation. FIG. 6 depicts a generic AFM mesh, the annotated portions of the face, and the corresponding UV parameterization.

Deformable Model Fitting

Figure 11:
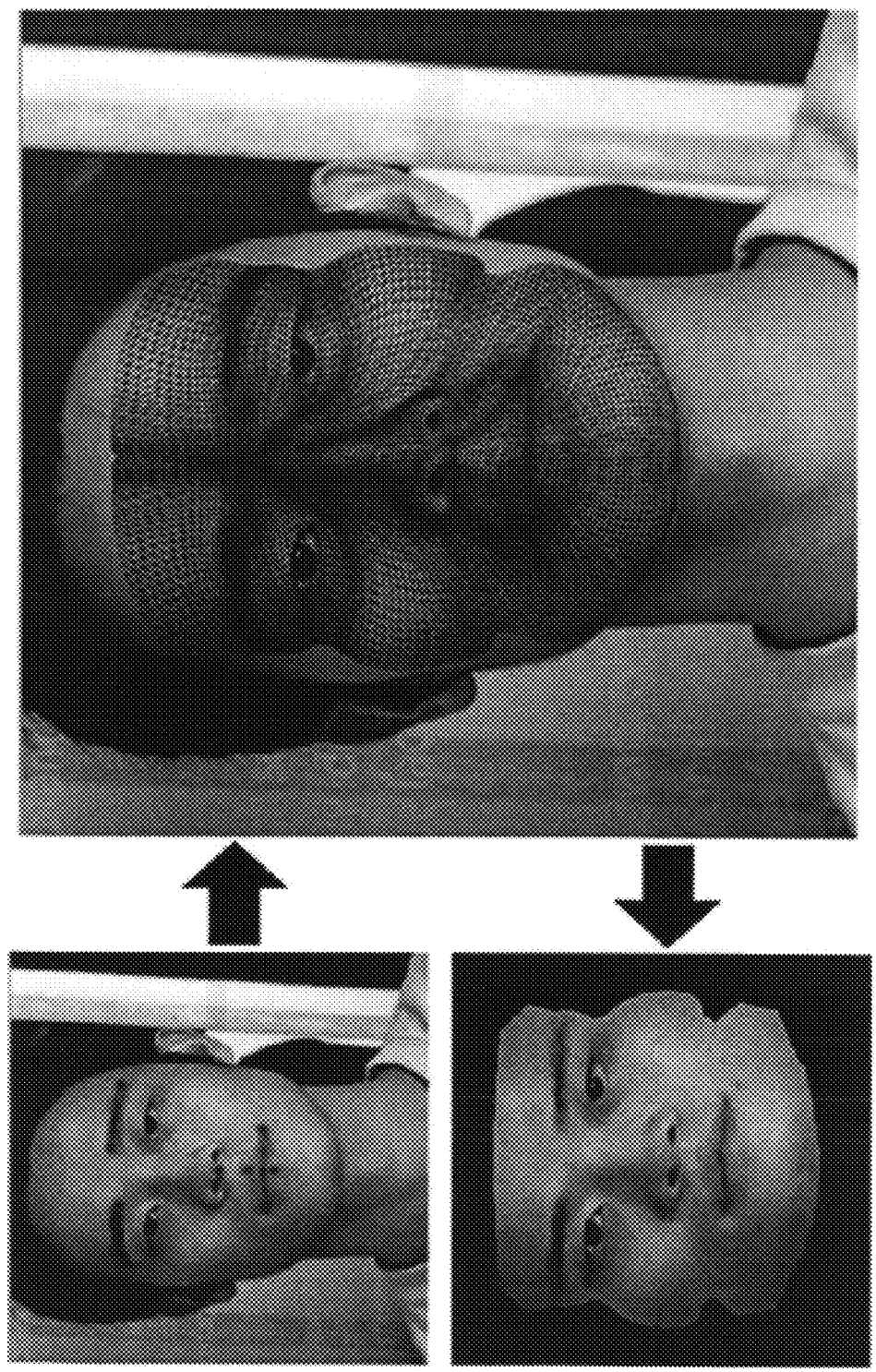
FIG. 11 depicts generate a personalized AFM by fitting a generic AFM to landmarks on a 2D image (Raw 2D image→Fitted AFM of the same subject registered and superimposed over the image→Image converted to texture in geometry image space).

In order to fit the AFM to the raw 2D data, a subdivision based deformable model framework[1] is used. When the deformation concludes, the AFM acquires the shape of the raw data as shown in FIG. 11. Additionally, since the deformation has not violated the properties of the original AFM, the deformed AFM can be converted to a geometry image. The extracted geometry image encodes the geometric information of the raw data. Subsequently, the texture is converted to the same representation, by assigning to each pixel the UV coordinates of the closest point of the raw surface. Note that the deformable model framework discards data not belonging to the face and successfully handles artifacts without any special preprocessing.

Our fitting framework[1] is an implementation of a deformable models[25] using subdivision surfaces[26]. We selected the Loop subdivision scheme[30] since it produces a limit surface with $C^2$ continuity, while only 1-neighborhood area information is needed for each vertex. The AFM is used as the subdivision surface's control mesh, thus determining the degrees of freedom, while the limit surface is used to solve the following equation:

$$M_q \frac{d^2 \vec{q}}{dt^2} + D_q \frac{d\vec{q}}{dt} + K_q \vec{q} = f_q$$

where $\vec{q}$ is the control points vector, $M_q$ is the mass matrix, $D_q$ is the damping matrix, $K_q$ is the stiffness matrix, and $f_q$ are the external forces. The equation is solved iteratively. During this process the AFM gradually acquires the shape of the raw data.

Albedo Estimation[11]

We employ a hybrid Bidirectional Reflectance Distribution Function (BRDF) to model skin reflectance. The Analytical Skin Reflectance Model uses the Oren-Nayar BRDF to model the diffuse component and the Phong BRDF to model the specular component. The Oren-Nayar[35] diffuse component at a surface point, where the incident light angles are denoted by $(\theta_i, \phi_i)$ and the reflected light angles by $(\theta_r, \phi_r)$ is given by the following equation:

$$I'_d = \frac{\rho}{\pi} E \cos\theta_i (A + B\max[0, \cos(\phi_r - \phi_i)]\sin\alpha\tan\beta)$$

where $A = 1.0 - 0.5 \frac{\sigma^2}{\sigma^2 + 0.33}$, $B = 0.45 \frac{\sigma^2}{\sigma^2 + 0.09}$, σ denotes the surface roughness parameter, ρ is a parameter related to the microfacet distribution, $\alpha = \max(\theta_i, \theta_r)$ and $\beta = \min(\theta_i, \theta_r)$. The Oren-Nayar BRDF does not take into account the specular reflections caused by the oily layer of the skin. To accommodate this, we use the BRDF proposed by Phong[36]. The intensity of the specular reflection at a surface point is: $I_s = E \cos^n \phi$, where φ is the angle between the view vector and the reflected light and n is a parameter that controls the size of the highlight. Note that each facial area has different specular properties; therefore we utilize a specular map based on the annotation of the AFM. The above equations describe an ASRM for a single point light. In order to model multiple point lights, the contribution of each light's ASRM must be summed.

Parameter Estimation[11]

In order to estimate the albedo we need to find the optimum parameters of the ASRM along with the position of the light(s). Our approach use OpenGL and Cg (nVidia:Cg), a high-level GPU programming language. The ASRM be implemented as a Cg shader and for self-shadowing the shadow mapping technique of Everitt et al.[37] be used. The implementation fully utilize the GPU, thus achieving high efficiency. Note that the textures used are represented in geometry image space. The texture is the result of the lighting applied on the unknown albedo $M_A$ and is given by: $M_T = I_s + (I_d + I_a) \cdot M_A$, where $I_a$ is the ambient component. By solving this equation for the albedo, we get:

$$M_A = \frac{M_T - I_S}{I_d + I_a}.$$

We use the HSV color space, and we apply the albedo estimation only on the V component. We assume that in the input image there is enough information to estimate the hue and saturation. If that is not the case, we can handle this case in the post-processing step. The optimum ASRM parameters are found using Simulated Annealing. The parameter vector has two parameters for the light position, which consist of two angles on a sphere centered around the centroid of the object, two parameters for the diffuse component, and two for the specular component. Other parameters, such as the ambient component or the gamma correction of the texture, have static values and are left outside the optimization. The objective function minimizes the intensity variation in. To this end, is divided into small areas and for each area we sum the differences between the individual pixels and the mean intensity value of that area. The value of the objective function is the normalized sum of the local area differences. An example of $M_T$, $M_A$ as well as the estimated lighting is provided in FIG. 12 (left half).

Post-Processing Rectification

The last step in the albedo estimation process is the post-processing rectification of the albedo. The purpose of this rectification is to remove artifacts caused by the lighting estimation. A visual inspection of the initially estimated albedo of FIG. 12 (bottom left) reveals artifacts on the outline of the shadow of the nose. This issue is not attributed to the fact that shadow mapping produces hard shadows. Even if soft shadows are used, certain artifacts can appear in areas where the light estimation has significant intensity variation (or discontinuities). These artifacts do not affect the result of the optimization but are very noticeable to the human eye.

Figure 12:
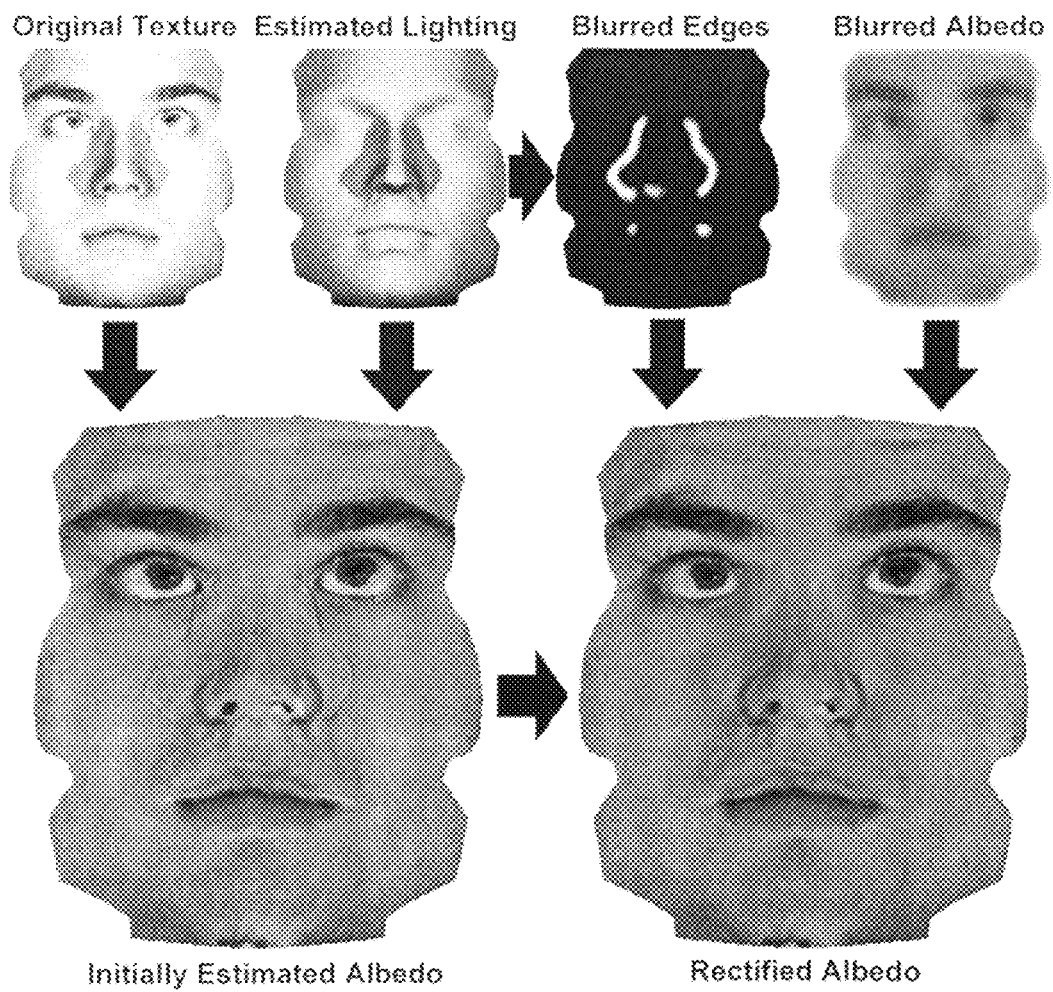
FIG. 12 depicts an overview of Albedo Estimation.

To rectify this, we first detect these areas using an edge detector on the estimated lighting image. A Gaussian kernel is then applied to retrieve a blurred edge image $M_E$. The same Gaussian kernel is applied on the albedo to acquire a blurred albedo $M_B$. Both of these images are depicted in FIG. 12 (top right). The rectified albedo $M_R$ is given by: $M_R(i,j) = (1 - M_E(i,$ j))·$M_A$(i,j)+$M_E$(i,j)·$M_B$(i,j) for every image pixel (i,j), where $M_A$ is the initially estimated albedo. The rectified albedo uses information from the blurred albedo only in areas where artifacts are expected to appear (with discontinuities in the intensity). The artifacts are thus removed (FIG. 12 (bottom right)). Without this step, the albedo of a self-shadowed face is not plausible visually, a problem commonly encountered in other methods[38].

Figure 13:
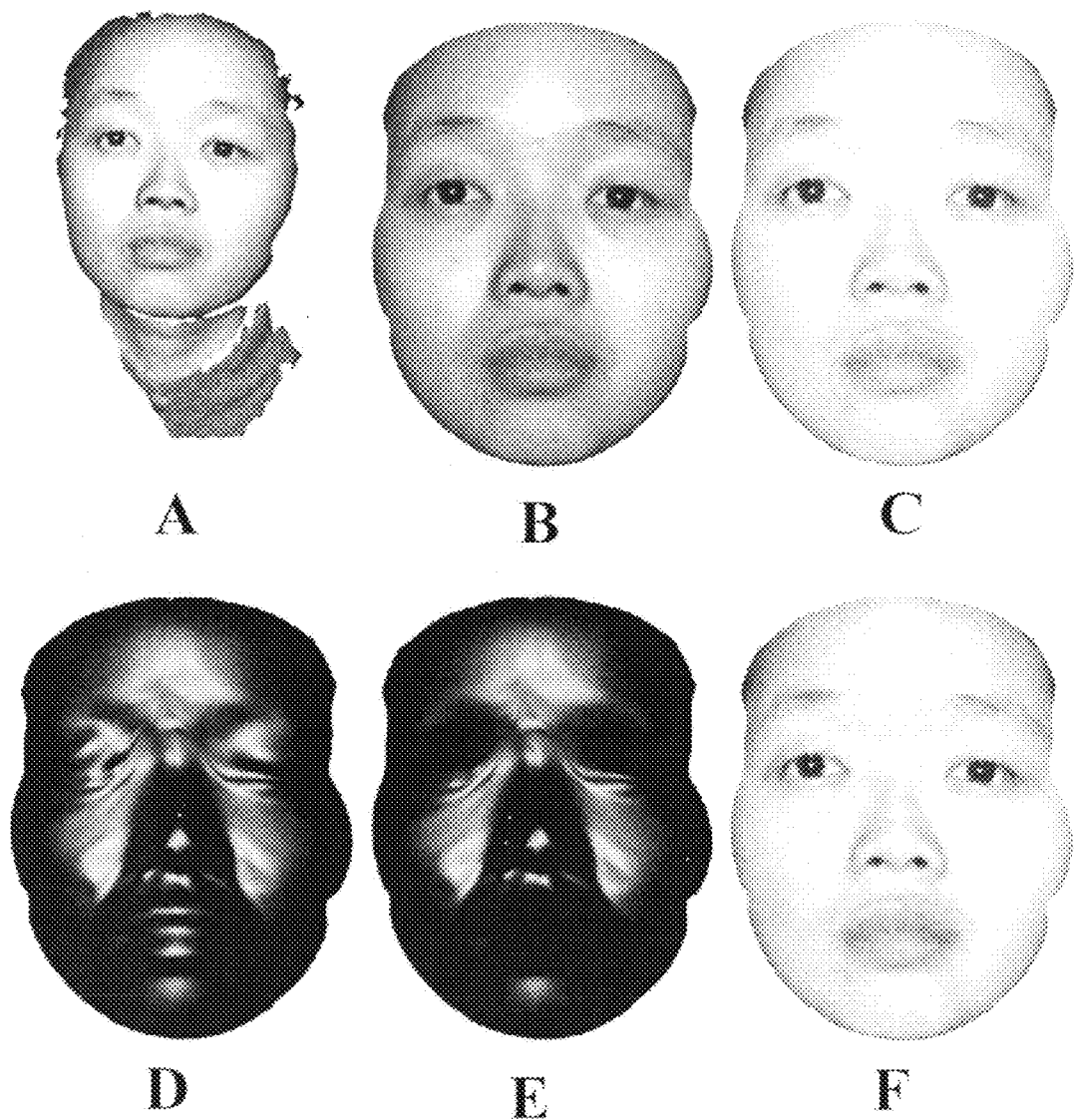
FIGS. 13A-F depicts handling of over-saturated images: (A) Input mesh acquired from a 1-pod active stereo system; (B) Fitted model; (C) Estimated albedo; (D) Corresponding estimated specular component; (E) Specular components restricted to the areas known to have specular components in the UV space of the model (e.g., we do not want to have a high specular response in the eye region or the mouth); (F) Inpainting with texture synthesis of the masked specular component and blending with the estimated albedo.

If the input image does not have enough resolution to be able to accommodate the full color gamut of the person being imaged (e.g., the person had an oily face, combined with a low dynamic range camera), we use an in-painting approach with texture synthesis[39]. We apply it on the areas of the albedo that have an estimated specular intensity greater than a threshold (e.g., 0.1), and we use the neighboring pixels as the source for the texture synthesis (search radius of 40 pixels on 512× 512 albedo images). We also employ a mask defined in the UV space of the model (and thus we need to define this mask only once), which prevents the in-painting to be applied on areas of the face which we know in advance not to have specular components (e.g., eyes). This approach is similar to that of Tan et. al.[40] in the sense that we also use in-painting, but the key difference is that we use the specular light intensity to estimate the regions which need to be in-painted. The annotation of the face in areas with different properties is an inherent advantage of the deformable model fitting. FIG. 13 depicts results from handling poor quality images. The Biometric Signature Extraction stage computes features that serve to create a unique descriptor for the subject. The fitted 3D model, the albedo image, and the extracted features for this subject be stored into the watchlist database. Our programs make the metadata available through BioAPI and the file used conform to the Common Biometrics Exchange File Format (CBEFF).

I.3.1.1.c. Watchlist Enrollment Software for Video Data

In the case of video footage being available for enrollment, we simplify the problem to that of identifying the best 2D image to be used from the video frames. While the frame can also be manually identified, we develop algorithms to automatically detect the best image based on multiple constraints. Specifically, the constraints used be image resolution, pose of the face, and contrast. Image resolution be considered since the selected frame should provide sufficient texture and the ability to detect landmarks for AFM alignment. Pose also be a consideration since frontal views of the face would be preferred to capture as much of the facial data as possible. Finally, contrast be considered since individual frames in a video footage can be blurred due to motion artifacts and the use of a focus measure to identify the least blurry frames would lead to better resolvability of facial features.

I.3.1.2. Open-Set Identification (Watchlist Task)

The watchlist task using biometric data is an open universe test. Specifically, a sensor acquires data from an individual that may or may not be included in the watchlist database. That individual's biometric signature is compared to the other biometric signatures in the watchlist database and a similarity score is computed for each comparison. These similarity scores are then numerically ranked in descending numerical value. If a similarity score is higher than a preset threshold, an alarm is provided signaling the existence of this individual's biometric data in the watchlist database.

Open-Set Identification Station Hardware

The URxD-I hardware be an integration of several components to enable unified processing of video data from multiple 2D surveillance cameras. The 2D cameras used be off-the-shelf surveillance cameras capable of delivering video data over the internet. Each camera be directly connected to a high-speed 1 Gbps ethernet switch. A dedicated computer and a data store be connected through a fiber channel for high speed transfer of data from each incoming video feed. The data store be set up to maintain and operate a parallel file system. In addition, a second computer dedicated for processing the video data also be attached to the data store through a redundant fiber channel connection. The processing computer be a dual quad-core machine. The open-set identification station software be housed on this computer and perform face detection of subjects in real-time. Faces detected in the video be analyzed and identified against the subjects enrolled in the database.

Open-Set Identification Station Software

Figure 14:
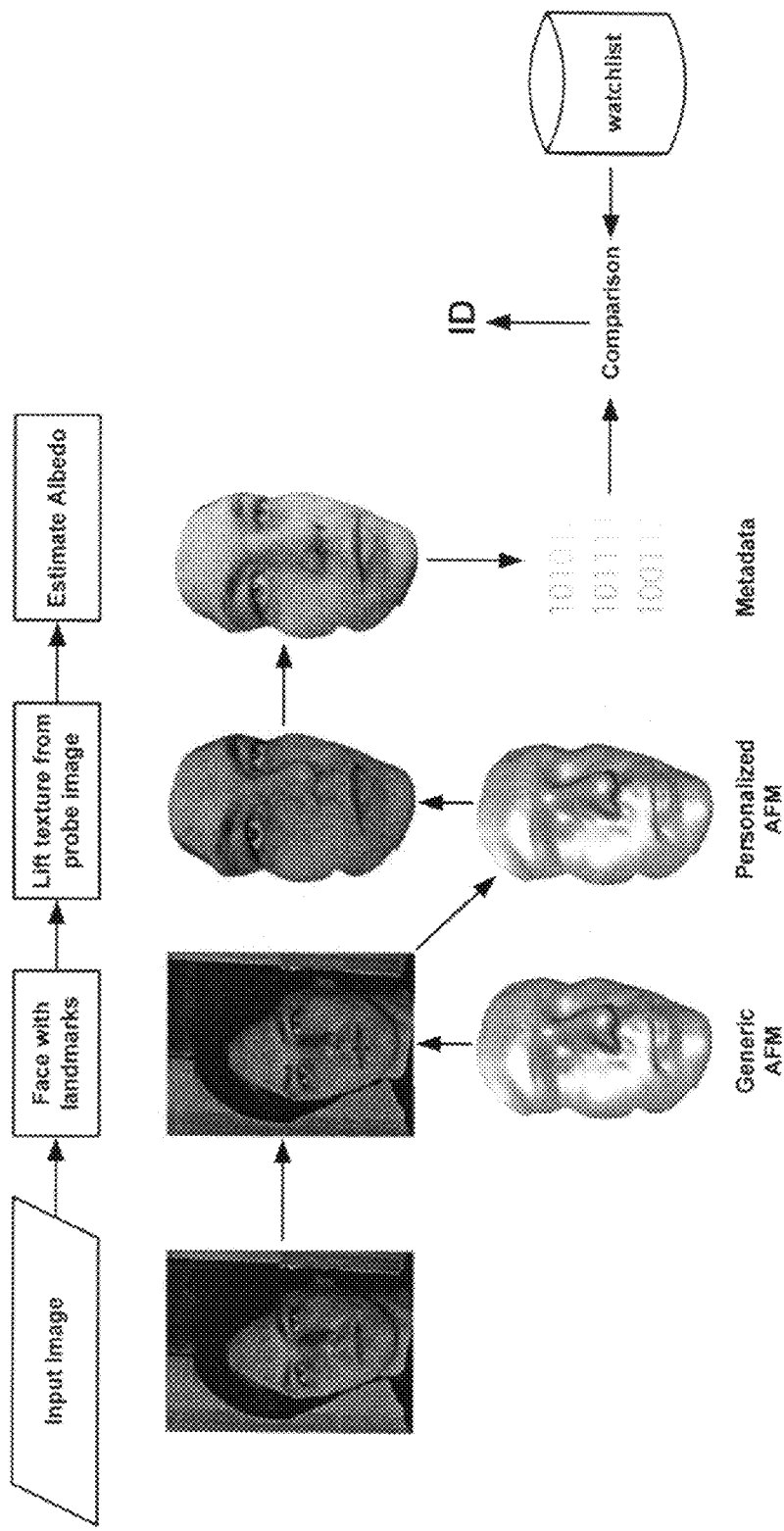
FIG. 14 depicts an open-set identification of a subject by comparing the biometric signature with the those stored in the watchlist database.

We develop the software, which run on the PC of the identification system. For the purposes of this system, we assume that the watchlist database resides at the same computer. The critical challenge in the use of surveillance systems for face recognition is in overcoming the problems due to pose and illumination variations. Overall, the algorithm for open-set identification is Algorithm 3 and it is depicted graphically in FIG. 14.

| Algorithm 3 Open-Set Identification | |
|---|---|
| Required | I ← Acquire 2D image |
| 1 | face ← detectFace(I) |
| 2 | model = getGenericAFMModel(DB) |
| 3 | ALIGN(face, model) |
| 4 | $M_{id}$ ← fit(model, face) |
| 5 | illumination ← estimateIllumination(face, $M_{id}$) |
| 6 | $T_{id}$ = getTexture(face, $M_{id}$) |
| 7 | $A_{id}$ = estimateAlbedo(face, $M_{id}$, pose, illumination) |
| 8 | $S_{id}$ = computeBiometricSignature($A_{id}$) |
| 9 | scores = computeDistanceMetric(S, $S_j$) |

Video from the surveillance cameras be processed with the PittPatt software for the detection of the face region areas in a video frame. Faces detected in the video be analyzed and compared against the subjects in the watchlist using Algorithm 3. This algorithm has exactly the same steps as Algorithm 2 except for the last step. In the last step, a score is computed for each comparison with the biometric signatures in the database. Each score is the L1 distance of the two biometric signatures. Then the scores are ranked numerically.

REFERENCES FOR PART I OF DETAILED DESCRIPTION

The following references were cited in the main part of the specification above.

[1] I. A. Kakadiaris, G. Passalis, G. Toderici, N. Murtuza, Y. Lu, N. Karampatziakis, and T. Theoharis, "Three-Dimensional Face recognition in the presence of facial expressions: An annotated deformable model approach," *IEEE Transactions on Pattern Analysis and Machine Intelligence*, vol. 29, pp. 640-649, 2007.

[2] J. P. Phillips, T. W. Scruggs, A. J. O'Toole, P. J. Flynn, K. W. Bowyer, C. L. Schott, and M. Sharpe, "FRVT 2006 and ICE 2006 Large-Scale Results," *NISTIR*, vol. 7408, March 2007.

[3] P. J. Phillips, P. J. Flynn, T. Scruggs, K. W. Bowyer, J. Chang, K. Hoffman, J. Marques, J. Min, and W. Worek, "Overview of the Face Recognition Grand Challenge," in *Proc. IEEE Computer Society Conference on Computer Vision and Pattern Recognition*, San Diego, Calif. USA, 2005, pp. 947-954.

[4] P. J. Phillips, P. J. Flynn, T. Scruggs, K. W. Bowyer, and W. Worek, "Preliminary Face Recognition Grand Challenge Results," in *Proc. of the 7th International Conference on Automatic Face and Gesture Recognition,* 2006, pp. 15-24.

[5] I. A. Kakadiaris, G. Passalis, T. Theoharis, G. Toderici, I. Konstantinidis, and N. Murtuza, "8D-THERMO CAM: combination of geometry with physiological information for face recognition," in *Video Proceedings of the Computer Vision and Pattern Recognition Conference,* San Diego, Calif., 2005, p. 1183.

[6] I. A. Kakadiaris, G. Passalis, T. Theoharis, G. Toderici, I. Konstantinidis, and N. Murtuza, "Multimodal face recognition: combination of geometry with physiological information," in *Proc. Computer Vision and Pattern Recognition Conference,* San Diego, Calif., 2005, pp. 1022-1029.

[7] I. A. Kakadiaris, G. Passalis, G. Toderici, Y. Lu, N. Karampatziakis, N. Murtuza, and T. Theoharis, "Expression-invariant multispectral face recognition: you can smile now!," in *Proc. Biometric Technology for Human Identification III, Defense and Security Symposium,* Orlando, Fla. USA, 2006.

[8] I. A. Kakadiaris, G. Passalis, G. Toderici, N. Murtuza, and T. Theoharis, "3D Face Recognition," in *Proc. British Machine Vision Conference,* Edinburgh, United Kingdom, 2006, pp. 200-208.

[9] I. A. Kakadiaris, G. Passalis, G. Toderici, N. Murtuza, and T. Theoharis, "Quo Vadis, 3D Face and Ear Recognition?," in *Multi-Sensory Multi-Modal Face Biometrics for Personal Identification,* R. I. Hammoud, B. Abidi, and M. Abidi, Eds., 2006.

[10] I. A. Kakadiaris, G. Toderici, and T. Theoharis, "3D-Aided 2D Face Recognition using Bidirectional Relighting," in *Proc. 10th European Conference on Computer Vision,* Marseille, France, 2008 (Submitted).

[11] G. Toderici, G. Passalis, T. Theoharis, and I. A. Kakadiaris, "An Automated Method for Human Face Modeling and Relighting with Application to Face Recognition," in *Proc. IEEE Workshop on Photometric Analysis for Computer Vision (in conjunction with ICCV 2007),* Rio de Janeiro, Brazil, 2007.

[12] I. A. Kakadiaris, H. Abdelmunim, W. Yang, and T. Theoharis, "Profile-Based Face Recognition," in *Proc. 8th IEEE International Conference on Automatic Face and Gesture Recognition,* Amsterdam, The Netherlands, 2008 (Submitted).

[13] V. Blanz and T. Vetter, "A Morphable Model for the Synthesis of 3D Faces," in *ACM SIGGRAPH,* 1999, pp. 187-194.

[14] V. Blanz and T. Vetter, "Face Recognition Based on Fitting a 3D Morphable Model," *IEEE Transactions on Pattern Analysis and Machine Intelligence,* vol. 25, pp. 1063-1074, 2003.

[15] B.-W. Hwang, V. Blanz, T. Vetter, and S.-W. Lee, "Face Reconstruction from a Small Number of Feature Points," in *Proc. 15th IEEE International Conference of Pattern Recognition,* Barcelona, Spain, 2000, pp. 842-845.

[16] V. Blanz, "Face Recognition based on a 3D Morphable Model," in *Proc. IEEE 7th International Conference on Automatic Face and Gesture Recognition,* Southampton, UK, 2006, pp. 617-624.

[17] L. Zhang and D. Samaras, "Pose Invariant Face Recognition Under Arbitrary Unknown Lighting Using Spherical Harmonics," in *Proc. ECCV Biometric Authentication Workshop,* Prague, Czech Republic, 2004, pp. 10-23.

[18] L. Zhang, S. Wang, and D. Samaras, "Face Synthesis and Recognition under Arbitrary Unknown Lighting using a Spherical Harmonic Basis Morphable Model," in *Proc. IEEE Computer Society Conference on Computer Vision and Pattern Recognition,* San Diego, Calif., USA, 2005, pp. 209-216.

[19] V. Blanz, P. Grother, P. J. Phillips, and T. Vetter, "Face Recognition Based on Frontal Views Generated from Non-Frontal Images," in *Proc. IEEE Computer Society Conference on Computer Vision and Pattern Recognition,* San Diego, Calif. USA, 2005, pp. 454-461.

[20] M. W. Lee and S. Ranganath, "Pose-invariant face recognition using a 3D deformable model," *Pattern Recognition,* vol. 36, pp. 1835-1846, 2003.

[21] J. Huang, B. Heisele, and V. Blanz, "Component-based Face Recognition with 3D Morphable Models," in *Proc. 4th International Conference on Audio-and Video-Based Biometric Person Authentication,* Guildford, UK, 2003, pp. 27-34.

[22] U. Park, H. Chen, and A. K. Jain, "3D Model-Assisted Face Recognition in Video," in *Proc. Canadian Conference on Computer and Robot Vision,* 2005, pp. 322-329.

[23] A. Johnson, "Spin-Images: A Representation for 3-D Surface Matching," Pittsburgh, Pa.: Robotics Institute, Carnegie Mellon University, 1997.

[24] D. Chetverikov, D. Svirko, D. Stepanov, and P. Krsek, "The Trimmed Iterative Closest Point Algorithm," in *Proc. 16th IEEE International Conference on Pattern Recognition,* Quebec City, Canada, 2002, pp. 545-548.

[25] D. Metaxas and I. A. Kakadiaris, "Elastically adaptive deformable models," in *Proc. 4th European Conference on Computer Vision,* Cambridge, England, 1996, pp. 550-559.

[26] C. Mandal, "A Dynamic Framework For Subdivision Surfaces," University of Florida, 1998.

[27] C. Mandal, H. Qin, and B. Vemuri, "Dynamic Smooth Subdivision Surfaces for Data Visualization," *Proc. 8th IEEE Visualization,* pp. 371-377, Oct. 19-24, 1997.

[28] C. Mandal, H. Qin, and B. C. Vemuri, "A novel FEM-based dynamic framework for subdivision surfaces," *Computer-Aided Design,* vol. 32, pp. 479-497, 2000.

[29] D. Zorin and P. Schroeder, "Subdivision for Modeling and Animation," in *SIGGRAPH Course Notes,* New Orleans, La., USA, 2000.

[30] C. Loop, "Smooth Subdivision Surfaces based on Triangles," Department of Mathematics, University of Utah, 1987.

[31] I. A. Kakadiaris, E. Papadakis, L. X. Shen, D. Kouri, and D. Hoffman, "g-HDAF multiresolution deformable models for shape modelling and reconstruction," in *Proc. 13th British Machine Vision Conference,* Cardiff, UK, 2002, pp. 303-312.

[32] I. A. Kakadiaris, M. Papadakis, L. Shen, D. Kouri, and D. Hoffman, "m-HDAF multiresolution deformable models," in *Proc. 14th International Conference on Digital Signal Processing,* Santorini, Greece, 2002, pp. 505-508.

[33] X. Gu, S. Gortler, and H. Hoppe, "Geometry images," in *ACM SIGGRAPH,* San Antonio, Tex., USA, 2002, pp. 355-361.

[34] E. Praun and H. Hoppe, "Spherical parametrization and remeshing," *ACM SIGGRAPH,* pp. 340-349, Jul. 27-31, 2003.

[35] M. Oren and S. Nayar, "Generalization of Lambert's reflectance model," in *ACM SIGGRAPH,* 1994, pp. 239-246.

[36] B. Phong, "Illumination for computer generated pictures," *Communications of the ACM,* vol. 18, pp. 311-317, 1975.

[37] C. Everitt, A. Rege, and C. Cebenoyan, "Hardware shadow mapping," NVIDIA Corporation, 2001.

[38] S. Paris, F. Sillion, and L. Quan, "Lightweight face relighting," in *Proc. 11th Pacific Graphics*, Canmore, Alberta, Canada, 2003, pp. 41-50.

[39] P. Harrison, "A non-hierarchical procedure for re-synthesis of complex textures," in *Proc. 9th International Conference in Central Europe on Computer Graphics, Visualization and Computer Vision*, Campus Bory, Plzen, Czech Republic, 2001, pp. 190-197.

[40] P. Tan, S. Lin, L. Quan, and H.-Y. Shum, "Highlight Removal by Illumination-Constrained Inpainting," in *Proc. 9th International Conference on Computer Vision*, Nice, France, 2003, pp. 164-169.

Part II of the Detailed Description of the Invention

II.1. Introduction

Here, we propose a novel automated method that tackles all of the above challenges and requires as input only 3D facial data and the corresponding texture as shown in FIG. 15. Using a subdivision-based deformable model framework we fit an Annotated Face Model (AFM) to the raw data and export a geometry image.[16] Additional details on the AFM construction, the reader is referred to U.S. patent application Ser. No. 10/923,982, filed 23 Aug. 2004 entitled "Multi-Modal Face Recognition," incorporated herein by reference. This representation holds both geometry and texture information in the same parameter space. An Analytical Skin Reflectance Model (ASRM) is then applied to the texture to remove the lighting, thus acquiring the albedo of the face. It is then shown that the derived processed data can be used directly in a variety of applications, including Face Recognition.

Compared to other approaches, the method of this invention offers a unique combination of features: 1) Fully automatic. No user intervention is required in any step of the method. 2) Minimum input requirements. Only 3D data and texture are used, no light calibration is needed. 3) Compact representation. The facial geometry is regularly sampled, registered and annotated. The extracted geometry image can be used directly in modeling applications. 4) Arbitrary lighting. Lighting is removed from the texture. The albedo can be used directly in rendering applications. 5) Shadows. The albedo can be extracted even when self-shadowing and multiple lights are present. 6) Highly efficient. The method utilizes the GPU for lighting calculations thus achieving high efficiency. 7) Widely applicable. The method can be applied to any facial dataset either from commercial 3D scanners or existing databases, thus allowing its utilization in Face Recognition.

II..2. Previous Work

Modeling of the human face and skin is a widely researched topic. An in-depth overview of the issues related to modeling the skin is given by Igarashi et al.[12] Existing approaches can be divided into two main categories: data-driven and model-driven. Data-driven approaches require additional information to a 3D facial scan. They measure the reflectance function using specialized hardware (such as a light dome or polarizing filters). Model-based approaches use an approximation of the reflectance model of the skin, usually in the form of a Bidirectional Reflectance Distribution Function (BRDF) or a more complex bidirectional surface scattering reflectance distribution function (BSSRDF).

Data-driven approaches include that of Debevec et al.[5] who pioneered the human skin reflectance capture in vivo, and introduced the use of a light dome for this purpose. Weyrich et al.[43] also proposed the use of a light dome along with a subsurface scattering measurement tool in order to model the human skin reflectance for the facial region. For an analytical form of the BRDF, they fit a Torrance-Sparrow or a Blinn-Phong local reflectance model to the data. For the BSSRDF, the fitting process uses the model proposed by Jensen et al.[14] Even though these approaches present truly photorealistic results, they require a large amount of information as input. In most applications this additional information is not available.

Approaches with smaller information requirements that utilize polarization filters for obtaining the albedo include that of Nayar et al.[26] The technique requires two images of the same scene, one taken without any filters, and one taken using a polarized filter. The difference of the two images provides the specular reflection of the object. The major drawback is that the images must be taken from the same viewpoint, and special hardware (the filters) must be employed. Zickler et al.[44] extended the above technique by incorporating the constraint that the shape must be known in advance. By using the extra information, they extract the BRDF specific to the input and the albedo.

Using a PDE approach, Mallick et al.[22] recovered the specular component from images, without the use of polarization filters. The results presented are convincing, but the approach has high computational complexity and does not take into consideration the actual surface of the face.

Ikeuchi and Sato[13] proposed to use the Torrance-Sparrow BRDF to model the diffuse and specular components of the light illuminating the face. They model the diffuse component using the Lambertian formulation. The parameters are estimated using an iterative least squares fitting, and the distinction between specular, diffuse, and shadow pixels is accomplished using a threshold, which must be set manually.

Model-based approaches include that of Paris et al.[30] who proposed a lightweight approach based on a simple Phong BRDF that uses graphics hardware. Compared to our method, their approach has three limitations: it requires a light probe of the environment, annotation must be performed manually, and it does not handle self-shadowing. We have shown that shadows can be successfully removed without any artifacts using an efficient approach with even lower input information requirements.

Blanz and Vetter[3] employed a morphable model technique in order to acquire the geometry of faces from 2D images. The albedo is captured in the fitting process. The main drawback, however, is that they need to manually initialize the morphable model for each input image. In contrast to our method, this method is a statistical approach. The descriptiveness of statistical approaches depends heavily on the variety and quality of the training set and the creation of such sets is not a trivial task. Fuchs et al.[7] focused their method in computing the reflectance of the face, and they also demonstrate BRDF transfer. Even though this work does not require a 3D model, they take several 2D images with constrained lighting conditions. The actual amount of information used is comparable to that of the approach of this invention.

Smith and Hancock[38] presented an approach for albedo estimation from 2D images, which uses a 3D morphable model that is fitted to the input image. The normals of the fitted model are then used for computing the shading, assuming a Lambertian reflectance model. The main limitation of their method is the assumption that the subject is illuminated by a single light source, which is placed very close to the viewer[39]. Georghiades[9] also presented a method where only 2D images are used in order to compute the skin BRDF and 3D shape. This work is limited to greyscale images and does not handle selfshadowing.

The method of this invention does not challenge data-driven approaches in terms of photorealism. When minimal input data are available, only model-based approaches are applicable. The method of this invention, having significantly fewer constraints and limitations than previous approaches, widens the applicability of such methods.

II.3. Methods

In most practical applications, only 3D data and texture of a face are available. These are either captured by a commercial 3D scanner or found in existing facial databases. Therefore, a method that aims to be widely used for face modeling and relighting cannot rely on additional information (e.g., light probes, reflectance measurements, etc.). Moreover, for applications where a large number of faces must be processed (such as Face Recognition), full automation is extremely important. The method of this invention provides both.

The aim of the methods presented herein is to derive high quality geometry and texture from minimal input data that can be directly used in various applications (Sections II.4 and II.5). We first register and fit the Annotated Face Model (AFM) using a deformable model framework[16]. Then, the geometry is converted into a geometry image representation that automatically provides annotation, registration and regular sampling. Our contribution, which extends previous work, is removing the lighting from the texture using an Analytical Skin Reflectance Model (ASRM), thus acquiring the albedo. Note that the method of this invention is completely different from the morphable model approach of Blanz[3]. In that approach, the morphable model is statistical, and the fitting process is optimizing the model's parameters. In our method, the deformable model is strictly geometric, and the fitting process deforms the model's surface iteratively.

II.3.1. Annotated Face Model

Using the work of Kakadiaris et al.[16], the AFM defines the control points of a subdivision surface and it is annotated into different areas (e.g., mouth, nose, eyes). These facial areas have different properties associated with them which are used by our method. For example, the mouth area, is considered less rigid than the nose area in the fitting step, whereas in the albedo estimation step, the mouth area has a decreased specular coefficient compared to the nose area.

A continuous global UV parametrization has been applied to the AFM. The specific parametrization is essentially a mapping form $R^3$ to $R^2$ and allows the conversion of the AFM from a polygonal representation to an equivalent geometry image representation. Geometry images[10,15,17,34] are regularly sampled 2D images that have three channels, encoding geometric information (x, y and z coordinates of a vertex in $R^3$). Herein, the number of channels in the geometry image is greater than three, as apart from geometric information, we also encode texture and annotation. Also, for practical purposes, in all applications we used a resolution of 512×512.

II.3.1.1 Registration

Facial data acquired from 3D scanners have arbitrary orientation. Before the AFM is fitted to these data, both must have the same orientation. To this end, we employ the registration strategy of Kakadiaris et al.,[16] which is two-phase rigid registration step. The first phase, that provides a rough registration, utilizes the Iterative Closest Point (ICP) algorithm[2] and it does not require manual initialization. The second phase, which provides a finer registration, utilizes the registration algorithm presented by Papaioannou et al.[29] It computes depth images of both the AFM and the raw data and uses a non-linear optimizer[18,36] to minimize the discrete sum of differences of the depth images' derivatives. Simulated Annealing minimizes the following objective function:

$$\varepsilon_\omega = \sum_{i=1}^{S}\sum_{j=1}^{S} |D_x^1(i,j) - D_x^2(i,j)| + |D_y^1(i,j) - D_y^2(i,j)|$$

where $D_x^1$, $D_y^1$, $D_x^2$, and $D_y^2$, are the X and Y derivatives of the depth images of the AFM and the raw data respectively, while S is their spatial resolution.

Note that ICP is less sensitive to initial conditions, while SA offers more invariance to facial expressions and finer registration. After this step, there is a correspondence between the main facial features of the AFM and the raw data.

II.3.1.2 Deformable Model Fitting

In order to fit the AFM to the raw data, a subdivision based deformable model framework[16] is used. When the deformation concludes, the AFM acquires the shape of the raw data. This establishes a dense correspondence between the AFM's surface and the raw data's vertices. Additionally, because the deformation has not violated the properties of the original AFM, the deformed AFM can be converted to a geometry image. The extracted geometry image encodes the geometric information of the raw data as shown in FIG. 16. Subsequently, the texture is converted to the same representation, by assigning to each pixel the UV coordinates of the closest point of the raw surface. Note that the deformable model framework discards data not belonging to the face and successfully handles artifacts as shown in FIG. 16 without any special preprocessing.

The fitting framework,[16] is an implementation of the deformable models[24] using subdivision surfaces.[23] We selected the Loop subdivision scheme,[24] because it produces a limit surface with $C^2$ continuity, while only 1-neighborhood area information is needed for each vertex. The AFM is used as the subdivision surface's control mesh, thus determining the degrees of freedom, while the limit surface is used to solve the following equation:

$$M_q \frac{d^2\vec{q}}{dt^2} + D_q \frac{d\vec{q}}{dt} + K_q \vec{q} = f_q$$

where $\vec{q}$ is the control points vector, $M_q$ is the mass matrix, $D_q$ is the damping matrix, $K_q$ is the stiffness matrix, and $f_q$ are the external forces. The equation is solved iteratively. During this process the AFM gradually acquires the shape of the raw data.

II.3.2. Albedo Estimation

We used data acquired by two of our 3dMD™ scanners and data from the Face Recognition Grand Challenge 2.1 database.[31] The 3dMD™ system we used were configured either with one flash, or with two flashes for testing the feasibility of the algorithm in the presence of two simultaneous shadows as shown in FIG. 17. These flashes tend to be the major source of illumination. Therefore, we model the lighting conditions of the acquisition using one or two point lights, but the model can easily be extended for arbitrary point lights. We assume that the flashes produce pure white light.

II.3.2.1 Analytical Skin Reflectance Model

We chose to use a hybrid BRDF to model skin reflectance. We did not utilize a BSSRDF model because the input data did not have enough resolution in order to estimate a subsurface scattering component. The Analytical Skin Reflectance Model uses the Oren-Nayar BRDF to model the diffuse component and the Phong BRDF to model the specular component.

The Oren-Nayar[28] diffuse component at a surface point, where the incident light angles are denoted by $(\theta_i, \phi_i)$ and the reflected light angles by $(\theta_r, \phi_r)$, is given by the following equation:

$$I'_d = \frac{\rho}{\pi} E \cos\theta_i (A = B\max[0, \cos(\phi_r - \phi_i)]\sin\alpha\tan\beta$$

$$\text{where } A = 1.0 - 0.5\frac{\sigma^2}{\sigma^2 + 0.33}, b = 0.45\frac{\sigma^2}{\sigma^2 + 0.09},$$

$\sigma$ denotes the surface roughness parameter, $\rho$ is parameter related to the microfacet distribution, $\alpha=\max(\theta_i,\phi_r)$ and $\beta=\min(\theta_i,\phi_r)$. Note that $\rho$ is usually omitted, as it can be included in the diffuse color of the surface.

The Oren-Nayar BRDF does not take into account the specular reflections caused by the oily layer of the skin. To accommodate this, we use the BRDF proposed by Phong[32]. The intensity of the specular reflection at a surface point is: $I_s = E \cos^n\phi$, where $\phi$ is the angle between the view vector and the reflected light and n is a parameter that controls the size of the highlight. Note that each facial area has different specular properties; therefore, we utilize a specular map based on the annotation of the AFM.

The above equations describe an ASRM for a single point light. In order to model multiple point lights, the contribution of each light's ASRM must be summed.

II.3.2.2 Parameter Estimation

In order to estimate the albedo we need to find the optimum parameters of the ASRM along with the position of the light(s). In our implementation we use OpenGL and Cg[27], a high-level GPU programming language. The ASRM is implemented as a Cg shader and for self-shadowing the shadow mapping technique of Everitt et al.[6] is used. The implementation fully utilizes the GPU, thus achieving high efficiency (it takes less than a minute in a modern PC). Note that the textures used are represented in geometry image space.

The texture $M_T$ is the result of the lighting applied on the unknown albedo $M_A$ and is given by:

$$M_T = I_s + (I_d + I_a) \cdot M_A$$

where $I_a$ is the ambient component. By solving this equation for the albedo, we get: $M_A = (M_T - I_s)/(I_d + I_a)$. In our implementation, we use the HSV color space, and we apply the albedo estimation only on the V component. We assume that in the input image there is enough information to estimate the hue and saturation. If that is not the case, we can handle this case in the post-processing step.

The optimum ASRM parameters are found using Simulated Annealing. The parameter vector has two parameters for the light position which consist of two angles on a sphere centered around the centroid of the object, two parameters for the diffuse component, and two for the specular component. Other parameters such as the ambient component, or the gamma correction of the texture have static values and are left outside the optimization. The objective function minimizes the intensity variation in $M_A$. To this end, $M_A$ is divided into small areas. For each area, we sum the differences between the individual pixels and the mean intensity value of that area. The value of the objective function is the normalized sum of the local area differences. An example of $M_T$, $M_A$ as well as the estimated lighting is provided in FIG. 17 (left).

II.3.2.3 Post-Processing Rectification

The last step in the albedo estimation process is the post-processing rectification of the albedo. The purpose of this rectification is to remove artifacts caused by the lighting estimation. A visual inspection of the initially estimated albedo of FIG. 17 (bottom-left) reveals artifacts on the outline of the shadow of the nose. This issue is not attributed to the fact that shadow mapping produces hard shadows. Even if soft shadows are used, certain artifacts can appear in areas where the light estimation has significant intensity variations (or discontinuities). These artifacts do not affect the result of the optimization, but are very noticeable to the human eye.

To rectify this, we first detect these areas using an edge detector on the estimated lighting image. A Gaussian kernel is then applied to retrieve a blurred edge image $M_E$. The same Gaussian kernel is applied on the albedo to acquire a blurred albedo $M_B$. Both of these images are depicted in FIG. 17 (top-right). The rectified albedo $M_R$ is given by:

$$M_R(i,j) = (1 - M_E(i,j)) \cdot M_A(i,j) + M_E(i,j) \cdot M_B(i,j)$$

for every image pixel (i,j), where $M_A$ is the initially estimated albedo. The rectified albedo uses information from the blurred albedo only in areas where artifacts are expected to appear, identified by discontinuities in intensity. The artifacts are thus removed (FIG. 17, bottom-right). From a quantitative point of view, the contribution of this step is minimal; however, the qualitative contribution is significant. Without this step, the albedo of a self-shadowed face is not plausible visually, a problem commonly encountered in other methods.[30] In their work Lensch et al.[20] also tackled the shadow outline problem, but with a different implementation, as they blurred the shadow map.

Figure 18:
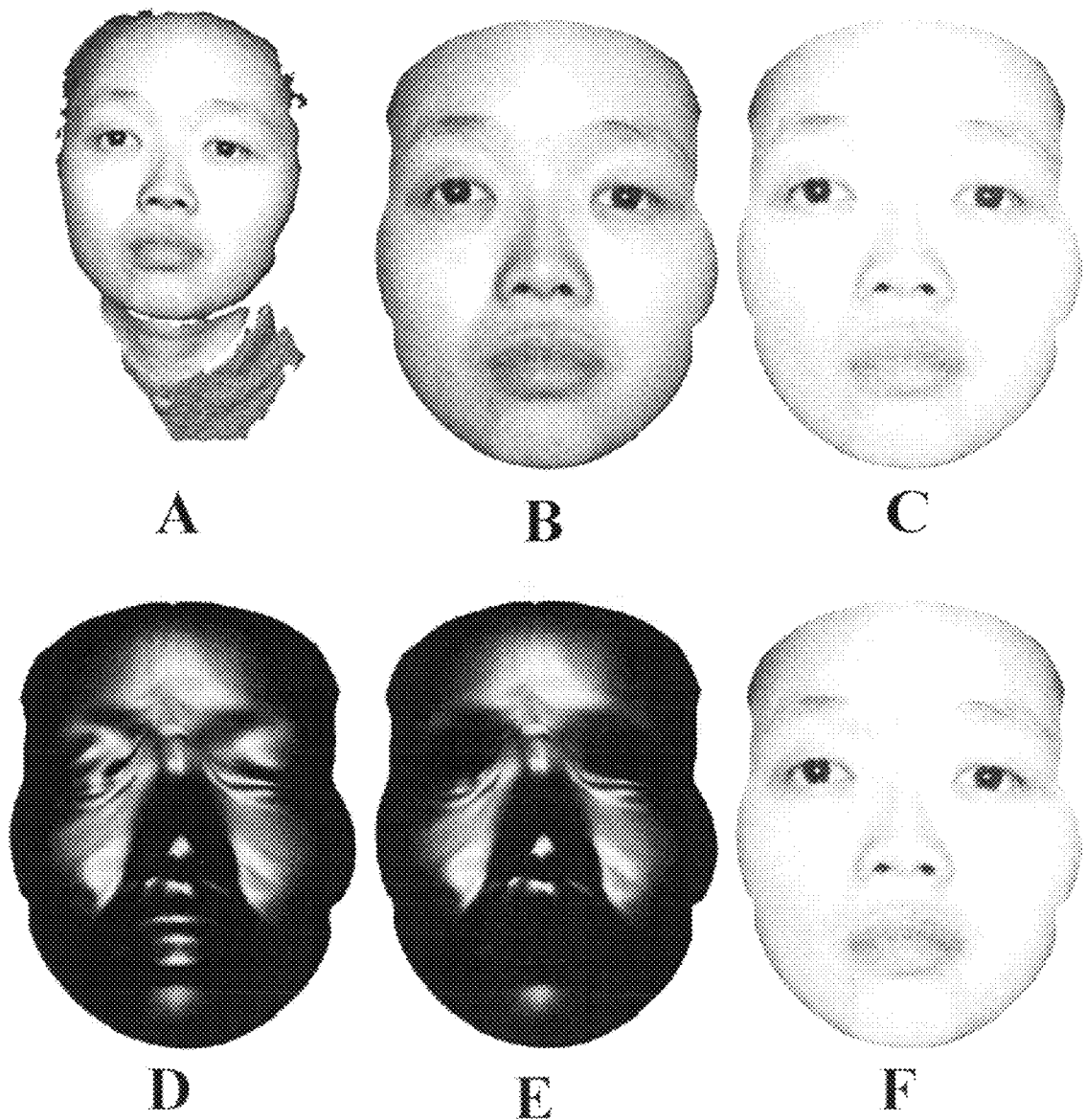

If the input image did not have enough resolution to be able to accommodate the full color gamut of the person being imaged (e.g., a strong flash was used and the person had an oily face, combined with a low dynamic range camera), we use an inpainting approach with texture synthesis.[11] We apply it on the areas of the albedo that have an estimated specular intensity greater than a threshold value such as 0.1 (of course, higher and lower values can be used), and we use the neighboring pixels as the source for the texture synthesis. We search a radius of 40 pixels on 512×512 albedo images as the neighboring pixel area; however, greater and smaller neighboring pixels areas can be used, with the understanding that sufficient pixels in the area are required to afford a satisfactory inpainting, while larger pixel areas require more computational time and do not significantly improve the results. FIG. 18 depicts the application of the full pipeline. We also employ a mask defined in the UV space of the model (and thus we need to define this mask only once) which prevents the inpainting to be applied on areas of the face which we know in advance not to have specular components (e.g., eyes). This approach is similar to that of Tan et al.[40] in the sense that we also use inpainting, but the key difference is that we use the specular light intensity in order to estimate the regions which need to be inpainted. The annotation of the face in areas with different properties is an inherent advantage of the deformable model fitting.

II.4. Validation

In order to provide a quantitative validation of parameter fitting for the albedo, we performed two tests on synthetic cases for the Lambertian model: 1) we rendered a hemisphere with a known texture under various light conditions, and 2) we rendered a fitted AFM with the same texture we used for the hemisphere. We used these as input to our light estimation algorithm. The mean squared error for the albedo estimation as shown in FIG. 22 of the hemisphere was 1.07%, while for the face it was 2.01%. In both cases, we used the same parameter limits as in our face recognition experiment.

Additionally, in FIG. 23 we present a subject as imaged under three illumination conditions. We computed that the mean standard deviation in the texture (a-b) was 11%. On the albedo, however the mean standard deviation was reduced to 4%.

Relighting

Figure 19C:
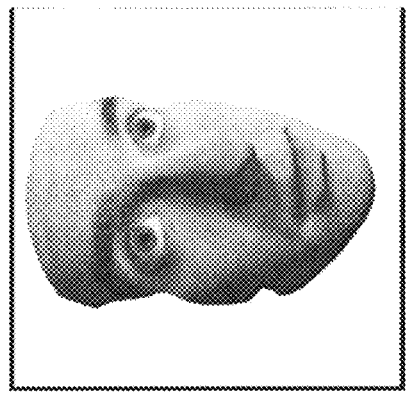
Figure 19F:
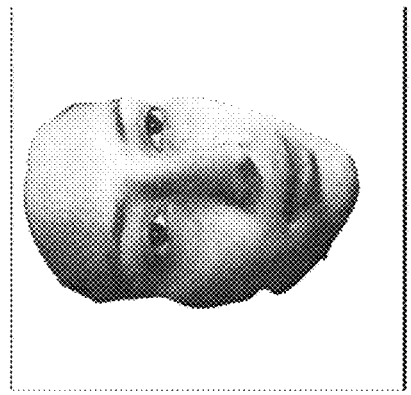
Figure 19B:
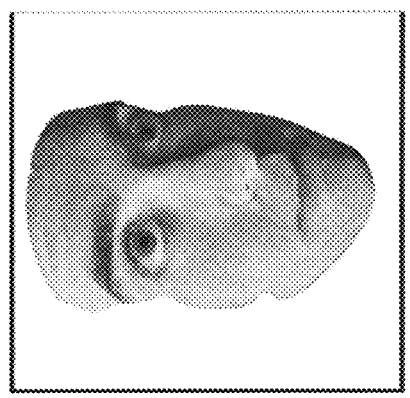
Figure 19E:
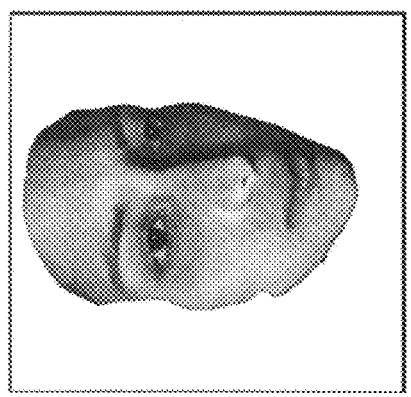
Figure 19A:
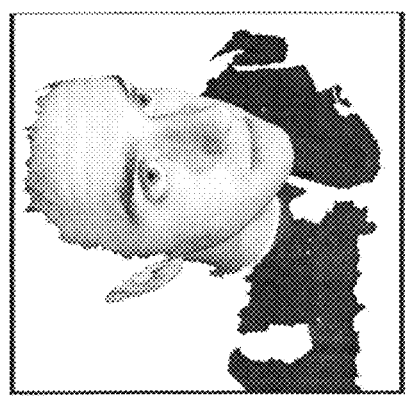
Figure 19D:
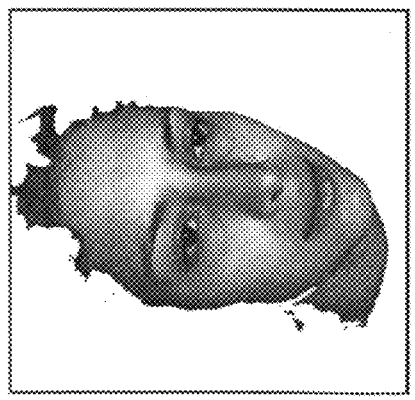
Figure 20C:
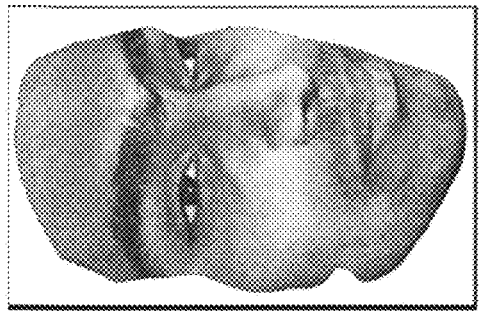
Figure 20B:
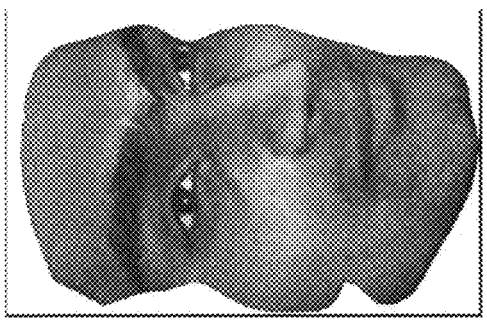
Figure 20A:
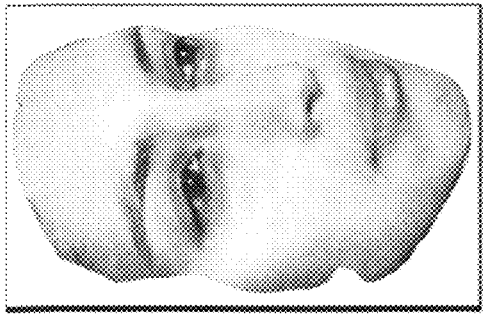
Figure 20E:
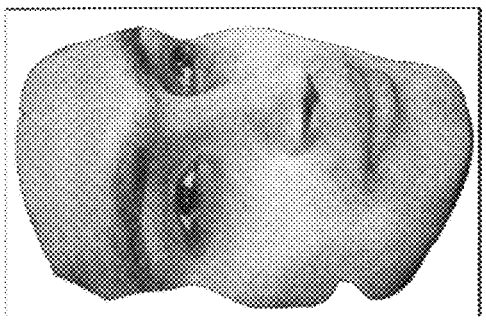
Figure 20D:
Figure 21D:
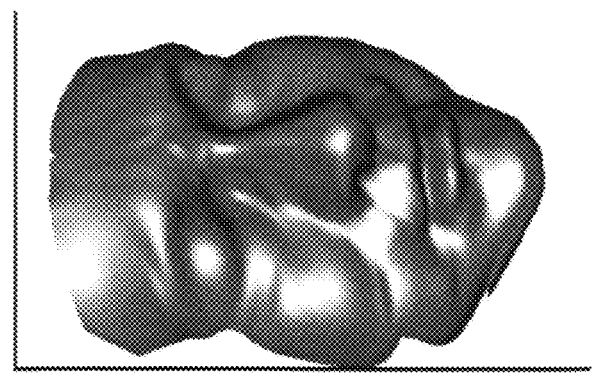
Figure 21C:
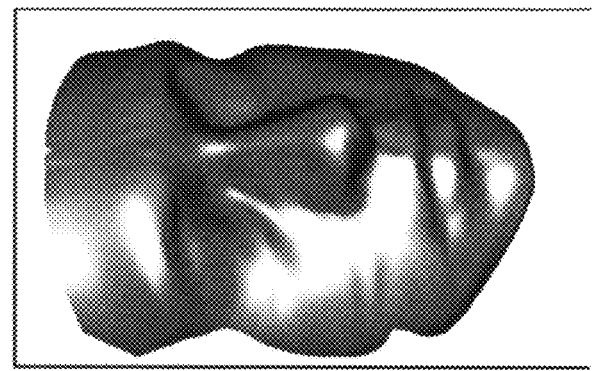
Figure 21B:
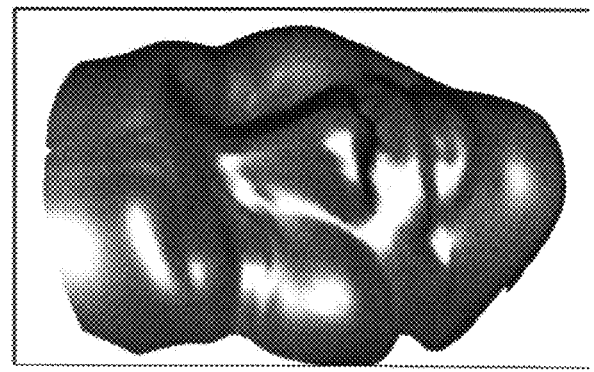
Figure 21A:
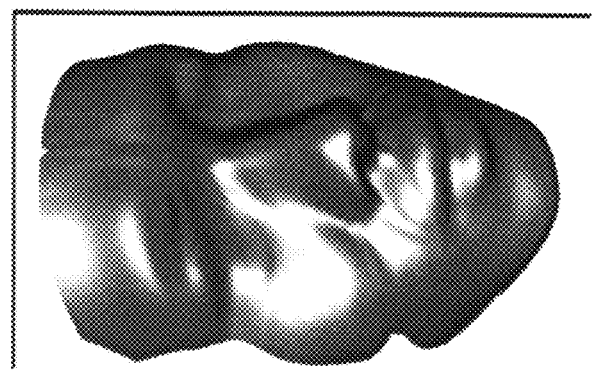
Figure 22A:
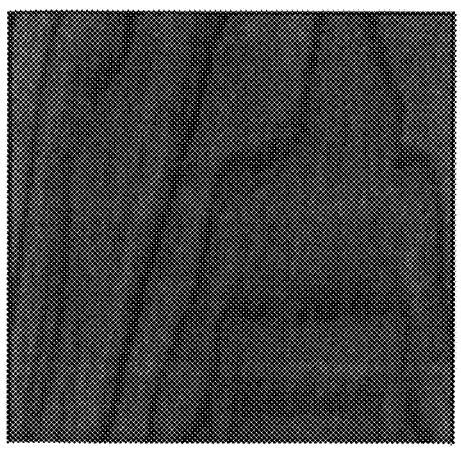
Figure 22B:
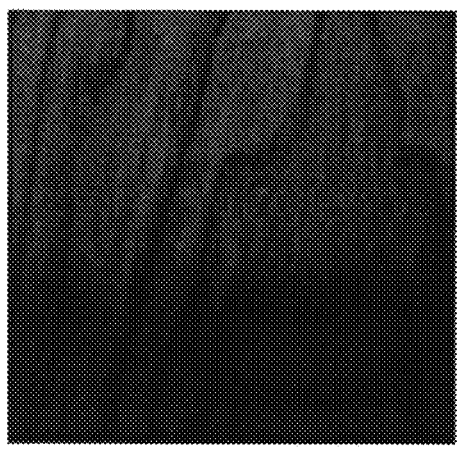
Figure 22C:
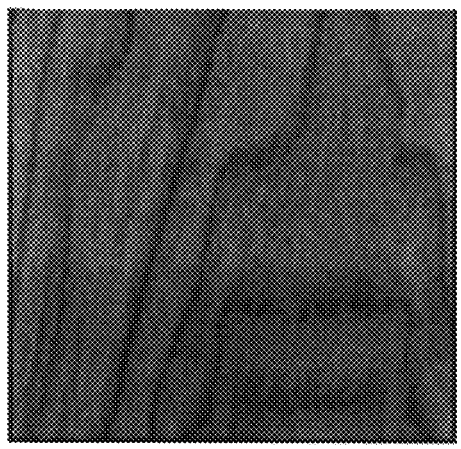
Figure 22D:
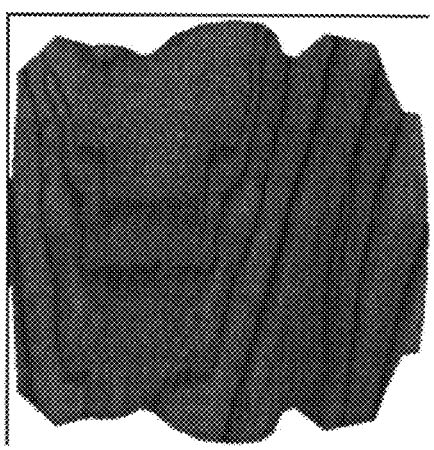
Figure 22E:
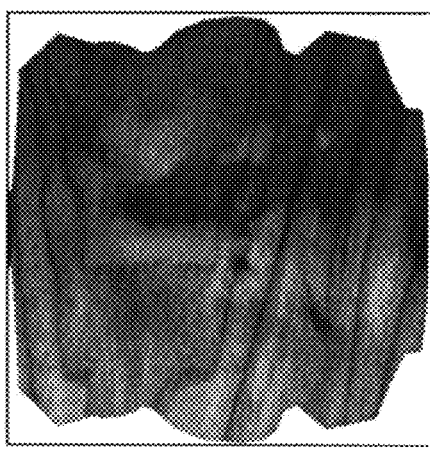
Figure 22F:
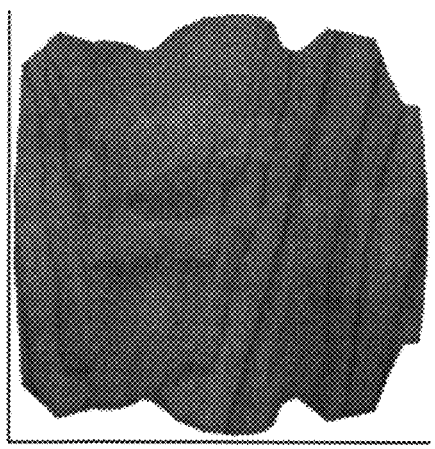
Figure 23A:
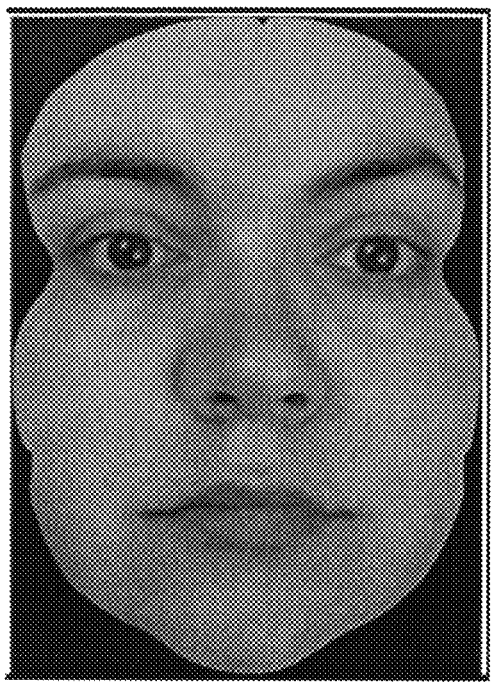
Figure 23B:
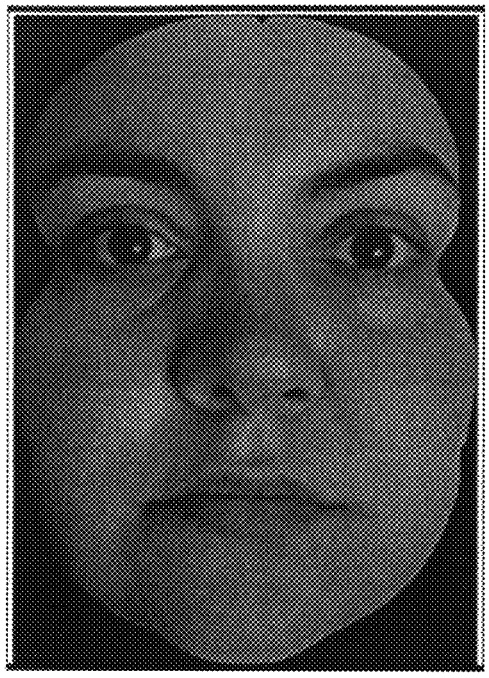
Figure 23C:
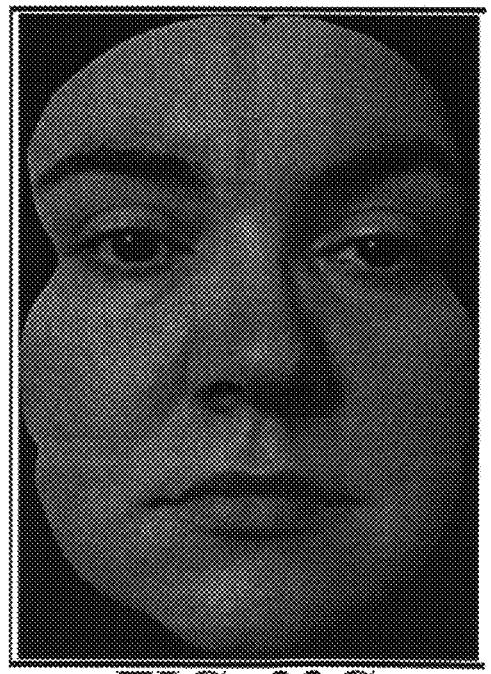
Figure 23D:
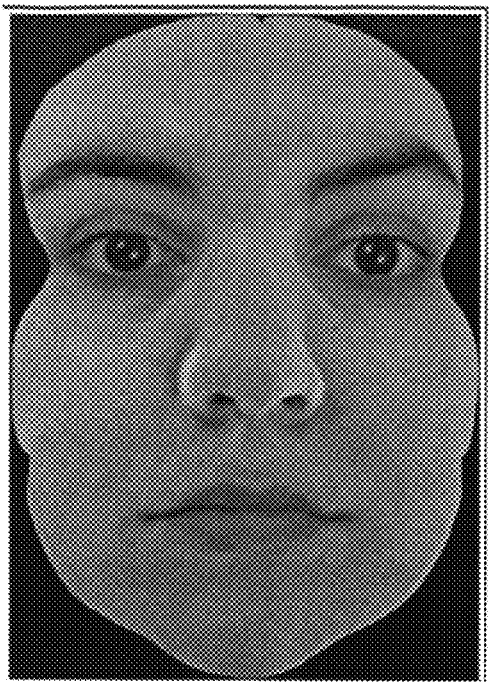
Figure 23E:
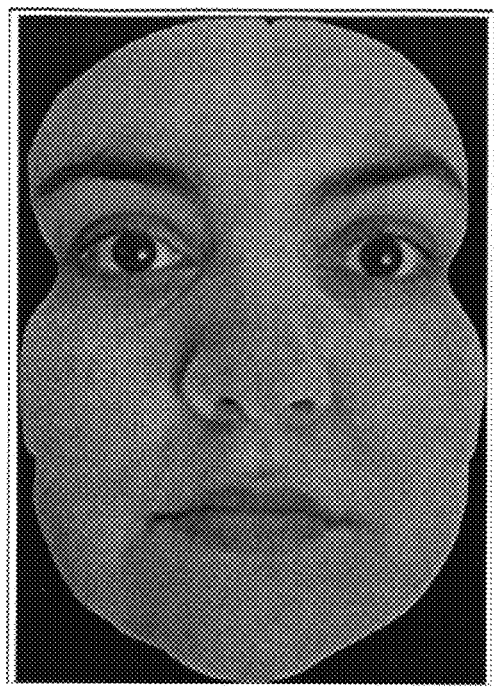
Figure 23F:
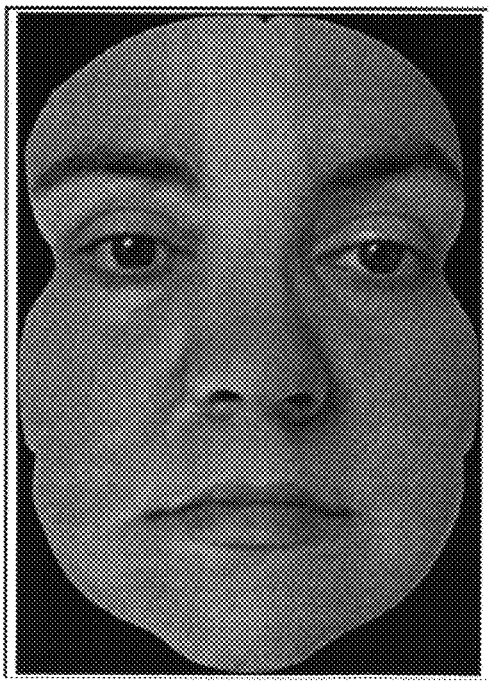

Processed datasets can be relit using any rendering algorithm. A dataset that was acquired using a two-flash optical scanner is depicted in FIG. 19(a). The raw texture had shadows in the area of the nose which were successfully removed from the albedo. This allows re-lighting under arbitrary lighting conditions, as depicted in FIG. 19(b,c). A dataset that was acquired using an one-flash optical scanner is depicted in FIG. 19(d). The raw texture had a strong specular component which was removed, as depicted in FIG. 19(e,f).

Texture Swap

All processed datasets have co-registered geometry and texture data. This allows us to directly transfer the texture from one person to another. An example is shown in FIG. 20. The only limitation is that the two persons must have the same facial expression.

Face Synthesis

Data registration along with the geometry image representation also allows us to synthesize new faces through the linear interpolation of existing ones. FIG. 20 depicts a synthetic face (e) by blending between faces (a) and (b) with equal weights.

Facial Expressions Transfer

Finally, transferring of facial expressions is possible as shown in FIG. 21. By using neutral expression datasets for two persons (a,c) and one with facial expression for the first person (b) we can transfer this expression to the second person (d). This is achieved by adding to the neutral dataset of the second person the difference between the two datasets of the first person.

II.5. Application to Face Recognition

Our method's automatic nature allows its application to the Face Recognition domain. Although we do not propose a novel Face Recognition approach such is beyond the scope of this application, our goal is to show that our method can improve the accuracy of existing face recognition approaches. For this, we constructed a database of 3D and 2D facial data. We utilize the 3D data only to estimate the albedo. We then use only the albedo to perform 2D Face Recognition. In order to compare the 2D images we utilize a pyramid wavelet transform. This approach is not the state-of-the-art in 2D Face Recognition, but it can be used to evaluate the importance of the illumination removal as well as the differences between various BRDFs. An excellent survey of the 2D/3D face recognition literature is provided by Bowyer et al.[4]

Database A

The database we constructed for the Face Recognition experiment consists of 637 datasets from 229 subjects. Each dataset includes texture and geometry information. A 3dMD™ optical scanner with a single flash was used. The acquisition conditions were not controlled, thus there is a wide range of variation both in the 2D textures and the 3D meshes. Moreover, the database contains datasets with a wide array of facial expressions. The first dataset of each subject was used as gallery while the rest were used as probes. For all subjects in the database the minimum number of probes is 1 and the maximum is 4. Even though this database is limited in terms of size, we consider it challenging due to the uncontrolled acquisition conditions and the poor quality of most 3D meshes.

Database B

This database was created to evaluate the performance of the albedo estimation. We used a 3dMD™ dual-pod system, to which we added a Canon® Rebel XTi SLR camera in order to be able to capture varying lighting conditions. We enrolled 10 subjects and we acquired 10 images under 3 distinct illumination conditions (directional light coming from the front, 30°, and 60° orientation) in order to simulate the acquisition conditions of a laser scanner (they do not tend to use a flash like the 3dMD™ system does). FIG. 23 depicts three datasets which are representative of this database. We used the first image with frontal illumination as the gallery for each subject.

Distance Metric

We first apply a wavelet transform to the albedo images. This transform decomposes the images using the complex version[33] of the steerable pyramid transform[37], a linear multi-scale, multi-orientation image decomposition algorithm. The image is first divided into highpass and lowpass subbands. The lowpass subband is then fed into a set of steerable bandpass filters, which produce a set of oriented subbands and a lower-pass subband.

This lower-pass subband is subsampled by 2 and recursively fed to the same set of steerable bandpass filters. Such pyramid wavelet representation is translation-invariant and rotation-invariant. To maintain reasonable image resolution and computational complexity our algorithm applies a 3-scale, 10-orientation complex steerable pyramid transform to decompose each component of the image. Only the oriented subbands at the farthest scale are stored, allowing us to compare the subband coefficients of the two images directly without the overhead of reconstruction. These coefficients are compared using the Complex Wavelet SSIM (CW-SSIM) index algorithm, a translational insensitive image similarity measure inspired by the structural similarity (SSIM) index algorithm[41]. CW-SSIM iteratively measures the similarity indices between the two sliding windows placed in the same positions of the two images and uses the weighted sum as a final similarity score. This score is measured by a variation of the CW-SSIM index equation originally proposed by Wang and Simoncelli[42].

Identification Experiment

Using the gallery/probe di-vision of our database, we performed an identification experiment. The performance is measured using a Cumulative Match Characteristic (CMC) curve. Note that only the 2D data are compared using the distance metric. The 3D data were not used, since the experiment's purpose is to highlight the importance of illumination removal in 2D Face Recognition. Neither Database A, nor Database B contain over-saturated images, so the synthesis step was not used in our experiments.

We measured the performance using the albedo estimated with our BRDF and using the raw texture. Additionally, we measured the performance using albedos estimated with other BRDFs, like the Lambertian[19], the Minnaert[25], and Spherical Harmonics[35]. In all BRDFs we used exactly the same Phong specular component. Note that the Spherical Harmonics BRDF required significantly more parameters to optimize compared to the other BRDFs. A total of 27 parameters were needed even though we used only the first two degrees of the Spherical Harmonics.

FIG. 24 shows that the albedo estimated with the Oren-Nayar BRDF resulted in the highest rank-one recognition rate of 93.4% on Database A. Using albedos estimated with other BRDFs yielded lower recognition rates; 89.34%, 88.83% and 88.58% for the Lambertian, Minnaert, and Spherical Harmonics, respectively. The use of the raw texture resulted in a recognition rate of 82.99%. Even though these results depend on the database used, the approximately 10% performance increase between the best albedo and the raw texture shows that Face Recognition can be significantly benefited by the proposed method. We also investigated the performance of PCA, and PCA+LDA[1] after Multiscale Retinex (MSR)[8] on this database1. However, due to the small number of images available for training, the results were extremely poor: 41.44% for PCA+LDA, and 40.31% for PCA. We used Database B as training.

On Database B, our face recognition approach achieved 95.72% rank-1 recognition rate when using the textures. When applied on albedos estimated with the Lambertian and Oren-Nayar formulations, the rank-1 recognition rate was 99.14%, while Minnaert obtained 97.86%. On the raw textures, PCA achieved 70.34%, while PCA+LDA obtained 76.04%. When using MSR, the PCA results improved to 74.35%, while PCA+LDA improved to 85.04%. The training set we used for PCA and PCA+LDA was Database A. We also ran MSR and our CW-SSIM implementation. This yielded 96.58% rank-1 recognition.

II.6. Conclusions

A novel method for human face modeling and relighting was presented. It has wide applicability as it requires only 3D geometry and texture. It does not need light measurement information and is fully automatic. It was shown that the raw geometry data can be converted to a geometry image representation which makes them suitable for modeling applications. Additionally, the albedo can be extracted from the raw texture and used in relighting applications. Compared to other approaches, the proposed method has fewer limitations, such as the ability to handle self-shadowing.

Finally, we show that our method can be utilized in Face Recognition, through the use of the estimated albedo. The Face Recognition experiment demonstrates the successful illumination removal from the texture. In the same experiment it is shown that the Oren-Nayar BRDF we use performs better than other BRDFs.

Future work will be directed towards modeling the face in more detail. Certain facial features such as the eyes and mouth need separate geometry and reflectance models. Additionally, the effect of facial hair (e.g., eyebrows, beard) on the reflectance model has to be investigated. Finally, the combination of more than one facial scans of the same per-son can be used to increase the quality of the geometry and reflectance models.

REFERENCES CITED IN PART II OF THE DETAILED DESCRIPTION

The following references were cited in the main part of the specification above.

[1] The CSU face identification evaluation system. http://www.cs.colostate.edu/evalfacerec/1 We determined the optimal parameters for MSR experimentally. Additionally, we tested the various distance metrics available in the CSU suite and chose the best for each experiment. algorithms5.html, 2003. Version 5.0.

[2] P. Besl and N. McKay. A method for registration of 3-D shapes. IEEE T PATTERN ANAL, 14(2):239-256, 1992.

[3] V. Blanz and T. Vetter. A morphable model for the synthesis of 3D faces. In ACM SIGGRAPH, pages 187-194, 1999.

[4] K. Bowyer, K. Chang, and P. J. Flynn. A survey of approaches and challenges in 3D and multi-modal 3D+2D face recognition. Comput. Vis. Image, 101(1):1-15, Jan. 2006.

[5] P. Debevec, T. Hawkins, C. Tchou, H. Duiker, W. Sarokin, and M. Sagar. Acquiring the reflectance field of a human face. In ACM SIGGRAPH, pages 145-156, 2000.

[6] C. Everitt, A. Rege, and C. Cebenoyan. Hardware shadow mapping. White paper, NVIDIA Corp., 2001.

[7] M. Fuchs, V. Blanz, H. Lensch, and H.-P. Seidel. Reflectance from images: a model-based approach for human faces. IEEE Transactions on Visualization and Computer Graphics, 11(3):296-305, May/June 2005.

[8] B. Funt, K. Barnard, M. Brockington, and V. Cardei. Luminance-based multi-scale retinex. In Proc. AIC Color, volume I, pages 330-333, 1997.

[9] A. S. Georghiades. Recovering 3-D shape and reflectance from a small number of photographs. In Eurographics Symposium on Rendering: 14th Eurographics Workshop on Rendering, pages 230-240, June 2003.

[10] X. Gu, S. Gortler, and H. Hoppe. Geometry images. In ACM SIGGRAPH, pages 355-361, 2002.

[11] P. Harrison. A non-hierarchical procedure for re-synthesis of complex textures. In Int. Conf. in Central Europe on Comp. Graphics, Visualization and Computer Vision (WSCG), pages 190-197, 2001.

[12] T. Igarashi, K. Nishino, and S. Nayar. The appearance of human skin. Tech. Report, Columbia University, 2005.

[13] K. Ikeuchi and K. Sato. Determining reflectance properties of an object using range and brightness images. IEEE T PATTERN ANAL, 13(11): 1139-1153, November 1991.

[14] H. Jensen, S. Marschner, M. Levoy, and P. Hanrahan. A practical model for subsurface light transport. In ACM SIG-GRAPH, pages 511-518, 2001.

[15] I. Kakadiaris, M. Papadakis, L. Shen, D. Kouri, and D. Hoffman. m-HDAF multiresolution deformable models. In Proc. 14th International Conference on Digital Signal Processing, pages 505-508, Santorini, Greece, Jul. 1-3, 2002.

[16] I. Kakadiaris, G. Passalis, G. Toderici, Y. Lu, N. Karambatziakis, N. Murtuza, and T. Theoharis. 3D face recognition in the presence of facial expressions: An annotated deformable model approach. IEEE T PATTERN ANAL, 29(4):640-649, April 2007.

[17] I. Kakadiaris, L. Shen, M. Papadakis, D. Kouri, and D. Hoffman. g-HDAF multiresolution deformable models for shape modeling and reconstruction. In Proc. British Machine Vision Conference, pages 303-312, Cardiff, United Kingdom, Sep. 2-5, 2002.

[18] S. Kirkpatrick, C. Gelatt, and M. Vecchi. Optimization by simulated annealing. Science, 22(4598):671-680, 1983.

[19] J. Lambert. Photometria sive de mensure de gratibus luminis, colorum umbrae. Eberhard Klett, 1760.

[20] H. Lensch, J. Kautz, M. Goesele, W. Heidrich, and H.-P. Seidel. Image-based reconstruction of spatial appearance and geometric detail. ACM Transactions on Graphics, 22(2):234-257, April 2003.

[21] C. Loop. Smooth subdivision surfaces based on triangles. Master's thesis, Dept. of Mathematics, U. of Utah, 1987.

[22] S. Mallick, T. Zickler, D. Kriegman, and P. Belhumeur. Specularity removal in images and videos: A PDE approach. In Proc. ECCV, pages 550-563, Graz, Austria, 2006.

[23] C. Mandal. A Dynamic Framework For Subdivision Surfaces. PhD thesis, University of Florida, 1998.

[24] D. Metaxas and I. A. Kakadiaris. Elastically adaptive de-formable models. IEEE Trans. on Pattern Analysis and Machine Intelligence, 24(10):1310-1321, 2002.

[25] M. Minnaert. The reciprocity principle in lunar photometry. Astrophysical Journal, 1941.

[26] S. Nayar, X. Fang, and T. Boult. Separation of reflection components using color and polarization. INT J Comput Vision, 21(3):163-186, 1997.

[27] NVIDIA Corp. Cg Language Spec. 1.5, May 2004.
[28] M. Oren and S. Nayar. Generalization of Lambert's reflectance model. In ACM SIGGRAPH, pages 239-246, 1994.
[29] G. Papaioannou, E. Karabassi, and T. Theoharis. Reconstruction of three-dimensional objects through matching of their parts. IEEE T PATTERN ANAL, 24(1):114-124, 2002.
[30] S. Paris, F. Sillion, and L. Quan. Lightweight face relighting. In Pacific Graphics, pages 41-50, 2003.
[31] P. Phillips, P. Flynn, T. Scruggs, K. Bowyer, J. Chang, K. Hoffman, J. Marques, J. Min, and W. Worek. Overview of the Face Recognition Grand Challenge. In Proc. IEEE Conf. on Computer Vision and Pattern Recognition, volume 1, pages 947-954, San Diego, Calif., 2005.
[32] B. Phong. Illumination for computer generated pictures. Communications of the ACM, 18(6):311317, 1975.
[33] J. Portilla and E. Simoncelli. A parametric texture model based on joint statistic of complex wavelet coefficients. INT J Comput Vision, 40.
[34] E. Praun and H. Hoppe. Spherical parametrization and re-meshing. In ACM SIGGRAPH, pages 340-349, 2003.
[35] R. Ramamoorthi and P. Hanrahan. An efficient representation for irradiance environment maps. In ACM SIGGRAPH, pages 497-500, 2001.
[36] P. Siarry, G. Berthiau, F. Durbin, and J. Haussy. Enhanced simulated annealing for globally minimizing functions of many-continuous variables. ACM T on Mathematical Soft-ware, 23(2):209-228, 1997.
[37] E. Simoncelli, W. Freeman, E. Adelson, and D. Heeger. Shiftable multi-scale transforms. IEEE T INFORM THEORY, 38:587-607, 1992.
[38] W. Smith and E. Hancock. Estimating the albedo map of the face from a single image. In IEEE ICIP, volume 3, pages 780-783, 2005.
[39] W. Smith, A. Robles-Kelly, and E. Hancock. Reflectance correction for perspiring faces. In IEEE ICIP, volume 2, pages 1389-1392, 2004.
[40] P. Tan, S. Lin, L. Quan, and H.-Y. Shum. Highlight removal by illumination-constrained inpainting. In Proc. ICCV, volume 01, pages 164-169, 2003.
[41] Z. Wang, A. Bovik, H. Sheikh, and E. Simoncelli. Image quality assessment: From error visibility to structural similarity. IEEE T IMAGE PROCESS, 13(4):600-612, 2004.
[42] Z. Wang and E. Simoncelli. Translation insensitive image similarity in complex wavelet domain. In IEEE ICASSP, volume 2, pages 573-576, 2005.
[43] T. Weyrich, W. Matusik, H. Pfister, B. Bickel, C. Donner, C. Tu, J. McAndless, J. Lee, A. Ngan, H. Jensen, and M. Gross. Analysis of human faces using a measurement-based skin reflectance model. In ACM SIGGRAPH, pages 1013-1024, 2006.
[44] T. Zickler, R. Ramamoorthi, S. Enrique, and P. Belhumeur. Reflectance sharing: predicting appearance from a sparse set of images of a known shape. IEEE T PATTERN ANAL, 28(8):1287-1302, 2006.

Part III of the Detailed Description of the Invention

3D-Aided 2D Face Recognition Using Bidirectional Relighting

III.1 Introduction

Face recognition is one of the most widely researched topics in computer vision. The popularity of this topic is related to its difficulty. In the general case, 2D images may be affected by varying illumination conditions, change in pose, and image quality (e.g., blurry images). There are many algorithms which have been proposed that provide satisfactory performance under constrained conditions, but none has managed to achieve high recognition rates under unconstrained pose and illumination conditions. Three-dimensional face recognition does not suffer from these problems. For example, one of the leading 3D face recognition approaches can easily outperform one of the best commercial 2D face recognition packages (at Face Recognition Vendor Test (FRVT) 2006) on the same data, when there are large changes in both pose and illumination as shown in FIG. 25. Such a database was collected at our institution and corresponds to uncooperative subjects and/or field illumination conditions. We intend to make this database available to other researchers after the blind review process.

FRVT 2006 explored the feasibility of using 3D data for both enrollment and authentication. The algorithms using 3D data have demonstrated their ability to provide good recognition rates. However, for practical purposes, it is unlikely that large scale deployments of 3D systems may happen in the near future, due to the high cost of the hardware. Nevertheless, it is not unreasonable to assume that an institution may want to invest in a limited number of 3D scanners, if having 3D data for enrollment can yield high recognition rates when using 2D images.

In this respect, we propose a face recognition method which makes use of subject-specific 3D data, while requiring only 2D data for authentication. The 3D data is used for mapping the 2D (probe) input onto a subject-specific surface, and for relighting the gallery texture to the lighting conditions of the probe, before computing a distance score. Specifically, for each subject, our approach requires a single 5D (3D shape plus 2D texture) dataset in the gallery. In the authentication phase, a single 2D image suffices. Our method transfers the illumination from a probe 2D image to an existing 5D dataset. To achieve this, we first fit an Annotated Face Model (AFM) to the raw 5D data using a subdivision-based deformable framework. A geometry image representation is extracted using the UV parameterization of the model. Given the pose in the 2D image, an Analytical Skin Reflectance Model (ASRM) is then applied to the gallery AFM in order to transfer the lighting from the probe. The matching score is computed using the relit gallery texture and the probe texture which is mapped onto the AFM's surface.

Our contributions are: 1) a new bidirectional face relighting algorithm which allows us to achieve better face recognition performance than the traditional unlighting methods; 2) a new view-dependent distance metric; 3) using subject-specific 3D data for enrollment and 2D data for authentication. The goal is developing a 3D-aided 2D face recognition system for robust face recognition performance on a database exhibiting large variations in lighting and pose.

The rest of this paper is organized as follows: in Section III.2 we briefly review other related methods; In Section III.3 we present the methods for enrollment using 3D+2D data and for authentication using 2D images, while in Section III.4 we provide qualitative and quantitative results.

III.2 Related Work

The literature in 2D/3D Face Recognition is extensive, an excellent survey of which is given by K. Bowyer, K. Chang, and P. J. Flynn. A survey of approaches and challenges in 3D and multi-modal 3D+2D face recognition. Comput. Vis. Image, 101(1):1-15, Jan. 2006. The most closely related work is by Daniel Riccio, Jean-Luc Dugelay: Geometric invariants for 2D/3D face recognition. *Pattern Recognition Letters* 28(14): 1907-1914 (2007), who proposed to use geometric invariants on the face in order to establish a correspondence between the 3D gallery face and the 2D probe. Some of the invariants are manually selected. Moreover, once the points are localized, they must also be "rotated" to some standard poses. This algorithm does not utilize the texture information registered with the 3D data from the scanner, thus not taking full advantage of the input data. V. Blanz and T. Vetter, "Face Recognition Based on Fitting a 3D Morphable Model," *IEEE Transactions on Pattern Analysis and Machine Intelligence*, vol. 25, pp. 1063-1074, 2003, employed a morphable model technique in order to acquire the geometry of faces from 2D images. The albedo is captured in the fitting process. In contrast to our method, this is a statistical approach. The descriptiveness of statistical approaches depends heavily on the variety and quality of the training set and the creation of such sets is not a trivial task. W. Smith and E. Hancock. Estimating the albedo map of the face from a single image. In IEEE ICIP, volume 3, pages 780-783, 2005, presented an approach for albedo estimation from 2D images which uses a 3D morphable model that is fitted to the input image. The normals of the fitted model are then used for the computation of the shading, assuming a Lambertian reflectance model. The main limitation of their method is the assumption that the subject is illuminated by a single light source which is placed very close to the viewer or in front of the viewer. Biswas et al propose a method for albedo estimation for face recognition using two-dimensional images. However, their approach makes the assumption that the image does not contain shadows, and it does not handle specular light. The relighting approach of Lee et al also suffers from the same limitations as the above approaches (e.g., cannot handle self-shadowing and assume single light source).

The bidirectional relighting method proposed in this paper does not challenge data-driven approaches in terms of photorealism. However, when minimal input data are available (such as in a face recognition scenario), only model-based approaches are applicable. The method of this invention, having significantly fewer constraints and limitations than previous approaches, widens the applicability of such methods. Especially when compared with relighting methods designed for face recognition, the proposed method offers significantly higher visual quality in cases where specular highlights over-saturate the images.

| Algorithm 1 Enrollment with 3D data | |
|---|---|
| Input | 3D facial mesh, 2D facial image, subject ID. |
| 1. | Pre-process the 3D facial mesh. |
| 2. | Register AFM to the 3D facial mesh. |
| 3. | Fit AFM to 3D facial mesh. |
| 4. | Lift texture from the 2D facial image based on the fitted AFM. |
| 5. | Compute visibility map. |
| 6. | Store the fitted AFM, texture and visibility map in the enrollment database as metadata for subject ID. |

III.3 Methods
III3.1 3D Enrollment

We employ the AFM proposed by Kakadiaris et al to generate geometry images (regularly sampled 2D images that have three channels) encoding geometric information (x, y and z components of a vertex in $R^3$). In this paper, the number of channels in the geometry image is 7 (three channels for representing the actual geometry of the face, three for representing the texture information, and one for the visibility map). For practical purposes, in all experiments we used a resolution of 256×256.

Specifically, we first fit the AFM to the input 3D data. Once the fitting is complete, we represent the AFM as a geometry image. For each vertex in the geometry image, we compute the closest point on the data. The texel corresponding to this point in the data is used to create the corresponding texture image for the fitted AFM. Additionally, we compute a visibility map (Algorithm 1). If the closest point on the data does not have a valid texel assigned (i.e., if the 3D point was not visible to the 2D image sensor), we assign the value one to the corresponding location in the visibility map. Otherwise, we assign a value of zero. The enrollment pipeline is depicted in FIG. 26.

III.3.2 2D Authentication

In the authentication stage (Algorithm 2), the input to our method is a 2D image as shown in FIG. 27. Three landmarks are detected automatically on the probe image using the PittPatt software (Pittsburgh Pattern Recognition, Inc). The eyes and nose points are mapped to their corresponding locations on the AFM. Once the pose is known, the texture is mapped onto the AFM. We use an analytical skin reflectance model to bidirectionally relight the gallery texture using the stored AFM mesh, in order to match the illumination of the probe texture as shown in FIG. 28.

Analytical Skin Reflectance Model

We use a hybrid bidirectional reflectance distribution function (BRDF) to model skin reflectance. We did not utilize a bidirectional surface scattering reflection distribution function (BSSRDF) model since the test data that we used do not have enough resolution in order to estimate a subsurface scattering component. The ASRM uses the Lambetian BRDF to model the diffuse component and the Phong BRDF to model the specular component. The Lambertian BRDF is the simplest, most widely used, physically-based model for diffuse reflectance. The model assumes that the surface is equally bright from all directions. The intensity of the light at a surface point is proportional to the angle between surface normal and incident light directions (denoted as $\theta$) $I_d$=E cos $\theta$, where E is the intensity of the light source. The Lambertian BRDF does not take into account the specular reflections caused by the oily layer of the skin. To accommodate this we use the BRDF proposed by Phong as stated above. The intensity of the specular reflection at a surface point is $I_s$=E cos$^n\phi$, where $\phi$ is the angle between the view vector and the reflected light and n is a parameter that controls the size of the highlight. Note that each facial area has different specular properties, therefore we utilize a specular map based on the annotation of the AFM.

Bidirectional Relighting

The illumination parameters and the ASRM can be optimized in two different ways: estimate the albedo (unlighting) or transfer illumination (relighting). In both cases the texture must be represented in the AFM's UV space.

Generally, the texture $M_T$ is the result of the lighting applied on the unknown albedo $M_A$ and is given by:

$$M_T = I_s + (I_d + I_a) \cdot M_A \quad (1)$$

where $I_a$ is the ambient component, $I_d$ the diffuse component and $I_s$ the specular component (assuming white specular highlights). By solving this equation for the albedo, we obtain:

$$M_A = \frac{M_T - I_s}{I_d + I_a} \quad (2)$$

However, for many practical applications, the albedo itself is not required, and is used only as an intermediate step for relighting. We advocate the use of bidirectional relighting without first estimating the albedo. This means that the optimization directly estimates the parameters for two lights (one that removes the illumination from the gallery image and one that adds the illumination from the probe image). The goal is to match the illumination conditions of a gallery texture to that of a probe texture. The following metric is minimized:

$$D = \left| M'_T - I'_s - (I'_d + I'_a)\frac{M_T - I_s}{I_d + I_a} \right| \quad (3)$$

where $I_a$, $I_d$, and $I_s$ are the parameters of the light illuminating the gallery; $I'_a$, $I'_d$, and $I'_s$ are the parameters of the second light illuminating the probe, while $M'_T$ the target texture. This process is depicted in FIG. 29, where (a) represents $M'_T$, (b) corresponds to $M_T$, (c) portrays D before optimization, (d) depicts D after optimization, while (e) renders $I'_s + (I'_d + I'_a)$ $((M_T - I_s)/(I_d + I_a))$. The relighting method is bidirectional, meaning that probe and gallery textures can be interchanged.

In order to improve performance under low lighting conditions, instead of computing the difference in the RGB color space, we chose to use a Hue-Saturation-Intensity (HSI) model. The intensity is weighed twice the amount of hue and saturation. We observed both visually and quantitatively improved relighting performance when using this color space and weighting scheme instead of simply computing an $L_2$ norm in RGB color space.

The above equations describe an ASRM for a single point light, and the objective function to be minimized. The ASRM is implemented as a Cg shader and for self-shadowing the shadow mapping technique of is used. To model multiple point lights, the contribution of each light's ASRM must be summed. The full implementation runs on consumer level graphics hardware, and it is able to bidirectionally relight a texture to a target within five seconds on average.

Distance Metric

For face recognition, a distance metric between 2D images is needed. We introduce a simple distance metric in order to evaluate the benefits of using unlit or relit images versus raw images in a face recognition scenario. We first apply a wavelet transform to the texture channel from the geometry images. This transform decomposes the images using the complex version of the steerable pyramid transform (CWSPT), a linear multi-scale, multi-orientation image decomposition algorithm.

The image is first divided into highpass and lowpass subbands. The lowpass subband is then fed into a set of steerable bandpass filters, which produce a set of oriented subbands and a lower-pass subband. This lower-pass subband is subsampled by 2 and recursively applied to the same set of steerable bandpass filters. Such pyramid wavelet representation is translation-invariant and rotation-invariant.

To maintain reasonable image resolution and computational complexity our algorithm applies a 3-scale, 10-orientation complex steerable pyramid transform to decompose each component of the image. Only the oriented subbands at the farthest scale are stored, allowing us to compare the subband coefficients of the two images directly without the overhead of reconstruction. These coefficients are compared using the Complex Wavelet Structural Similarity (CW-SSIM) index algorithm. It is a translational insensitive image similarity measure inspired by the SSIM index algorithm.

CW-SSIM iteratively measures the similarity indices between the two sliding windows placed in the same positions of the two images and uses the weighted sum as a final similarity score. This score is measured by a variation of the CW-SSIM index equation originally proposed by Z. Wang and E. Simoncelli. Translation insensitive image similarity in complex wavelet domain. In IEEE ICASSP, volume 2, pages 573-576, 2005.

In order to be able to handle variations in pose, we compute the normal map of the AFM when registered to the 2D input. The normal map is used to determine which pixels are not visible to the camera. The hidden pixels are used to create a thresholding map in the UV space of the AFM. We compute the CWSPT of the resulting image. This allows us to determine the contribution of each hidden pixel in the final score of the CW-SSIM. Since the CW-SSIM is computed using a sliding window, we use only those pixels for which the magnitude of the thresholded CWSPT map is below a threshold $\tau = 0.5$, which was experimentally determined.

A window of size 3×3 traverses the image one step at a time. At each step, we extract all wavelet coefficients, resulting in two sets of coefficients $p_w = \{p_{w,i}| i=1, \ldots, N\}$ and $g_w = \{g_{w,i}| i=1, \ldots, N\}$, drawn from the probe image and the gallery image, respectively. For the same window, the coefficients from the visibility map are $m_w = \{m_{w,i}| i=1, \ldots, N\}$. The distance metric can be written as follows:

$$\tilde{S}(p_w, g_w) = 1 - \left( \frac{2\sum_{i=1}^N |p_{w,i}||g_{w,i}| + K}{\sum_{i=1}^N |p_{w,i}|^2 + \sum_{i=1}^N |g_{w,i}|^2 + K} \right) \cdot \left( \frac{2\left|\sum_{i=1}^N p_{w,i} g^*_{w,i}\right| + K}{2\sum_{i=1}^N |p_{w,i} g^*_{w,i}| + K} \right)^r \cdot Q \quad (4)$$

where w is the current step of the window, N is the number of coefficients in the window, and r is an experimentally determined exponent. The parameter K is a small positive value which is used to make the result numerically stable. The complex conjugate of $g_{w,i}$ is denoted as $g^*_{w,i}$ and $|m_w|$ is the cardinality of the set $m_w$. The variable Q is defined as $|\{m_{w,i}|m_{w,i} > \tau\}|/|m_w|$. The first component (of the subtracted term) measures the equivalence of the two coefficient sets while the second reflects the consistency of phase changes. If $p_{w,i} = g_{w,i}$ for all i's, the distance is 0. The weighted sum of the local scores from all windows provides the distance score:

Score$(P,G) = \Sigma_w (b_w \cdot \tilde{S}(p_w, g_w))$ where $b_w$ is a predefined weight depending on which subband the local window lies on. In computing the set of weights $b_w$ we took into account the annotated regions of the AFM, assigning large weights to the rigid regions, and very small weights to the flexible regions of the face.

III.4 Results
III.4.1 Bidirectional Relighting

We provide two examples, one demonstrating bidirectional relighting, and the second demonstrating the relighting of a gallery (2D facial images) to multiple probe textures. In all cases, textures from the same subject are used.

FIG. 30(a,d) depict two textures of the same subject. Note that only (a) has a corresponding 3D mesh, while (b) is a simple 2D image and uses the mesh of (a). We performed bidirectional relighting to transfer the illumination conditions from one to the other. The result is two synthetic textures depicted in FIG. 30(b,e). The difference of the synthetic textures from the respective target textures is depicted in FIG. 30(c,f). After a visual inspection, no significant visible artifacts were introduced by the relighting process.

FIG. 31(a) depicts a multiple relighting example. Again, only the source texture (top row) has a corresponding 3D mesh, the remaining textures are using the source's 3D mesh. Four textures with different illumination conditions are depicted (FIG. 31(a) (bottom row)) as target textures. The proposed method estimated the four synthetic relighted images depicted in FIG. 31(a) (middle row). These results show that the proposed method is robust under varying lighting conditions, as in all cases the relighting was qualitatively successful.

III.4.2 Face Recognition

In this scenario, 5D data are acquired during enrollment, and 2D data during authentication (one-to-one matching). This is meaningful, since in a real installation, only one (or few) enrollment station(s) is needed (which may be expensive) and many verification stations (which must be inexpensive). To make the problem more challenging, we use a database with varying lighting conditions, in order to demonstrate the proposed method's robustness. We show that in a verification experiment, a face recognition algorithm benefits more from using relit images than unlit images.

Databases

Database A:

We have constructed a database with varying lighting conditions that includes both 3D and 2D data. The 3D data were captured by a 3dMD™ two-pod optical scanner, while the 2D data were captured by a commercial Canon® DSLR camera. The system, has six diffuse lights that allow the variation of the lighting conditions. For each subject, there is a single 3D scan (and the associated 2D texture) that is used as a gallery dataset, and several 2D images that are used as probe datasets. All 2D images, have one of the six possible lighting conditions depicted in FIG. 7(b). There are 26 subjects, resulting in 26 gallery datasets (3D plus 2D) and 800 probe datasets (2D only). For gallery, we used the images with the best illumination.

Database B

In order to analyze the impact of the variation in both pose and lighting, we acquired data from 23 subjects, illuminated under 6 illumination conditions. For each illumination condition, we asked the subject to face four different points inside the room. This generated rotations on the Y axis. For each rotation on Y, we also acquired 3 images with rotations on the Z axis (assuming that the Z axis goes from the back of the head to the nose, and that the Y axis is the vertical axis through the subject's head). Thus, we acquired a total of 72 images per subject (6 illumination conditions×4 Y rotations×3 Z rotations). For each image we concurrently acquired the 3D mesh as well. We will refer to this database as Database B. FIG. 32 depicts the variation in pose and illumination for one of the subjects from Database B. The gallery set was created by selecting the 3D mesh and the 2D texture corresponding for the frontal face, with the "best" illumination in our set.

Authentication Experiments

We performed an authentication experiment using the above algorithm for comparing 2D images. We evaluated both relighting and unlighting. In the unlighting case, both gallery and probe images where unlit (thus became albedos). In the relighting case, the gallery image was relit according to the probe image. In all cases the 2D images used were described in the geometry image (so that they are directly comparable). The results for Database A are summarized using a Receiver Operating Characteristic (ROC) curve as shown in FIG. 33. In FIG. 33, it is clearly shown that face recognition benefits more from relit images than from unlit images. It achieves a 10% higher verification rate at $10^{-3}$ False Accept Rate (FAR). The performance using the raw texture is also included as a baseline. Even though these results depend on the database and the distance metric that was used, they indicate clearly that relighting is more suitable for face recognition than unlighting. The reason behind this is that any unlighting method, produces an albedo for which the ground truth is not known, therefore the optimization procedure is more prone to errors.

In order to assess the robustness of the 3D-aided 2D face recognition approach with respect to both lighting and pose variation, we employed Database B. To demonstrate that our method can significantly improve upon the performance of 2D face recognition algorithms in difficult datasets, we use a 2D algorithm as baseline. The best recognition rates in 2D experiments at the Face Recognition Grand Challenge 2006 were achieved by commercial 2D systems. We have thus selected to employ such a system in order to ensure that we have a strong and realistic baseline.

FIG. 34 depicts the ROC curve for Database B. In this figure, we present the results for four different variants of 3D-aided 2D face recognition algorithms. Two of the variants use the z-normalization method of the scores, while two employ median absolute deviation (MAD) normalization. The scores obtained with the standard CW-SSIM exhibit lower performance than those that use the visibility map (denoted as "OPT" in the graphs). The ROC (FIG. 34) depicts the fact that our 3D-aided 2D face recognition algorithm performs better overall on the ROC, and has a lower Equal Error Rate (EER). In the lower false accept rates, the commercial face recognition software has a slight advantage (3% performance advantage at 0.1% FAR). However, the 3D-aided 2D face recognition algorithm shows a decrease in EER of over one half, when compared to the commercial product, thus making it more suitable in situations where low EER is desirable.

2D/3D Identification Experiment

We constructed an identification experiment based on Database B where we selected the first frontal image we acquired for each subject as gallery. In this experiment, we had 1061 probe and 23 gallery images. In order to use our algorithm we assumed that each subject in the probe set sequentially claims to be each subject in the gallery set. The results are presented in FIG. 35. The 3D-aided 2D face recognition approach outperforms the commercial 2D-only product throughout the entire Cumulative Matching Characteristic (CMC) curve.

Note that the commercial 2D system had 100% identification rate when only frontal images were used. This highlights the fact that hybrid 2D/3D approaches have an inherent advantage in conditions when the subjects do not have a frontal pose (e.g., uncooperative scenario).

III.5 Conclusions

A novel system for face recognition that uses 3D data for enrollment, and 2D data for authentication was proposed. This is achieved by fitting an annotated deformable model to the 3D data, and by using an analytical skin reflectance model to relight the 2D data while using the fitted AFM from gallery. The qualitative and quantitative evaluation indicates that the proposed 3D-aided 2D face recognition algorithm is robust to pose and light variations. Testing was conducted on two databases, one exhibited in illumination, and one containing in both illumination and pose. It has been also demonstrated that the relighting method can be used instead of the usual unlighting methods, and that it provides better overall face recognition performance.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

The invention claimed is:

1. A method for 3D-aided 2D face recognition under large pose and illumination variations implemented on a computer or on a distributed computer network, where the method comprises:
    enrolling a face of a subject into a gallery database as a fitted annotated face model, where the enrollment data comprises raw 3D data obtained either from a 3D scanner or imaging apparatus or derived from a 2D imaging or scanning apparatus and where a statistically derived annotated face model is fitted using a subdivision-based deformable model framework to the raw 3D data,
    if the raw 3D data includes over-saturated specular highlights, inpainting the albedo texture to produce an estimated the lighting invariant albedo texture,
    obtaining raw 2D data of a target face from a 2D imagining or scanning apparatus or probe,
    lifting a texture of the target face from the 2D probe image,
    selecting a specific fitted annotated face model from the gallery for an authentication experiment or all the gallery models for an identification experiment,
    bidirectionally relighting the gallery texture from the selected specific fitted annotated face model to change an illumination of the gallery texture to match the texture lifted from the probe image,
    comparing the two matched textures, and
    verifying and/or identifying the target face based on a value of a metric.

2. The method of claim 1, wherein the enrolling step comprises:
    obtaining and storing on a computer, raw 3D data of a face of a subject to be enrolled either directly from a 3D imaging apparatus or derived from a 2D imaging apparatus,
    fitting an annotated face model stored in the computer onto the raw 3D data using a subdivision-based deformable model framework using routines encoded on the computer to form a fitted face model,
    converting the fitted face model using routines encoded on the computer to a geometry image representation comprising regularly sampled, registered and annotated geometry data,
    lifting an albedo of the skin from the stored raw 3D data using an analytical skin reflectance model stored in the computer, where the analytical skin reflectance model is adapted to remove lighting, shadows, diffuse light and specular light from the albedo texture to form a lighting invariant albedo texture of the skin,
    placing the lighting invariant albedo texture onto the geometry image representation to form a subject specific deformable and relightable construct, and
    storing the construct in a gallery database encoded on the computer, where the database include constructs for all enrolled subjects,
    where the method requires no measurement or calibration of a lighting environment, is fully automatic, has minimum input requirements making it applicable to both computer vision applications and computer graphics applications and allowing utilization of existing 3D facial data stored in other databases.

3. The method of claim 2, wherein the computer vision applications include face recognition and face verification systems.

4. The method of claim 2, wherein the computer graphic application include face relighting, face synthesis and facial expressions transference.

5. A method for 3D-aided 2D face recognition under large pose and illumination variations implemented on a computer or on a distributed computer network, where the method comprises:
    obtaining and storing on a computer, raw 3D data of a face of a subject to be enrolled either directly from a 3D imaging apparatus or derived from a 2D imaging apparatus,
    fitting an annotated face model stored in the computer onto the raw 3D data using a subdivision-based deformable model framework using routines encoded on the computer to form a fitted face model,
    converting the fitted face model using routines encoded on the computer to a geometry image representation comprising regularly sampled, registered and annotated geometry data,
    lifting an albedo of the skin from the stored raw 3D data using an analytical skin reflectance model stored in the computer, where the analytical skin reflectance model is adapted to remove lighting, shadows, diffuse light and specular light from the albedo texture to form a lighting invariant albedo texture of the skin,
    placing the lighting invariant albedo texture onto the geometry image representation to form a subject specific deformable and relightable construct, and
    storing the construct in a gallery database encoded on the computer, where the database include constructs for all enrolled subjects,
    where the method requires no measurement or calibration of a lighting environment, is fully automatic, has minimum input requirements making it applicable to both computer vision applications and computer graphics applications and allowing utilization of existing 3D facial data stored in other databases,
    obtaining raw 2D data of a target face from a 2D imagining or scanning apparatus or probe,
    lifting a texture of the target face from the 2D probe image,
    selecting a specific fitted annotated face model from the gallery for an authentication experiment or all the gallery models for an identification experiment,
    bidirectionally relighting the gallery texture from the selected specific fitted annotated face model to change an illumination of the gallery texture to match the texture lifted from the probe image,
    comparing the two matched textures,
    verifying and/or identifying the target face based on a value of a metric.

6. A method implemented on a computer or on a distributed computer network comprising:
    obtaining and storing on a computer, raw 3D data of a face of a subject to be enrolled either directly from a 3D imaging apparatus or derived from a 2D imaging apparatus,
    fitting an annotated face model stored in the computer onto the raw 3D data using a subdivision-based deformable model framework using routines encoded on the computer to form a fitted face model, converting the fitted face model using routines encoded on the computer to a geometry image representation comprising regularly sampled, registered and annotated geometry data, lifting an albedo of the skin from the stored raw 3D data using an analytical skin reflectance model stored in the computer, where the analytical skin reflectance model is adapted to remove lighting, shadows, diffuse light and specular light from the albedo texture to form a lighting invariant albedo texture of the skin, placing the lighting invariant albedo texture onto the geometry image representation to form a subject specific deformable and relightable construct, and storing the construct in a gallery database encoded on the computer, where the database include constructs for all enrolled subjects, where the method requires no measurement or calibration of a lighting environment, is fully automatic, has minimum input requirements making it applicable to both computer vision applications and computer graphics applications and allowing utilization of existing 3D facial data stored in other databases.

7. The method of claim 6, wherein the computer vision applications include face recognition and face verification systems.

8. The method of claim 6, wherein the computer graphic application include face relighting, face synthesis and facial expressions transference.

9. The method of claim 6, further comprising:
if the raw 3D data includes over-saturated specular highlights, inpainting the albedo texture to produce an estimated the lighting invariant albedo texture.

10. The method of claim 6, further comprising:
deforming a facial expression from a first construct in the gallery database to match a second construction in the gallery and
transferring the facial expression from the first construct to the second construct to form a synthetic facial construct.

11. The system of claim 10, wherein the computer further having implemented thereon a notification method adapted to notify a user concerning the identity of a target subject.

12. The method of claim 6, further comprising:
retrieving a construct from the gallery database and
relighting the construct to form a relit construct, where the relighting is user defined.

13. The method of claim 6, further comprising:
retrieving a set of attributes from a plurality of constructs in the gallery database and
forming a synthetic construct from the set of attributes.

14. A system comprising:
an enrollment station or a small plurality of enrollment stations adapted to produce raw 3D data of a subject to be enrolled in the system,
a computer in data communication with the enrollment stations having implemented thereon an enrollment method comprising:
obtaining and storing on a computer, raw 3D data of a face of a subject to be enrolled either directly from a 3D imaging apparatus or derived from a 2D imaging apparatus,
fitting an annotated face model stored in the computer onto the raw 3D data using a subdivision-based deformable model framework using routines encoded on the computer to form a fitted face model,
converting the fitted face model using routines encoded on the computer to a geometry image representation comprising regularly sampled, registered and annotated geometry data,
lifting an albedo of the skin from the stored raw 3D data using an analytical skin reflectance model stored in the computer, where the analytical skin reflectance model is adapted to remove lighting, shadows, diffuse light and specular light from the albedo texture to form a lighting invariant albedo texture of the skin,
placing the lighting invariant albedo texture onto the geometry image representation to form a subject specific deformable and relightable construct, and
storing the construct in a gallery database encoded on the computer, where the database include constructs for all enrolled subjects,
where the method requires no measurement or calibration of a lighting environment, is fully automatic, has minimum input requirements making it applicable to both computer vision applications and computer graphics applications and allowing utilization of existing 3D facial data stored in other databases,
a plurality of identification stations adapted to produce raw 2D facial data of a target subject or a plurality of target subjects in data communication with the computer, where the computer further having implemented thereon an identification method comprising:
lifting a texture of the target face from the 2D probe image,
selecting a specific fitted annotated face model from the gallery for an authentication experiment or all the gallery models for an identification experiment,
bidirectionally relighting the gallery texture from the selected specific fitted annotated face model to change an illumination of the gallery texture to match the texture lifted from the probe image,
comparing the two textures matched using a view-dependent complex wavelet structural similarity index metric,
verifying and/or identifying the target face based on a value of the metric,
where an equal error rate (EER) of this method is less than half of the best commercially available 2D face recognition method.

* * * * *